US012640161B2

(12) United States Patent
Kim et al.

(10) Patent No.: US 12,640,161 B2
(45) Date of Patent: May 26, 2026

(54) METHOD AND APPARATUS FOR PROCESSING AUDIO FOR SCENE CLASSIFICATION

(71) Applicant: SAMSUNG ELECTRONICS CO., LTD., Suwon-si (KR)

(72) Inventors: Kyungrae Kim, Suwon-si (KR); Woohyun Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 18/195,121

(22) Filed: May 9, 2023

(65) Prior Publication Data

US 2023/0360665 A1 Nov. 9, 2023

Related U.S. Application Data

(63) Continuation of application No. PCT/KR2023/005182, filed on Apr. 17, 2023.

(30) Foreign Application Priority Data

May 9, 2022 (KR) ........................ 10-2022-0056887
Oct. 24, 2022 (KR) ........................ 10-2022-0137649

(51) Int. Cl.
*G10L 25/30* (2013.01)
*G10L 15/16* (2006.01)
(Continued)

(52) U.S. Cl.
CPC .............. *G10L 25/30* (2013.01); *G10L 15/16* (2013.01); *G10L 25/18* (2013.01); *G10L 25/84* (2013.01)

(58) Field of Classification Search
CPC ......... G10L 25/30; G10L 15/16; G10L 25/18; G10L 25/81; G10L 25/84; G10L 25/51
See application file for complete search history.

(56) References Cited

U.S. PATENT DOCUMENTS 9,646,620 B1 5/2017 Oh et al.
9,911,423 B2 3/2018 Vasilache et al.
(Continued)

FOREIGN PATENT DOCUMENTS

JP WO2011/033597 A1 3/2011
KR 10-2014-0017342 A 2/2014
(Continued)

OTHER PUBLICATIONS

Sang-Sun Ko et al., "Polyphonic sound event detection using multi-channel audio features and gated recurrent neural networks", The Journal of the Acoustical Society of Korea, 36(4), pp. 267-272, doi:10.7776/2017.36.4.267.

(Continued)

*Primary Examiner* — Hai Phan
*Assistant Examiner* — Nathan Tengbumroong
(74) *Attorney, Agent, or Firm* — Sughrue Mion, PLLC

(57) ABSTRACT

An audio processing method includes obtaining a first audio signal corresponding to a first frame; extracting a first feature vector by inputting the first audio signal to a first neural network; obtaining a temporal correlation vector representing a similarity between the first feature vector and at least one second feature vector extracted from at least one second audio signal corresponding to at least one second frame that is temporally before the first frame; and classifying a scene of the first audio signal by inputting the first feature vector, the at least one second feature vector, and the temporal correlation vector to a second neural network.

13 Claims, 36 Drawing Sheets

(51) Int. Cl.
   *G10L 25/18* (2013.01)
   *G10L 25/84* (2013.01)

(56) References Cited

U.S. PATENT DOCUMENTS

| | | | |
|---|---|---|---|
| 10,061,985 B2 | 8/2018 | Paluri et al. | |
| 10,803,879 B2 | 10/2020 | Lu et al. | |
| 10,930,301 B1* | 2/2021 | Lumezanu | G06N 3/084 |
| 11,087,779 B2 | 8/2021 | Yuyama | |
| 11,521,623 B2* | 12/2022 | DiMaria | G10L 17/06 |
| 11,521,638 B2 | 12/2022 | Liu | |
| 2004/0117187 A1 | 6/2004 | Ikeda | |
| 2012/0237042 A1 | 9/2012 | Hirohata et al. | |
| 2013/0080159 A1* | 3/2013 | Sharifi | H04L 65/611 |
| | | | 704/E15.001 |
| 2016/0225377 A1* | 8/2016 | Miyasaka | G10L 19/008 |
| 2017/0061978 A1* | 3/2017 | Wang | G10L 21/0232 |
| 2019/0378535 A1* | 12/2019 | Yuyama | H04S 7/00 |
| 2020/0160878 A1 | 5/2020 | Heo et al. | |
| 2020/0402494 A1* | 12/2020 | Hayashi | G10K 11/17881 |
| 2021/0104230 A1* | 4/2021 | Mitchell | G06F 18/2431 |
| 2021/0120354 A1* | 4/2021 | Chon | H04S 3/002 |
| 2022/0005488 A1 | 1/2022 | Sung et al. | |
| 2022/0167099 A1* | 5/2022 | Feilner | G06F 3/165 |
| 2022/0319533 A1 | 10/2022 | van den Oord et al. | |
| 2022/0386055 A1 | 12/2022 | Son et al. | |
| 2022/0414381 A1* | 12/2022 | Gautam | G06N 3/084 |

FOREIGN PATENT DOCUMENTS

| | | |
|---|---|---|
| KR | 10-2019-0042730 A | 4/2019 |
| KR | 10-2020-0063290 A | 6/2020 |
| KR | 10-2022-0005386 A | 1/2022 |
| KR | 10-2022-0157848 A | 11/2022 |
| WO | 2020/214541 A1 | 10/2020 |

OTHER PUBLICATIONS

International Search Report (PCT/ISA/210) and Written Opinion (PCT/ISA/237) issued by the International Searching Authority on Jul. 13, 2023 in corresponding International Application No. PCT/KR2023/005182.

* cited by examiner

[STEREO CHANNEL LAYOUT]

⬇

[ 3.1.2 CHANNEL LAYOUT]
SCREEN–CENTERED
(IN FRONT OF LISTENER)

⬇

[ 7.1.4 CHANNEL LAYOUT]
LISTENER–CENTERED
(OMNI–DIRECTIONALLY
AROUND LISTENER)

◯ STEREO CHANNEL LAYOUT — 300

◯ THREE–DIMENSIONAL AUDIO CHANNEL LAYOUT IN FRONT OF LISTENER — 310

◯ THREE–DIMENSIONAL AUDIO CHANNEL LAYOUT OMNI–DIRECTIONALLY
AROUND LISTENER — 320

FIG. 3B

2 CH (STEREO) LAYOUT 3.1.2 CH LAYOUT 5.1.2 CH LAYOUT 7.1.4 CH LAYOUT

ENCODED/DECODED CHANNEL

UP-MIXED/DE-MIXED CHANNEL

| | BCG | DCG #1 | DCG #2 |
|---|---|---|---|
| Case 1 | 2ch | 4ch | 6ch |
| | C1 | C1 M1 M2 | C3 C4 C5 |
| | 3.1.2ch | | |
| | 7.1.4ch | | |

C1 = L2 / R2
C2 = Hfl3 / Hfr3
M1 = C
M2 = LFE
C3 = L / R
C4 = Ls / Rs
C5 = Hfl / Hfr

820

| | BCG | DCG #1 | DCG #2 |
|---|---|---|---|
| Case 2 | 2ch | 6ch | 4ch |
| | C1 | C2 C3 M1 M2 | C4 C5 |
| | 7.1.0ch | | |
| | 7.1.4ch | | |

C1 = L2 / R2
C2 = L / R
C3 = Ls / Rs
M1 = C
M2 = LFE
C4 = Hfl / Hfr
C5 = Hbl / Hbr

830

| | BCG | DCG #1 |
|---|---|---|
| Case 3 | 2ch | 10ch |
| | C1 | C2 C3 C4 C5 M1 M2 |
| | 7.1.4ch | |

C1 = L2 / R2
C2 = L / R
C3 = Ls / Rs
C4 = Hfl / Hfr
C5 = Hbl / Hbr
M1 = C
M2 = LFE

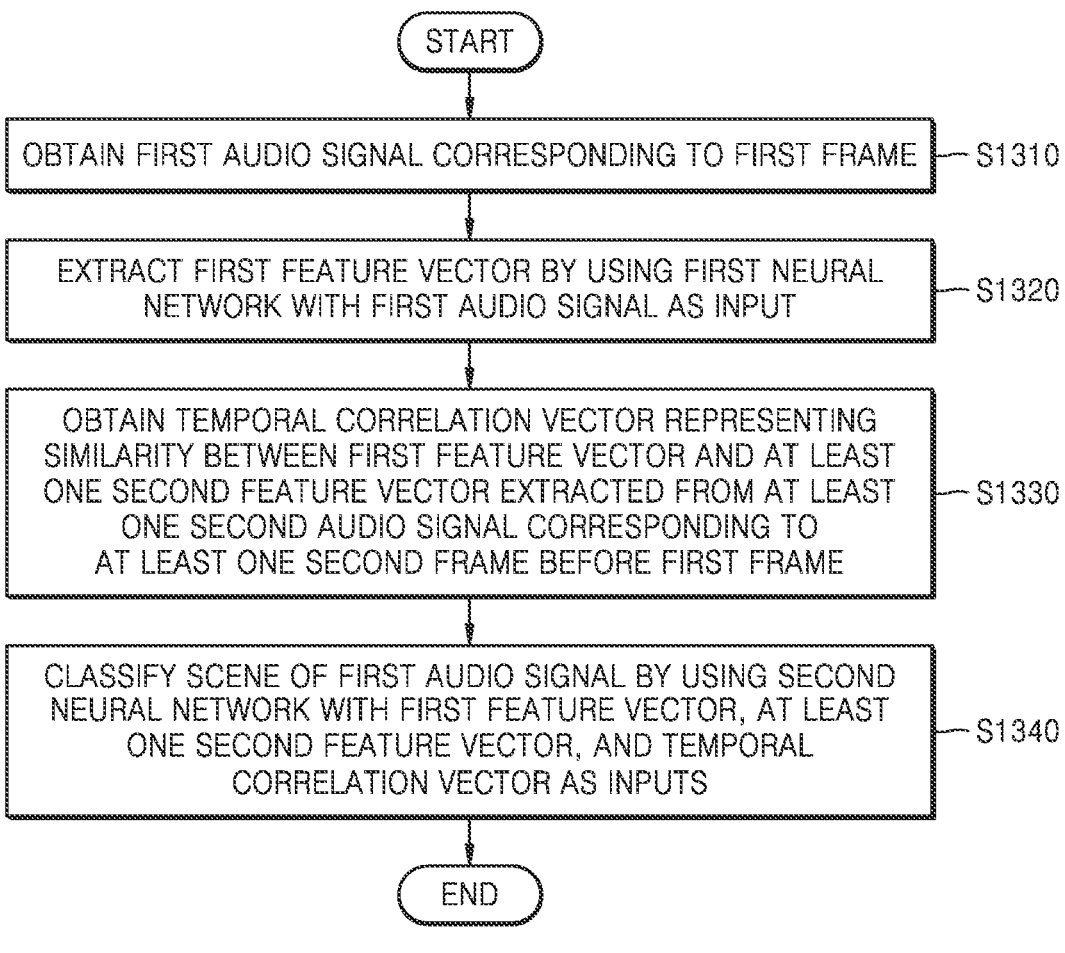

START

OBTAIN FIRST AUDIO SIGNAL CORRESPONDING TO FIRST FRAME — S1310

EXTRACT FIRST FEATURE VECTOR BY USING FIRST NEURAL NETWORK WITH FIRST AUDIO SIGNAL AS INPUT — S1320

OBTAIN TEMPORAL CORRELATION VECTOR REPRESENTING SIMILARITY BETWEEN FIRST FEATURE VECTOR AND AT LEAST ONE SECOND FEATURE VECTOR EXTRACTED FROM AT LEAST ONE SECOND AUDIO SIGNAL CORRESPONDING TO AT LEAST ONE SECOND FRAME BEFORE FIRST FRAME — S1330

CLASSIFY SCENE OF FIRST AUDIO SIGNAL BY USING SECOND NEURAL NETWORK WITH FIRST FEATURE VECTOR, AT LEAST ONE SECOND FEATURE VECTOR, AND TEMPORAL CORRELATION VECTOR AS INPUTS — S1340

END

FIG. 14B

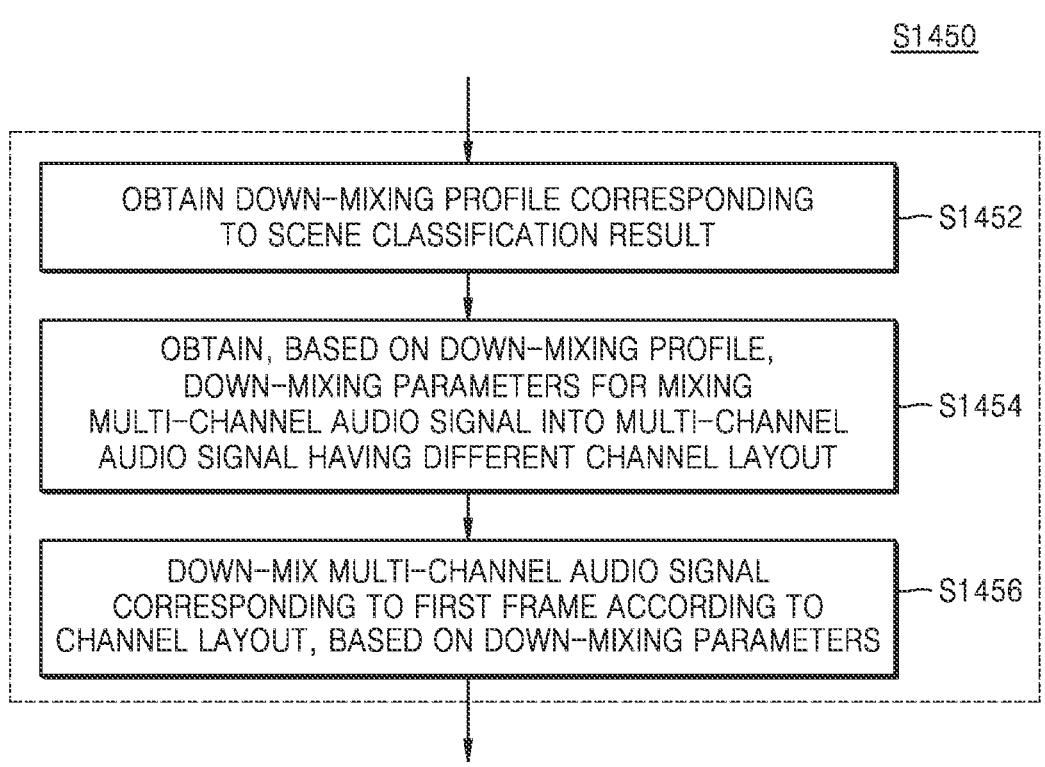

S1450

OBTAIN DOWN-MIXING PROFILE CORRESPONDING
TO SCENE CLASSIFICATION RESULT — S1452

OBTAIN, BASED ON DOWN-MIXING PROFILE,
DOWN-MIXING PARAMETERS FOR MIXING
MULTI-CHANNEL AUDIO SIGNAL INTO MULTI-CHANNEL
AUDIO SIGNAL HAVING DIFFERENT CHANNEL LAYOUT — S1454

DOWN-MIX MULTI-CHANNEL AUDIO SIGNAL
CORRESPONDING TO FIRST FRAME ACCORDING TO
CHANNEL LAYOUT, BASED ON DOWN-MIXING PARAMETERS — S1456

FIG. 16

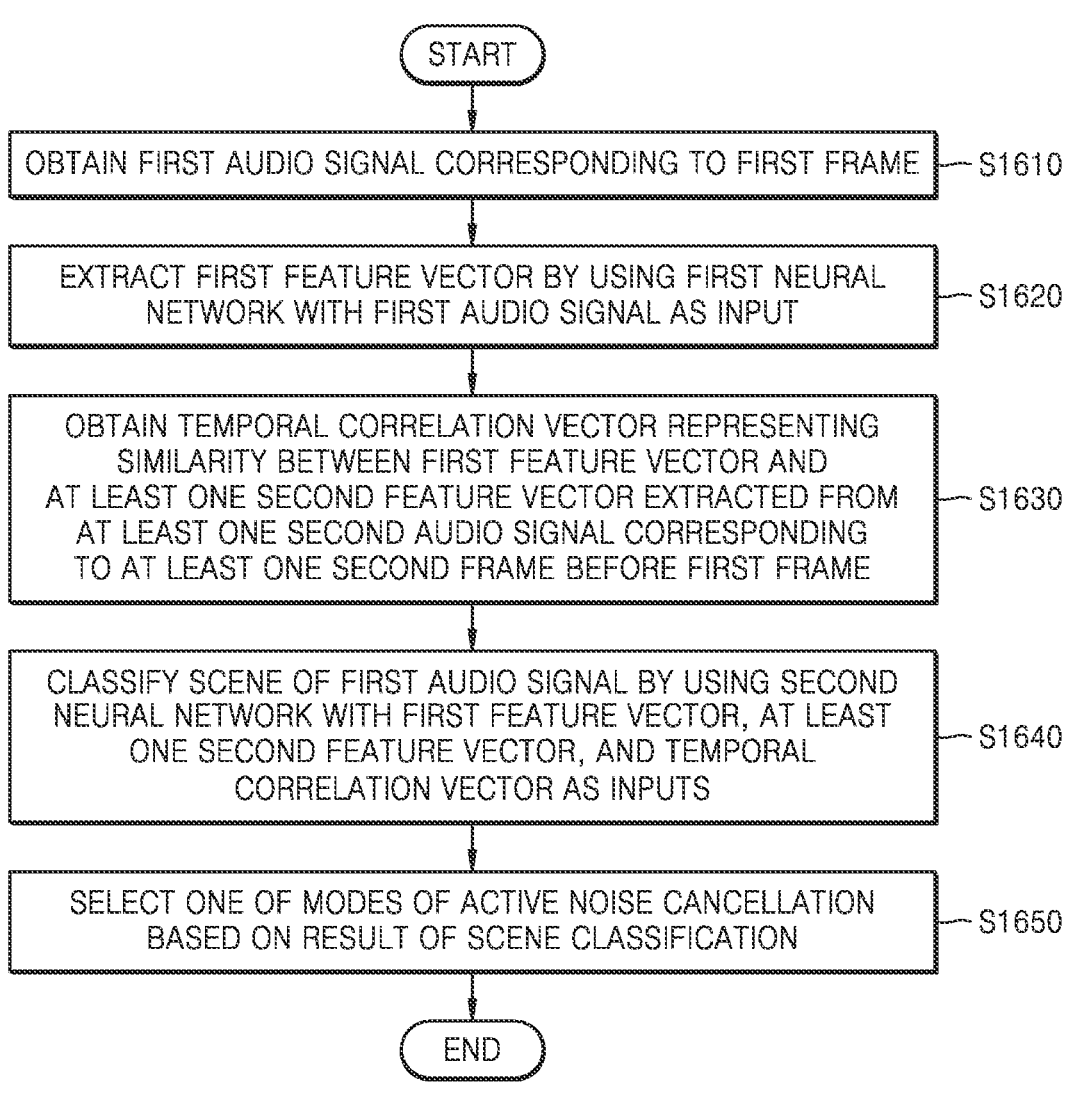

START

OBTAIN FIRST AUDIO SIGNAL CORRESPONDING TO FIRST FRAME — S1610

EXTRACT FIRST FEATURE VECTOR BY USING FIRST NEURAL NETWORK WITH FIRST AUDIO SIGNAL AS INPUT — S1620

OBTAIN TEMPORAL CORRELATION VECTOR REPRESENTING SIMILARITY BETWEEN FIRST FEATURE VECTOR AND AT LEAST ONE SECOND FEATURE VECTOR EXTRACTED FROM AT LEAST ONE SECOND AUDIO SIGNAL CORRESPONDING TO AT LEAST ONE SECOND FRAME BEFORE FIRST FRAME — S1630

CLASSIFY SCENE OF FIRST AUDIO SIGNAL BY USING SECOND NEURAL NETWORK WITH FIRST FEATURE VECTOR, AT LEAST ONE SECOND FEATURE VECTOR, AND TEMPORAL CORRELATION VECTOR AS INPUTS — S1640

SELECT ONE OF MODES OF ACTIVE NOISE CANCELLATION BASED ON RESULT OF SCENE CLASSIFICATION — S1650

END

METHOD AND APPARATUS FOR PROCESSING AUDIO FOR SCENE CLASSIFICATION

CROSS-REFERENCE TO RELATED APPLICATIONS

This application is by-pass continuation application of International Application No. PCT/KR2023/005182, filed on Apr. 17, 2023, which based on and claims priority to Korean Patent Application No. 10-2022-0056887, filed on May 9, 2022, in the Korean Intellectual Property Office, and Korean Patent Application No. 10-2022-0137649, filed on Oct. 24, 2022, in the Korean Intellectual Property Office, the disclosures of which are incorporated by reference herein in their entireties.

BACKGROUND

1. Field

The disclosure relates to a method and apparatus for audio for scene classification, and more particularly, to a method and apparatus for classifying a scene of an audio signal and processing the audio signal according to a result of the scene classification.

2. Description of Related Art

There are increasing needs of viewers who want to experience an immersive sound, such as theater content in a home environment, according to expansion of an Over-The-Top (OTT) service, an increase in the resolution of a television (TV), and enlargement of a screen of an electronic device, such as a tablet. To satisfy the needs of such viewers, there is a need for processing an audio signal according to a scene type by classifying a scene of the audio signal.

In addition, there is a need for processing an audio signal of a three-dimensional audio channel layout (three-dimensional audio channel layout in front of a listener) in which a channel is arranged in front of the listener, by considering sound representation of an entity (a sound source) on a screen. When processing an audio signal of a three-dimensional audio channel layout, it is necessary to perform effective down-mixing by classifying a scene of the audio signal.

Accordingly, there is an emerging need for an audio scene classification module having a structure with low latency for audio signal scene classification, high classification accuracy, and low complexity due to the increase in the number of scene types.

SUMMARY

Provided are a method and apparatus for processing an audio signal of a lower channel layout from a multi-channel audio signal by using a scene classification result.

Provided are a method and apparatus for down-mixing or up-mixing a multi-channel audio signal according to a scene classification result.

According to an embodiment of the disclosure, an audio processing method may include obtaining a first audio signal corresponding to a first frame, extracting a first feature vector by inputting the first audio signal to a first neural network, obtaining a temporal correlation vector representing a similarity between the first feature vector and at least one second feature vector extracted from at least one second audio signal corresponding to at least one second frame that is temporally before the first frame, and classifying a scene of the first audio signal by inputting the first feature vector, the at least one second feature vector, and the temporal correlation vector to a second neural network.

According to an embodiment of the disclosure, an audio processing apparatus includes a memory storing at least one instruction, and at least one processor configured to execute the at least one instruction stored in the memory. The at least one processor may be configured to execute the at least one instruction to obtain a first audio signal corresponding to a first frame, to extract a first feature vector by inputting the first audio signal to a first neural network, to obtain a temporal correlation vector representing a similarity between the first feature vector and at least one second feature vector extracted from at least one second audio signal corresponding to at least one second frame that is temporally before the first frame, and to classify a scene of the first audio signal by inputting the first feature vector, the at least one second feature vector, and the temporal correlation vector to a second neural network.

According to an embodiment of the disclosure, an audio processing method includes obtaining, from a bitstream, down-mixing-related information including a down-mixed audio signal corresponding to an original audio signal and a scene classification result, de-mixing the down-mixed audio signal, based on the down-mixing-related information, and reconstructing an audio signal including at least one channel, based on the de-mixed audio signal. The scene classification result may be obtained based on a temporal correlation vector between a first feature vector corresponding to a first frame of the original audio signal and at least one second feature vector corresponding to at least one second frame that is temporally before the first frame of the original audio signal.

According to an embodiment of the disclosure, an audio processing apparatus includes a memory storing at least one instruction, and at least one processor configured to execute the at least one instruction. The at least one processor may be further configured to obtain, from an original audio signal, down-mixing-related information including a down-mixed audio signal and a scene classification result, to de-mix the down-mixed audio signal based on the down-mixing-related information, and to reconstruct an audio signal based on the de-mixed audio signal. The scene classification result may be obtained based on a temporal correlation vector between a first feature vector corresponding to a first frame of the original audio signal and at least one second feature vector corresponding to at least one second frame that is temporally before the first frame of the original audio signal.

According to an embodiment of the disclosure, provided is a computer-readable recording medium having recorded thereon a program for executing the audio processing method on a computer.

BRIEF DESCRIPTION OF DRAWINGS

The above and other aspects, features, and advantages of certain embodiments of the present disclosure will be more apparent from the following description taken in conjunction with the accompanying drawings, in which:

FIG. 3B is a diagram for describing an example of a scalable audio channel layout structure;

FIG. 4C is a block diagram of a multi-channel audio signal processor according to an embodiment of the disclosure;

FIG. 4D is a diagram for describing a detailed operation of an audio signal classifier;

FIG. 5B is a block diagram of a multi-channel audio decoding apparatus according to an embodiment of the disclosure;

FIG. 8A is a diagram for describing an order and a rule of transmission of an audio stream by an audio encoding apparatus within each channel group, according to an embodiment of the disclosure;

FIG. 13 is a flowchart of an audio processing method, according to an embodiment of the disclosure;

FIG. 14B is a flowchart of an audio processing method, according to an embodiment of the disclosure;

FIG. 16 is a flowchart of an audio processing method, according to an embodiment of the disclosure;

DETAILED DESCRIPTION

Figure 1A:
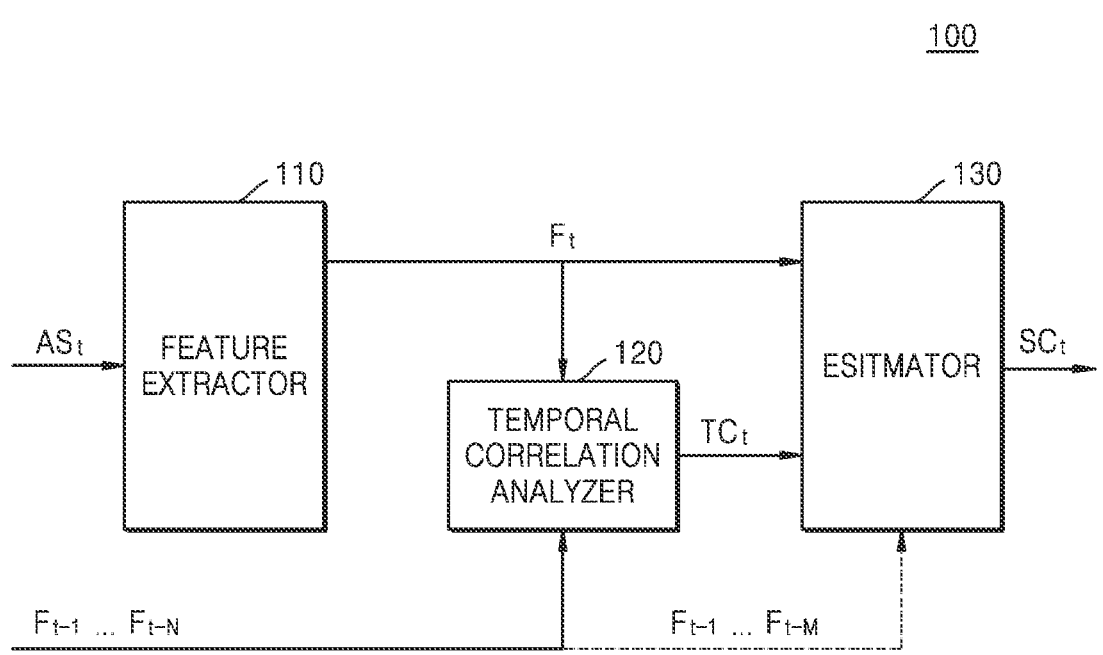
FIG. 1A is a block diagram of an audio scene classifier according to an embodiment of the disclosure.

Throughout the disclosure, the expression "at least one of a, b, or c" indicates only a, only b, only c, both a and b, both a and c, both b and c, or all of a, b, and c.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular may encompass the expression in the plural, unless it has a clearly different meaning in the context. Terms used herein, including technical or scientific terms, may have the same meaning as commonly understood by one of ordinary skill in the art described in the disclosure. In addition, terms including an ordinal number, such as "first" or "second" used herein, may be used to describe various elements, but those elements are not to be limited by the terms described above. The above terms are used only to distinguish one element from another element.

When a part "includes" or "comprises" an element, unless there is a particular description contrary thereto, the part may further include other elements, not excluding the other elements. The terms, such as "unit" or "module", used in the disclosure indicate a unit, which processes at least one function or motion, and the unit and the module may be implemented by hardware or software, or by a combination of hardware and software.

Hereinafter, embodiments of the disclosure will be described in detail with reference to the accompanying drawings such that one of ordinary skill in the art may easily implement the disclosure. However, the embodiments of the disclosure may be implemented in many different forms, and are not limited to those as will be discussed herein. Also, in the drawings, parts irrelevant to the description are omitted in order to clearly describe the disclosure, and like reference numerals designate like elements throughout the specification.

Herein, a "deep neural network (DNN)" or "neural network" is a representative example of an artificial neural network model simulating a brain nerve, and is not limited to an artificial neural network model using a specific algorithm.

Herein, a "parameter" may be a value used in an operation process of each layer constituting a neural network, and may include, for example, a weight (and a bias) used in application of an input value to a predetermined calculation formula. The parameter may be expressed in the form of a matrix. For example, the parameter in the form of a matrix may be referred to as a "kernel" or "filter". The parameter may be a value set as a result of training and may be updated through separate training data according to necessity.

In this specification, "hyper parameters" are values that change according to user or manufacturer settings in order to train neural networks, and may include, for example, the number of layers, the number of neurons included in each layer, activation function, learning rate, optimizer, batch size, iteration count, dropout probability, etc., but are not limited thereto.

In the specification, an "audio processing device" refers to an arbitrary device that takes an audio signal as an input and processes the input audio signal, and for example, the "audio processing device" may include an "audio scene classifier", an "audio encoding apparatus, and/or an "audio decoding apparatus".

Herein, a "multi-channel audio signal" may mean an audio signal of n channels (where n is an integer greater than 2). A "mono channel audio signal" may be a one-dimensional audio signal, a "stereo channel audio signal" may be a two-dimensional audio signal, and a "multi-channel audio signal" may be a three-dimensional audio signal.

Herein, a "channel (speaker) layout" may represent a combination of at least one channel, and may specify a spatial arrangement of channels (speakers). A channel used herein is a channel through which an audio signal is actually output, and thus may be referred to as a presentation channel.

For example, a channel layout may be a "X.Y.Z channel layout". Herein, X may be the number of surround channels, Y may be the number of subwoofer channels, and Z may be the number of height channels. The channel layout may specify a spatial location of a surround channel/subwoofer channel/height channel.

Examples of the "channel (speaker) layout" may include a 1.0.0 channel (or a mono channel) layout, a 2.0.0 channel (or a stereo channel) layout, a 5.1.0 channel layout, a 5.1.2 channel layout, a 5.1.4 channel layout, a 7.1.0 layout, a 7.1.2 layout, and a 3.1.2 channel layout, but the "channel layout" is not limited thereto, and there may be various other channel layouts.

Channels specified by the "channel (speaker) layout" may be referred to as various names, but may be uniformly named for convenience of explanation.

Channels constituting the "channel (speaker) layout" may be named based on respective spatial locations of the channels.

For example, a first surround channel of the 1.0.0 channel layout may be named as a mono channel. For the 2.0.0 channel layout, a first surround channel may be named as an L2 channel and a second surround channel may be named as an R2 channel.

Herein, "L" represents a channel located on the left side of a listener, and "R" represents a channel located on the right side of the listener. "2" represents that the number of surround channels is 2. "L" may also be referred to as "FL", and "R" may also be referred to as "FR".

For the 5.1.0 channel layout, a first surround channel may be named as an L5 channel, a second surround channel may be named as an R5 channel, a third surround channel may be named as a C channel, a fourth surround channel may be named as an Ls5 channel, and a fifth surround channel may be named as an Rs5 channel. Herein, "C" represents a channel located at the center of the listener. "s" refers to a channel located on a side. The first subwoofer channel of the 5.1.0 channel layout may be named as a low frequency effect (LFE) channel. Herein, LFE may refer to a low frequency effect. In other words, the LFE channel may be a channel for outputting a low frequency sound effect.

The surround channels of the 5.1.2 channel layout and the 5.1.4 channel layout may be named identically with the surround channels of the 5.1.0 channel layout. Similarly, the subwoofer channels of the 5.1.2 channel layout and the 5.1.4 channel layout may be named identically with the subwoofer channel of the 5.1.0 channel layout.

A first height channel of the 5.1.2 channel layout may be named as an Hl5 channel. Here, H represents a height channel. A second height channel may be named as an Hr5 channel.

For the 5.1.4 channel layout, a first height channel may be named as an Hfl channel, a second height channel may be named as an Hfr channel, a third height channel may be named as an Hbl channel, and a fourth height channel may be named as an Hbr channel. Here, f indicates a front channel with respect to the listener, and b indicates a back channel with respect to the listener.

For the 7.1.0 channel layout, a first surround channel may be named as an L channel, a second surround channel may be named as an R channel, a third surround channel may be named as a C channel, a fourth surround channel may be named as an Ls channel, a fifth surround channel may be named as an Rs channel, a sixth surround channel may be named as an Lb channel, and a seventh surround channel may be named as an Rb channel.

The surround channels of the 7.1.2 channel layout and the 7.1.4 channel layout may be named identically with the surround channel of the 7.1.0 channel layout. Similarly, respective subwoofer channels of the 7.1.2 channel layout and the 7.1.4 channel layout may be named identically with a subwoofer channel of the 7.1.0 channel layout.

For the 7.1.2 channel layout, a first height channel may be named as an Hl7 channel, and a second height channel may be named as an Hr7 channel.

For the 7.1.4 channel layout, a first height channel may be named as an Hfl channel, a second height channel may be named as an Hfr channel, a third height channel may be named as an Hbl channel, and a fourth height channel may be named as an Hbr channel.

For the 3.1.2 channel layout, a first surround channel may be named as an L3 channel, a second surround channel may be named as an R3 channel, and a third surround channel may be named as a C channel. A first subwoofer channel of the 3.1.2 channel layout may be named as an LFE channel. For the 3.1.2 channel layout, a first height channel may be named as an Hfl3 channel (or a Tl channel), and a second height channel may be named as an Hfr3 channel (or a Tr channel).

Herein, some channels may be named differently according to channel layouts, but may represent the same channel. For example, the Hl5 channel and the Hl7 channel may be the same channels. Likewise, the Hr5 channel and the Hr7 channel may be the same channels.

Channels are not limited to the above-described channel names, and various other channel names may be used.

For example, the L2 channel may be named as an L" channel, the R2 channel may be named as an R" channel, the L3 channel may be named as an ML3 (L') channel, the R3 channel may be named as an MR3 (R') channel, the Hfl3 channel may be named as an MHL3 channel, the Hfr3 channel may be named as an MHR3 channel, the Ls5 channel may be named as an MSL5 (Ls') channel, the Rs5 channel may be named as an MSR5 channel, the Hl5 channel may be named as an MHL5 (Hl') channel, the Hr5 channel may be named as an MHRS (Hr') channel, and the C channel may be named as an MC channel.

Channels of the channel layout for the above-described layout may be named as in Table 1.

TABLE 1

| Channel layout | Channel name |
|---|---|
| 1.0.0 | Mono |
| 2.0.0 | L2/R2 |
| 5.1.0 | L5/C/R5/Ls5/Rs5/LFE |
| 5.1.2 | L5/C/R5/Ls5/Rs5/H15/Hr5/LFE |
| 5.1.4 | L5/C/R5/Ls5/Rs5/Hfl/Hfr/Hbl/Hbr/LFE |
| 7.1.0 | L/C/R/Ls/Rs/Lb/Rb/LFE |
| 7.1.2 | L/C/R/Ls/Rs/Lb/Rb/H17/Hr7/LFE |
| 7.1.4 | L/C/R/Ls/Rs/Lb/Rb/Hfl/Hfr/Hbl/Hbr/LFE |
| 3.1.2 | L3/C/R3/Hfl3/Hfr3/LFE |

A "transmission channel" is a channel for transmitting a compressed audio signal, and a portion of the "transmission channel" may be the same as the "presentation channel", but is not limited thereto, and another portion of the "transmission channel" may be a channel (mixed channel) of an audio signal in which an audio signal of the presentation channel is mixed. In other words, the "transmission channel" may be a channel containing the audio signal of the "presentation channel", but may be a channel of which a portion is the same as the presentation channel and the residual portion is a mixed channel different from the presentation channel.

The "transmission channel" may be named to be distinguished from the "presentation channel". For example, when the transmission channel is an A/B channel, the A/B channel may contain audio signals of L2/R2 channels. When the transmission channel is a T/P/Q channel, the T/P/Q channel may contain audio signals of C/LFE/Hfl3, and Hfr3 channels. When the transmission channel is an S/U/V channel, the S/U/V channel may contain audio signals of L, and R/Ls, and Rs/Hfl, and Hfr channels.

In the present specification, a "three-dimensional audio signal" may refer to an audio signal for detecting the distribution of sound and the location of sound sources in a three-dimensional space.

In the present specification, a "three-dimensional audio channel in front of the listener" may refer to a three-dimensional audio channel based on a layout of an audio channel in front of the listener. The "three-dimensional audio channel in front of the listener" may be referred to as a "front 3D audio channel". In particular, the "3D audio channel in front of the listener" may be referred to as a "screen-centered 3D audio channel" because it is a 3D audio channel based on a layout of an audio channel arranged around the screen located in front of the listener.

In the present specification, a "3D audio channel omni-directionally around the listener" may mean a 3D audio channel based on a layout of an audio channel arranged omni-directionally around the listener. The "3D audio channel omni-directionally around the listener" may be referred to as a "full 3D audio channel". Herein, the omni-direction may mean directions including all of a front direction, a side direction, and a rear direction. In particular, the "3D audio channel omni-directionally around the listener" may also be referred to as a "listener-centered 3D audio channel" because it is a 3D audio channel based on a layout of an audio channel arranged omni-directionally around the listener.

In the present specification, a "channel group", which is a sort of data unit, may include a (compressed) audio signal of at least one channel. More specifically, the channel group may include at least one of a base channel group, that is independent of another channel group, or a dependent channel group that is dependent on at least one channel group. In this case, a target channel group on which a dependent channel group depends may be another dependent channel group and may be a dependent channel group related to a lower channel layout. Alternatively, a channel group on which the dependent channel group depends may be a base channel group. The "channel group" may be referred to as a "coding group" due to its including data of a channel group. The dependent channel group, which is used to further extend the number of channels from channels included in the base channel group, may be referred to as a scalable channel group or an extended channel group.

An audio signal of the "base channel group" may include an audio signal of a mono channel or an audio signal of a stereo channel. Without being limited thereto, the audio signal of the "base channel group" may include an audio signal of the 3D audio channel in front of the listener.

For example, the audio signal of the "dependent channel group" may include an audio signal of a channel other than the audio signal of the "base channel group" between the audio signal of the 3D audio channel in front of the listener and the audio signal of the 3D audio channel omni-directionally around the listener. In this case, a portion of the audio signal of the other channel may be an audio signal (i.e., an audio signal of a mixed channel) in which audio signals of at least one channel are mixed.

For example, the audio signal of the "base channel group" may be an audio signal of a mono channel or an audio signal of a stereo channel. The "multi-channel audio signal" reconstructed based on the audio signals of the "base channel group" and the "dependent channel group" may be the audio signal of the 3D audio channel in front of the listener or the audio signal of the 3D audio channel omni-directionally around the listener.

In the present specification, "up-mixing" may mean an operation in which the number of presentation channels of an output audio signal increases in comparison to the number of presentation channels of an input audio signal through de-mixing.

In the present specification, "de-mixing" may mean an operation of separating an audio signal of a particular channel from an audio signal (i.e., an audio signal of a mixed channel) in which audio signals of various channels are mixed, and may mean one of mixing operations. In this case, "de-mixing" may be implemented as calculation using a "de-mixing matrix" (or a "down-mixing matrix" corresponding thereto), and the "de-mixing" matrix may include at least one "de-mixing weight parameter" (or a "down-mixing weight parameter" corresponding thereto) as a coefficient of a de-mixing matrix (or a "down-mixing matrix" corresponding thereto). The "de-mixing weight parameter" may also be referred to as a "de-mixing parameter", and the "down-mixing weight parameter" may also be referred to as a "down-mixing parameter". Alternatively, the "de-mixing" may be implemented as arithmetic calculation based on a portion of the "de-mixing matrix" (or the "down-mixing matrix" corresponding thereto), and may be implemented in various manners, without being limited thereto. As described above, "de-mixing" may be related to "up-mixing".

"Mixing" may mean any operation of generating an audio signal of a new channel (i.e., a mixed channel) by summing values obtained by multiplying each of audio signals of a plurality of channels by a corresponding weight (i.e., by mixing the audio signals of the plurality of channels).

"Mixing" may be divided into "mixing" performed by an audio encoding apparatus in a narrow sense and "de-mixing" performed by an audio decoding apparatus.

"Mixing" performed in the audio encoding apparatus may be implemented as calculation using "(down)mixing matrix", and "(down)mixing matrix" may include at least one "(down)mixing weight parameter" as a coefficient of the (down)mixing matrix. Alternatively, the "(down)mixing" may be implemented as arithmetic calculation based on a portion of the "(down)mixing matrix", and may be implemented in various manners, without being limited thereto.

In the present specification, an "up-mix channel group" may mean a group including at least one up-mixed channel, and the "up-mixed channel" may mean a de-mixed channel separated through de-mixing with respect to an audio signal of an encoded/decoded channel. The "up-mix channel group" in a narrow sense may include an "up-mixed channel". However, the "up-mix channel group" in a broad sense may further include an "encoded/decoded channel" as well as the "up-mixed channel". Herein, the "encoded/decoded channel" may mean an independent channel of an audio signal encoded (compressed) and included in a bitstream or an independent channel of an audio signal obtained by being decoded from a bitstream. In this case, to obtain the audio signal of the encoded/decoded channel, a separate (de) mixing operation is not required.

The audio signal of the "up-mix channel group" in the broad sense may be a multi-channel audio signal, and an output multi-channel audio signal may be one of at least one multi-channel audio signal (i.e., an audio signal of at least one up-mix channel group) as an audio signal output through a device such as a speaker.

In the present specification, "down-mixing" may mean an operation in which the number of presentation channels of an output audio signal decreases in comparison to the number of presentation channels of an input audio signal through mixing.

In the present specification, a "factor for error removal" (or an error removal factor (ERF)) may be a factor for removing an error of an audio signal, which occurs due to lossy coding.

The error of the audio signal, which occurs due to lossy coding, may include, more specifically, an error, etc., caused by encoding (quantization) based on psycho-acoustic characteristics. The "factor for error removal" may be referred to as a "coding error removal (CER) factor", an "error cancellation ratio", etc. In particular, the "error removal factor" may be referred to as a "scale factor" because an error removal operation substantially corresponds to a scale operation.

In the specification, a "frame" may denote a unit obtained by dividing an audio signal in a time domain. For example, a frame t (t is a natural number) may be referred to as a "current frame". Here, t may be a natural number for identifying each of a series of frames. A frame t-N(N is a natural number less than t) may be referred to as a "previous frame". A frame size (or interval) may be predefined by a setting by a manufacturer or a user.

FIG. 1A is a block diagram of an audio scene classifier according to an embodiment of the disclosure. Referring to FIG. 1A, an audio scene classifier 100 may include a feature extractor 110, a temporal correlation analyzer 120, and an estimator 130.

The audio scene classifier 100 may classify a scene corresponding to a series of frames of an audio signal. For example, the audio scene classifier 100 may classify each of the series of frames of the audio signal into a dialogue type, a music type, or a sound effect type. However, the disclosure is not limited thereto, and types of a scene that may be classified by the audio scene classifier 100 and the number of types may be changed according to settings by a manufacturer or a user.

The audio scene classifier 100 may use data corresponding to at least one previous frame so as to classify a scene of a current frame of the audio signal. For example, the audio scene classifier 100 may classify the scene of the current frame by using similarity between the data corresponding to the at least one previous frame and data corresponding to the current frame.

The feature extractor 110 may obtain (or receive) a first audio signal $AS_t$ corresponding to a first frame (or may be referred to as a current frame). Here, the first audio signal $AS_t$ may be data (for example, spectrogram) obtained by visualizing corresponding voice data, but is not limited thereto.

The feature extractor 110 may extract a feature of the first audio signal $AS_t$. The feature extractor 110 may extract a first feature vector $F_t$ based on the first audio signal $AS_t$. For example, the feature extractor 110 may extract the first feature vector $F_t$ by using a first neural network, which takes the first audio signal $AS_t$ as an input. The feature extractor 110 may transfer the first feature vector $F_t$ to the temporal correlation analyzer 120. Detailed functions and operations of the first neural network are described in detail with reference to FIG. 1B.

The temporal correlation analyzer 120 may obtain (or calculate) similarity between features corresponding to a plurality of frames. The temporal correlation analyzer 120 may receive the first feature vector $F_t$ and at least one second feature vector $F_{t-1}, \ldots, F_{t-N}$. The temporal correlation analyzer 120 may obtain a temporal correlation vector $TC_t$ based on the first feature vector $F_t$ and the at least one second feature vector $F_{t-1}, \ldots, F_{t-N}$. The at least one second feature vector $F_{t-1}, \ldots, F_{t-N}$ may be extracted from at least one second audio signal corresponding to at least one second frame (or may also be referred to as a previous frame) before a first frame. In other words, the second frame may be at least one of a series of frames before the first frame. The number of second feature vectors may be N. Here, N may be a natural number. The temporal correlation vector $TC_t$ may represent similarity between the first feature vector $F_t$ and the at least one second feature vector $F_{t-1}, \ldots, F_{t-N}$.

The estimator 130 may classify a scene of the first audio signal $AS_t$. The estimator 130 may receive the first feature vector $F_t$, the at least one second feature vector $F_{t-1}, \ldots, F_{t-M}$, and the temporal correlation vector $TC_t$. Here, M may be a natural number. In an embodiment of the disclosure, M may be less than or equal to N. When M is less than N, the scene of the first audio signal $AS_t$ may be classified with a smaller amount of operation than when M is equal to N.

The estimator 130 may classify the scene of the first audio signal $AS_t$ by using a second neural network, which takes the first feature vector $F_t$, the at least one second feature vector $F_{t-1}, \ldots, F_{t-M}$, and the temporal correlation vector $TC_t$ as inputs. The estimator 130 may output a scene classification result $SC_t$ corresponding to the first audio signal $AS_t$. Detailed functions and operations of the second neural network are described in detail with reference to FIG. 1D.

According to an embodiment of the disclosure, the audio scene classifier 100 is configured in a single module including the feature extractor 110, the temporal correlation analyzer 120, and the estimator 130, regardless of the number of scene types, so that latency due to the increase in number of scene types may not occur.

Figure 1B:
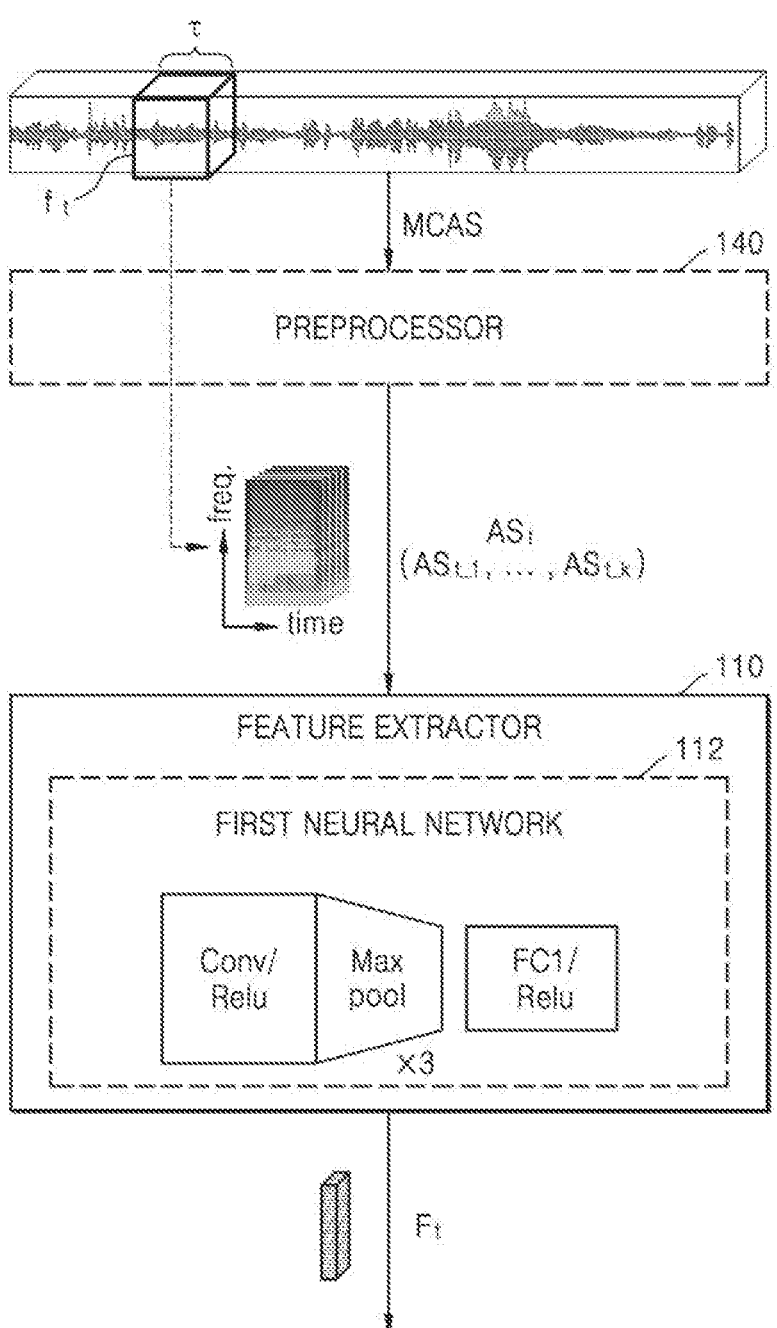
FIG. 1B is a block diagram for describing a detailed operation of a feature extractor in FIG. 1A.

FIG. 1B is a block diagram of detailed operations of the feature extractor 110 in FIG. 1A. The feature extractor 110 may include a first neural network 112. The first neural network 112 may output the first feature vector $F_t$ with the first audio signal $AS_t$ as an input. Details already provided with reference to FIG. 1A are omitted.

Referring to FIG. 1A together with FIG. 1B, the feature extractor 110 may obtain the first audio signal $AS_t$. For example, the feature extractor 110 may receive the first audio signal $AS_t$ in the form of a spectrogram.

In an embodiment of the disclosure, the audio scene classifier 100 may further include a preprocessor 140. The preprocessor 140 may obtain (or receive) a multi-channel audio signal MCAS. The preprocessor 140 may obtain a signal corresponding to a first frame $f_t$ from among the multi-channel audio signal MCAS. A frame (for example, the first frame $f_t$) may have a size of T.

In an embodiment of the disclosure, the preprocessor 140 may extract the first audio signal $AS_t$ including at least one channel signal from among the signals corresponding to the first frame $f_t$. For example, the multi-channel audio signal MCAS may include i channel signals. The preprocessor 140 may extract the first audio signal $AS_t$ includes a k (k is less than i) channel signals from among the i channel signals of the multi-channel audio signal MCAS (i and k are natural numbers).

In an embodiment of the disclosure, the preprocessor 140 may transform the multi-channel audio signal to a time-frequency domain. For example, the preprocessor 140 may generate a spectrogram based on the multi-channel audio signal MCAS. The preprocessor 140 may generate a spectrogram for each of the at least one channel signal from among the multi-channel audio signal MCAS. In other words, the preprocessor 140 may generate the first audio signal $AS_t$ expressed as a vector having dimensions of time, frequency, and channel.

In an embodiment of the disclosure, the multi-channel audio signal MCAS may have a 7.1.4 channel layout. In Table 1, the multi-channel audio signal MCAS may have L/C/R/Ls/Rs/Lb/Rb/Hfl/Hfr/Hbl/Hbr/LFE channel signals. In this case, i may be 12. For example, the preprocessor 140 may extract L/C/R/Ls/Rs signals from among the L/C/R/Ls/Rs/Lb/Rb/Hfl/Hfr/Hbl/Hbr/LFE channel signals. In this case, k may be 5. Accordingly, the first audio signal $AS_t$ may include sub-audio signals (for example, $AS_{t\_1}, AS_{t\_2}, AS_{t\_3}$ $AS_{t\_4}$, and $AS_{t\_5}$) corresponding to each of the channels.

In an embodiment of the disclosure, the preprocessor 140 may down-mix the multi-channel audio signal MCAS into five channel signals (for example, L/C/R/Ls/Rs signals). In an embodiment of the disclosure, the preprocessor 140 may down-mix the multi-channel audio signal into a stereo signal. In an embodiment of the disclosure, the preprocessor 140 may transform the down-mixed signal into a time-frequency domain.

The first neural network 112 may include at least one convolutional layer, a pooling layer, and a fully-connected layer. The convolutional layer obtains feature data by processing input data with a filter of predefined size. Before the feature data is transferred from the convolutional layer to a next layer, an activation function may be used. For example, the activation function may be a sigmoid function, a Tanh function, a softmax function, or a rectified linear unit (ReLU) function, but the disclosure is not limited thereto. Parameters of the filter of the convolutional layer may be optimized through a training process to be described below. The pooling layer, which is a layer for taking and outputting feature values of only some samples from among feature values of all samples of the feature data, to reduce a size of input data, may include a max pooling layer and an average pooling layer. In an embodiment of the disclosure, the pooling layer may be a maximum pooling layer. The fully-connected layer, in which each neuron of one layer is connected to each neuron of the next layer, is a layer for classifying features. In the fully-connected layer, before data is output, an activation function may be used.

In FIG. 1B, the first neural network 112 includes three convolutional layers, three pooling layers, and one fully-connected layer. However, this is only an example, and the disclosure is not limited thereto. Accordingly, the number of convolutional layers, the number of pooling layers, and the number of fully-connected layers included in the first neural network 112 may be variously modified. Likewise, the number and size of filters used in each convolutional layer may be variously modified, and the connection and method of connection between each layer may also be variously modified.

The first neural network 112 may receive the first audio signal $AS_t$. The first neural network 112 may extract (generate or obtain) the first feature vector $F_t$ with the first audio signal $AS_t$ as an input. In an embodiment of the disclosure, the first feature vector $F_t$ may be stored in a memory. The first feature vector $F_t$ stored in the memory may be used in a process of obtaining a temporal correlation vector (for example, $TC_{t+1}$) corresponding to a next frame (for example $F_{t+1}$).

In an embodiment of the disclosure, the first neural network 112 may be trained to output a feature vector corresponding to each of the audio signals by receiving a dataset including vectorized audio signals as an input. In other words, as the training is repeated, parameters of the first neural network 112 for outputting feature vectors may be updated.

Figure 1C:
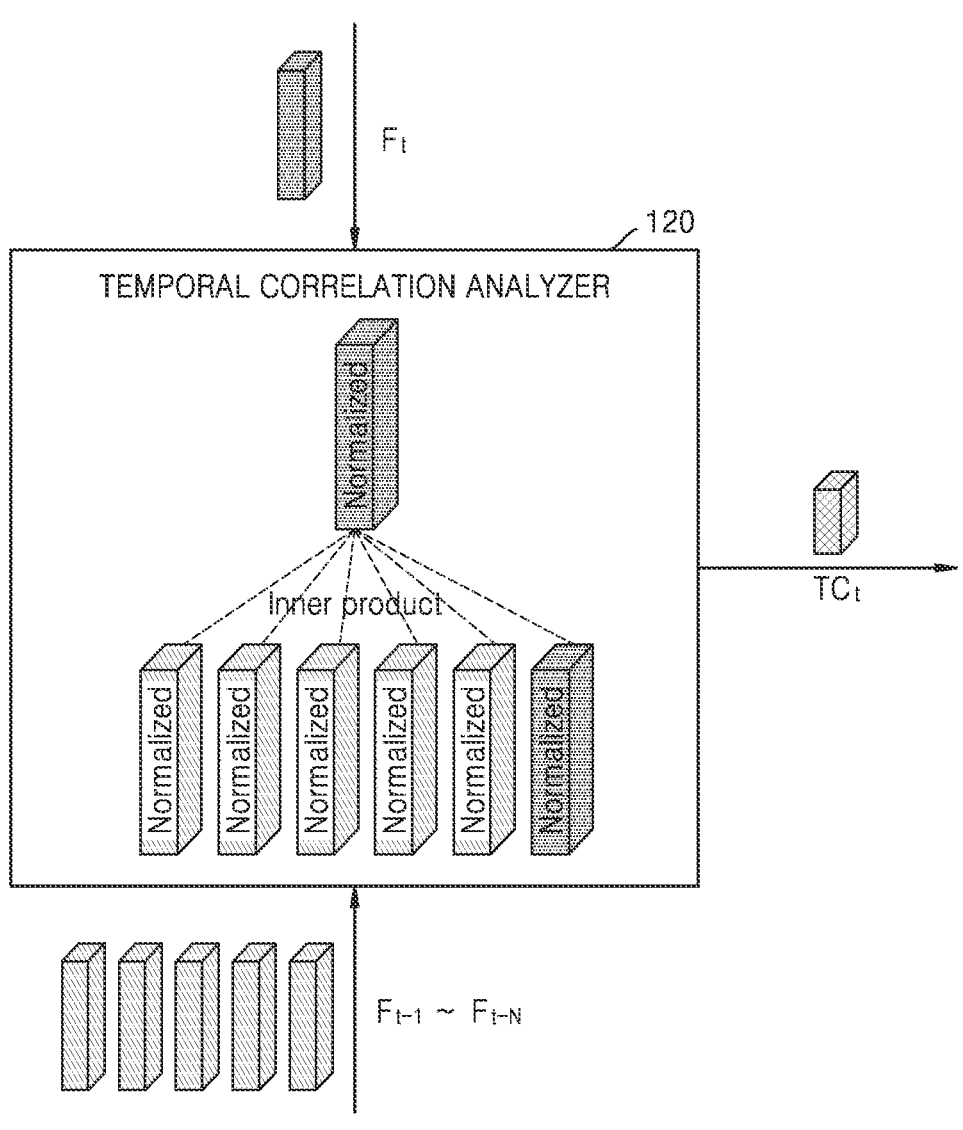
FIG. 1C is a block diagram for describing a detailed operation of a temporal correlation analyzer in FIG. 1A.

FIG. 1C is a block diagram of a detailed operation of the temporal correlation analyzer 120 in FIG. 1A. Details already provided above with reference to FIGS. 1A and 1B are omitted. For example, hereinafter, it is assumed that M is 5, but the disclosure is not limited thereto. Because M is 5, N may be greater than or equal to 5.

Referring to FIG. 1A together with FIG. 1C, the temporal correlation analyzer 120 may receive the first feature vector $F_t$ and the at least one second feature vector $F_{t-1}, \ldots, F_{t-5}$. The temporal correlation analyzer 120 may perform an inner product of the first feature vector $F_t$ and each of the at least one second feature vector $F_{t-1}, \ldots, F_{t-5}$. The temporal correlation analyzer 120 may perform an inner product of the first feature vector $F_t$ and the first feature vector $F_t$ (that is, an inner product of the first feature vector $F_t$ itself). The temporal correlation analyzer 120 may obtain a temporal correlation vector $TC_t$ including an inner product of the first feature vector $F_t$ and each of the at least one second feature vector $F_{t-1}, \ldots, F_{t-5}$ and an inner product of the first feature vector $F_t$ and the first feature vector $F_t$.

Figure 1D:
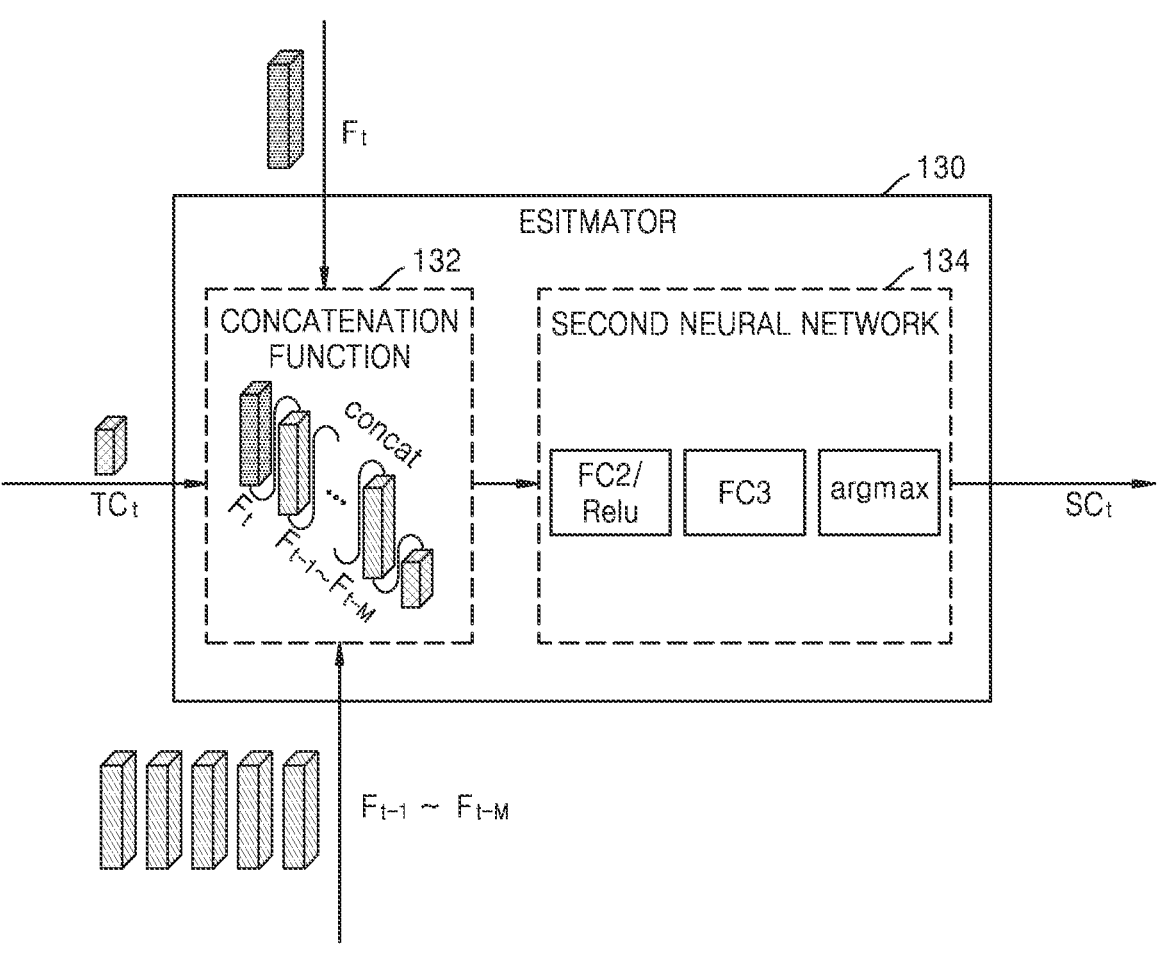
FIG. 1D is a block diagram for describing a detailed operation of an estimator in FIG. 1A.

FIG. 1D is a block diagram of detailed operations of the estimator 130 in FIG. 1A. Details already provided above with reference to FIGS. 1A to 1C are omitted.

Referring to FIG. 1A together with 1D, the estimator 130 may include a concatenation function 132 and a second neural network 134. The estimator 130 may classify a scene corresponding to the first audio signal $AS_t$ by using a feature vector of a current frame, at least one feature vector of at least one previous frame, and a temporal correlation vector corresponding to the current frame. The estimator 130 may receive the first feature vector $F_t$, the at least one second feature vector $F_{t-1}, \ldots, F_{t-5}$, and the temporal correlation vector $TC_t$.

The concatenation function 132 may connect the first feature vector $F_t$, the at least one second feature vector $F_{t-1}, \ldots, F_{t-5}$, and the temporal correlation vector $TC_t$ together. The concatenation function 132 may output the connected vector.

The second neural network 134 may include at least one fully-connected layer and an argmax function. Before data is output from the fully-connected layer, an activation function may be used. The at least one fully-connected layer may output a probability value for a predefined scene type by using the connected vectors. In an embodiment of the disclosure, an activation function (for example, the softmax function) for extracting the probability value may be used. The argmax function may output a scene type (that is, the scene classification result $SC_t$) having the highest probability from among the predefined scene types (for example, a dialogue type, a music type, and a sound effect type).

In FIG. 1D, the second neural network 134 includes two fully-connected layers and an argmax function. However, this is only an example, and the disclosure is not limited thereto. Accordingly, the number of fully-connected layers included in the second neural network 134 may be variously modified. Likewise, an order and method of connection between each layer may also be variously modified.

The second neural network 134 may receive the connected vector. The second neural network 134 may output the scene classification result $SC_t$ by having the connected vector as an input. In an embodiment of the disclosure, a scene of the first audio signal $AS_t$ may be classified by using the second neural network 134 having the first feature vector $F_t$, the at least one second feature vector $F_{t-1}, \ldots, F_{t-5}$, and the temporal correlation vector $TC_t$ as inputs.

In an embodiment of the disclosure, by having a dataset including a feature vector and a temporal correlation vector as an input, the second neural network 134 may be trained to classify a scene corresponding to each of audio signals. In other words, as the training is repeated, parameters of the second neural network 134 for outputting the feature vector may be updated. In an embodiment of the disclosure, the first neural network 112 and the second neural network 134 may be jointly trained. For example, the audio scene classifier 100 may be treated as one neural network and trained.

Figure 2A:
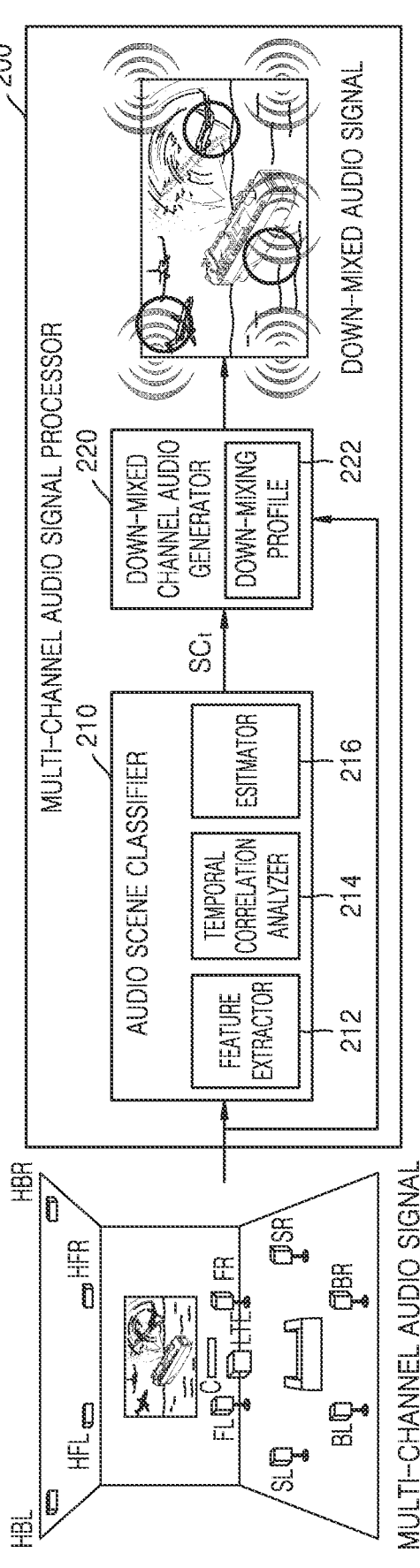
FIG. 2A is a block diagram of a multi-channel audio signal processor according to an embodiment of the disclosure.

FIG. 2A is a block diagram of a multi-channel audio signal processor according to an embodiment of the disclosure.

Referring to FIG. 2A, a multi-channel audio signal processor 200 may include an audio scene classifier 210 and a down-mixed channel audio generator 220. The audio scene classifier 210 may include a feature extractor 212, a temporal correlation analyzer 214, and an estimator 216. Functions and operations of the audio scene classifier 210, the feature extractor 212, the temporal correlation analyzer 214, and the estimator 216 are similar to functions and operations of the audio scene classifier 100, the feature extractor 110, the temporal correlation analyzer 120, and the estimator 130 in FIGS. 1A to 1D, and redundant descriptions thereof are omitted.

The multi-channel audio signal processor 200 may obtain (or receive) a multi-channel audio signal corresponding to a plurality of frames including a first frame and at least one second frame. The multi-channel audio signal may include a plurality of channel signals. The multi-channel audio signal processor 200 may extract a first audio signal including at least one channel signal from among the multi-channel audio signal.

The audio scene classifier 210 may classify a scene of the first audio signal.

The down-mixed channel audio generator 220 may down-mix a multi-channel audio signal corresponding to the first frame based on the scene classification result $SC_t$. The down-mixed channel audio generator 220 may obtain a down-mixing profile 222 corresponding to the scene classification result $SC_t$. For example, the down-mixing profile 222 may include down-mixing parameters for mixing a multi-channel audio signal into a multi-channel audio signal having a different channel layout. The down-mixed channel audio generator 220 may obtain the down-mixing parameters for mixing the multi-channel audio signal (hereinafter, "the first multi-channel audio signal") into a multi-channel audio signal (hereinafter, "the second multi-channel audio signal) having a different channel layout based on the down-mixing profile. For example, the down-mixing profile 222 may vary depending on the scene classification result $SC_t$, a channel layout of the first multi-channel audio signal, and a channel layout of the second multi-channel audio signal.

The down-mixed channel audio generator 220 may down-mix the first multi-channel audio signal corresponding to the first frame according to the channel layout of the second multi-channel audio signal, based on the down-mixing parameters. The down-mixing profile and/or the down-mixing parameters may be predetermined. The down-mixed channel audio generator 220 may generate a down-mixed audio signal (that is, the second multi-channel audio signal) as a result of the down-mixing. In the specification, the down-mixed audio signal is also referred to as the second multi-channel audio signal, but may be a mono signal including one channel.

Figure 2B:
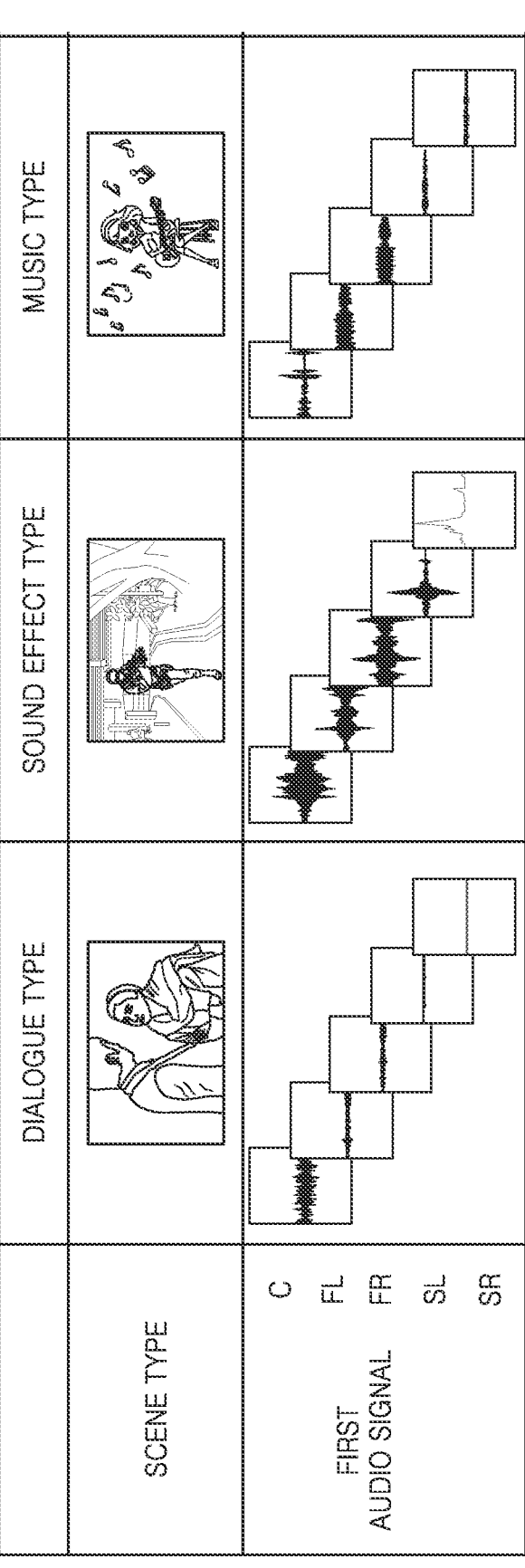
FIG. 2B is a diagram illustrating a scene classification result according to an embodiment of the disclosure.

FIG. 2B is a diagram illustrating a scene classification result according to an embodiment of the disclosure. Referring to FIG. 1A, FIG. 1B, FIG. 1C, and FIG. 2A together with FIG. 2B, the audio scene classifiers 100 and 210 may extract the first audio signal $AS_t$ from the multi-channel audio signal MCAS. For example, the first audio signal $AS_t$ may include C/L/R/SL/SR channel signals of the multi-channel audio signal MCAS. The first audio signal $AS_t$ may correspond to the first frame.

The audio scene classifiers 100 and 210 may classify a scene corresponding to the first audio signal $AS_t$. For example, the scene corresponding to the first audio signal $AS_t$ may be classified as one type from among a dialogue type, a sound effect type, and a music type. The classification accuracy of the audio scene classifiers 100 and 200 according to an embodiment of the disclosure is summarized in Table 2 shown below.

TABLE 2

| | | Prediction | | |
|---|---|---|---|---|
| | | Dialogue | Sound effect | Music |
| Ground Truth | Dialogue | 98.0% | 1.1% | 0.1% |
| | Sound effect | 0.9% | 85.1% | 14.0% |
| | Music | 6.2% | 3.9% | 89.9% |

Referring to Table 2, when the ground truth of the first audio signal $AS_t$ is the dialogue type, the audio scene classifiers 100 and 210 estimate the first audio signal $AS_t$ as the dialogue type with 98.0% accuracy. When the ground truth of the first audio signal $AS_t$ is the sound effect type, the audio scene classifiers 100 and 210 estimate the first audio signal $AS_t$ as the sound effect type with 85.1% accuracy. When the ground truth of the first audio signal $AS_t$ is the music type, the audio scene classifiers 100 and 210 estimate the first audio signal $AS_t$ as the music type with 89.9% accuracy. The average classification accuracy of the audio scene classifiers 100 and 210 is 95.8%, and a scene corresponding to a specific frame of an audio signal may be classified with improved accuracy.

Figure 3A:
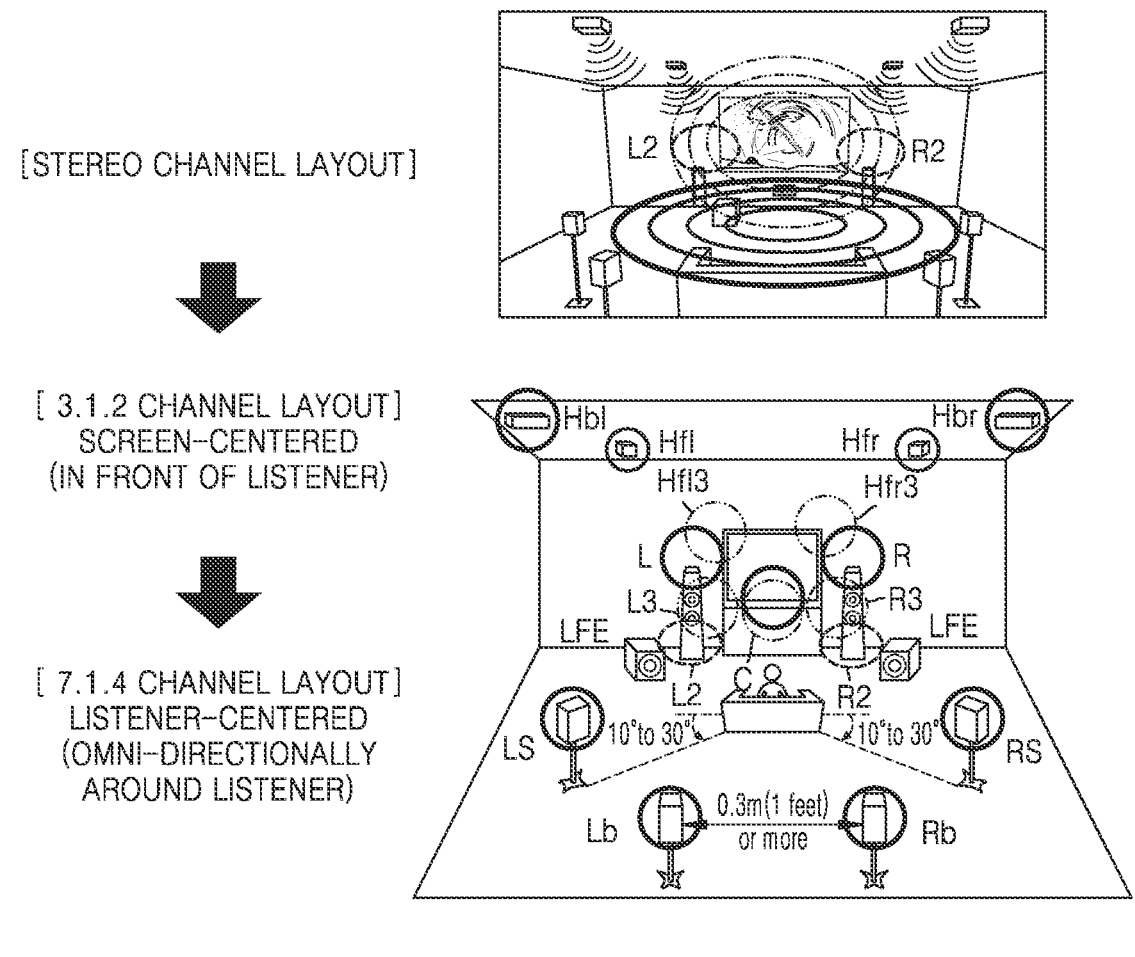
FIG. 3A is a diagram for describing a scalable audio channel layout structure according to an embodiment of the disclosure.

FIG. 3A is a diagram for describing a scalable channel layout structure according to an embodiment of the disclosure.

A related-art 3D audio decoding apparatus receives a compressed audio signal of independent channels of a particular channel layout from a bitstream. The related-art 3D audio decoding apparatus reconstructs an audio signal of a 3D audio channel omni-directionally around the listener by using the compressed audio signal of the independent channels received from the bitstream. In this case, only the audio signal of the particular channel layout may be reconstructed.

Alternatively, the related-art 3D audio decoding apparatus receives the compressed audio signal of the independent channels (a first independent channel group) of the particular channel layout from the bitstream. For example, the particular channel layout may be a 5.1 channel layout, and in this case, the compressed audio signal of the first independent channel group may be a compressed audio signal of five surround channels and one subwoofer channel.

Herein, to increase the number of channels, the related-art 3D audio decoding apparatus further receives a compressed audio signal of other channels (a second independent channel group) that are independent of the first independent channel group. For example, the compressed audio signal of the second independent channel group may be a compressed audio signal of two height channels.

That is, the related-art 3D audio decoding apparatus reconstructs an audio signal of a 3D audio channel omni-directionally around the listener by using the compressed audio signal of the second independent channel group received from the bitstream, separately from the compressed audio signal of the first independent channel group received from the bitstream. Thus, an audio signal of an increased number of channels is reconstructed. Herein, the audio signal of the 3D audio channel omni-directionally around the listener may be an audio signal of a 5.1.2 channel.

On the other hand, a legacy audio decoding apparatus that supports only reproduction of the audio signal of the stereo channel does not properly process the compressed audio signal included in the bitstream.

The related-art 3D audio decoding apparatus supporting reproduction of a 3D audio signal first decompresses (decodes) the compressed audio signals of the first independent channel group and the second independent channel group to reproduce the audio signal of the stereo channel. Then, the related-art 3D audio decoding apparatus up-mixes the audio signal generated by decompression. However, in order to reproduce the audio signal of the stereo channel, an operation such as up-mixing has to be performed.

Therefore, a scalable channel layout structure capable of processing a compressed audio signal in a legacy audio decoding apparatus is required. In addition, in audio decoding apparatus 500 and the audio decoding apparatus 700 that support reproduction of a 3D audio signal according to an embodiment of the disclosure, a scalable channel layout structure capable of processing a compressed audio signal according to a reproduction-supported 3D audio channel layout is required. Here, the scalable channel layout structure may mean a layout structure where the number of channels may freely increase from the base channel layout.

The audio decoding apparatus 500 and the audio decoding apparatus 700 according to an embodiment of the disclosure may reconstruct an audio signal of the scalable channel layout structure from the bitstream. With the scalable channel layout structure according to an embodiment of the disclosure, the number of channels may increase from a stereo channel layout 300 to a 3D audio channel layout 310 in front of the listener. Moreover, with the scalable channel layout structure, the number of channels may increase from the 3D audio channel layout in front of the listener 310 to a 3D audio channel layout 320 located omni-directionally around the listener (or a 3D audio channel layout omni-directionally around the listener 320). For example, the 3D audio channel layout in front of the listener 310 may be a 3.1.2 channel layout. The 3D audio channel layout omni-directionally around the listener 320 may be a 5.1.2 or 7.1.2 channel layout. However, the scalable channel layout that may be implemented in the disclosure is not limited thereto.

As the base channel group, the audio signal of the related-art stereo channel may be compressed. The legacy audio decoding apparatus may decompress the compressed audio signal of the base channel group from the bitstream, thus smoothly reproducing the audio signal of the related-art stereo channel.

Additionally, as a dependent channel group, an audio signal of a channel other than the audio signal of the related-art stereo channel out of the multi-channel audio signal may be compressed.

However, in a process of increasing the number of channels, a portion of the audio signal of the channel group may be an audio signal in which signals of some independent channels of the audio signals of the particular channel layout are mixed.

Accordingly, in the audio decoding apparatus 500 and the audio decoding apparatus 700, a portion of the audio signal of the base channel group and a portion of the audio signal of the dependent channel group may be de-mixed to generate the audio signal of the up-mixed channel included in the particular channel layout.

One or more dependent channel groups may exist. For example, the audio signal of the channel other than the audio signal of the stereo channel out of the audio signal of the 3D audio channel layout in front of the listener 310 may be compressed as an audio signal of the first dependent channel group.

The audio signal of the channel other than the audio signal of channels reconstructed from the base channel group and the first dependent channel group, out of the audio signal of the 3D audio channel layout omni-directionally around the listener 320, may be compressed as the audio signal of the second dependent channel group.

The audio decoding apparatus 500 and the audio decoding apparatus 700 according to an embodiment of the disclosure may support reproduction of the audio signal of the 3D audio channel layout omni-directionally around the listener 320.

Thus, the audio decoding apparatus 500 and the audio decoding apparatus 700 according to an embodiment of the disclosure may reconstruct the audio signal of the 3D audio channel layout omni-directionally around the listener 320, based on the audio signal of the base channel group and the audio signal of the first dependent channel group and the second dependent channel group.

The legacy audio signal processing apparatus may ignore a compressed audio signal of a dependent channel group that may not be reconstructed from the bitstream, and reproduce the audio signal of the stereo channel reconstructed from the bitstream.

Similarly, the audio decoding apparatus 500 and the audio decoding apparatus 700 may process the compressed audio signal of the base channel group and the dependent channel group to reconstruct the audio signal of the supportable channel layout out of the scalable channel layout. The audio decoding apparatus 500 and the audio decoding apparatus 700 may not reconstruct the compressed audio signal regarding a non-supported higher channel layout from the bitstream. Accordingly, the audio signal of the supportable channel layout may be reconstructed from the bitstream, while ignoring the compressed audio signal related to the higher channel layout that is not supported by the audio decoding apparatus 500 and the audio decoding apparatus 700.

In particular, related-artaudio encoding and decoding apparatuses compress and decompress an audio signal of an independent channel of a particular channel layout. Thus, compression and decompression of an audio signal of a limited channel layout are possible.

However, by the audio encoding apparatus 400 and the audio encoding apparatus 600 and the audio decoding apparatus 500 and the audio decoding apparatus 700 according to an embodiment of the disclosure, which support a scalable channel layout, transmission and reconstruction of an audio signal of a stereo channel may be possible. With the audio encoding apparatus 400 and the audio encoding apparatus 600 and the audio decoding apparatus 500 and the audio decoding apparatus 700 according to an embodiment of the disclosure, transmission and reconstruction of an audio signal of a 3D channel layout in front of the listener may be possible. With the audio encoding apparatus 400 and the audio encoding apparatus 600 and the audio decoding apparatus 500 and the audio decoding apparatus 700 according to an embodiment of the disclosure, transmission and reconstruction of an audio signal of a 3D channel layout in front of the listener may be possible.

In other words, the audio encoding apparatus 400 and the audio encoding apparatus 600 and the audio decoding apparatus 500 and the audio decoding apparatus 700 may transmit and reconstruct an audio signal according to a layout of a stereo channel. Furthermore, the audio encoding apparatus 400 and the audio encoding apparatus 600 and the audio decoding apparatus 500 and the audio decoding apparatus 700 may freely transform audio signals of a current channel layout into audio signals of a different channel layout. Through mixing/de-mixing between audio signals of channels included in different channel layouts, conversion between channel layouts may be possible. The audio encoding apparatus 400 and the audio encoding apparatus 600 and the audio decoding apparatus 500 and the audio decoding apparatus 700 according to an embodiment of the disclosure may support conversion between various channel layouts and thus transmit and reproduce audio signals of various 3D channel layouts. That is, between a channel layout in front of the listener and a channel layout omni-directionally around the listener or between a stereo channel layout and the stereo front channel layout, channel dependency is not guaranteed, but free conversion may be possible through mixing/de-mixing of audio signals.

The audio encoding apparatus 400 and the audio encoding apparatus 600 and the audio decoding apparatus 500 and the audio decoding apparatus 700 according to an embodiment of the disclosure support processing of an audio signal of a channel layout in front of the listener and thus transmit and reconstruct an audio signal corresponding to a speaker arranged around the screen, thereby improving a sensation of immersion of the listener.

Detailed operations of the audio encoding apparatus 400 and the audio encoding apparatus 600 and the audio decoding apparatus 500 and the audio decoding apparatus 700 are described later with reference to FIG. 4A, FIG. 4B, FIG. 4C, FIG. 4D, FIG. 5A, FIG. 5B, FIG. 5C, FIG. 5D, FIG. 6A, FIG. 6B, FIG. 7A, and FIG. 7B.

Figure 3B:
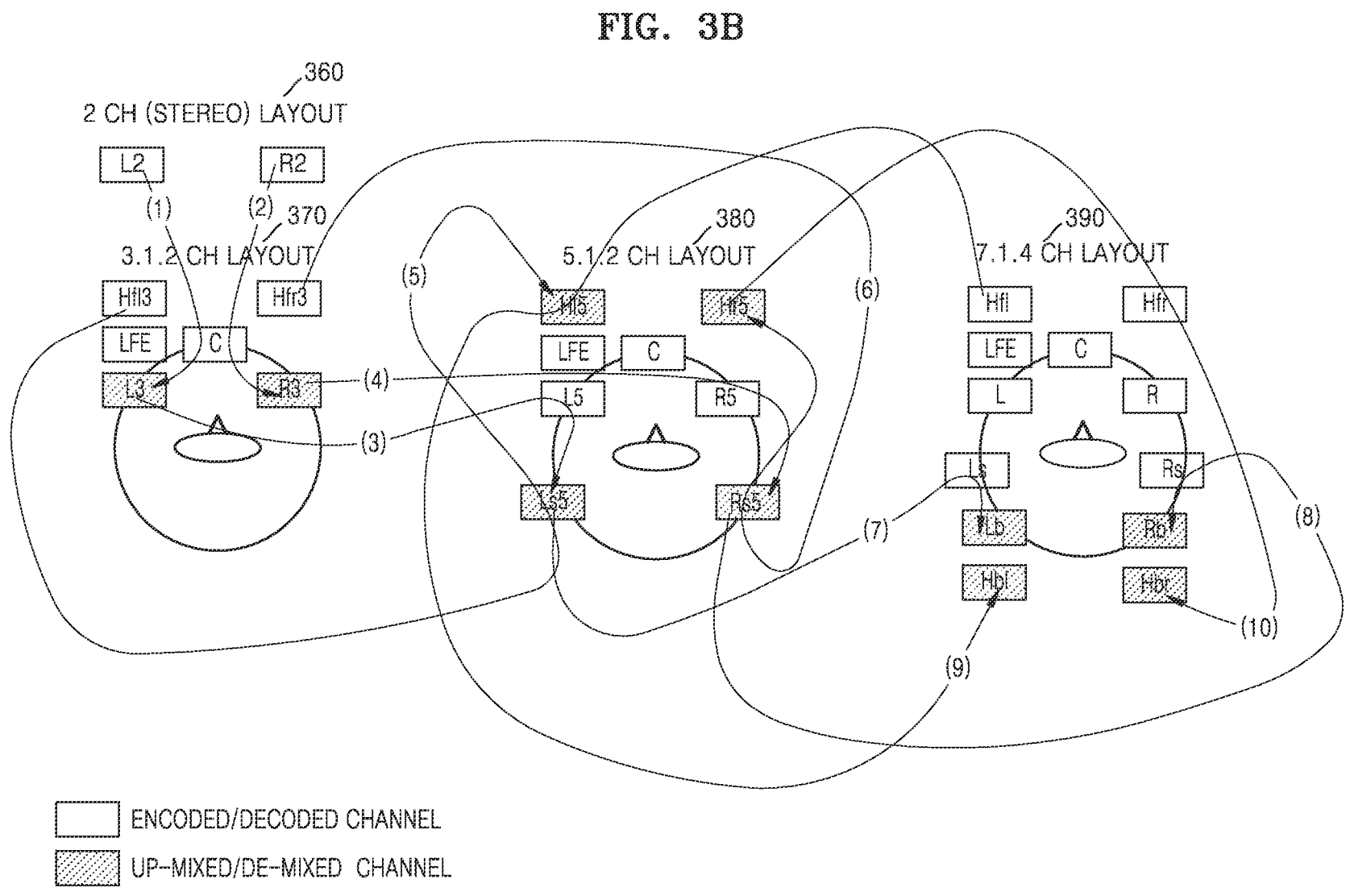

FIG. 3B is a diagram for describing an example of a scalable audio channel layout structure.

Referring to FIG. 3B, to transmit an audio signal of a stereo channel layout 360, the audio encoding apparatus 400 and the audio encoding apparatus 600 may generate a compressed audio signal (A/B signal) of the base channel group by compressing an L2/R2 signal.

In this case, the audio encoding apparatus 400 and the audio encoding apparatus 600 may generate the audio signal of the base channel group by compressing the L2/R2 signal.

Moreover, to transmit an audio signal of a layout 370 of a 3.1.2 channel that is one of 3D audio channels in front of the listener, the audio encoding apparatus 400 and the audio encoding apparatus 600 may generate a compressed audio signal of a dependent channel group by compressing C, LFE, Hfl3, and Hfr3 signals. The audio decoding apparatus 500 and the audio decoding apparatus 700 may reconstruct the L2/R2 signal by decompressing the compressed audio signal of the base channel group. The audio decoding apparatus 500 and the audio decoding apparatus 700 may reconstruct the C, LFE, Hfl3, and Hfr3 signals by decompressing the compressed audio signal of the dependent channel group.

The audio decoding apparatus 500 and the audio decoding apparatus 700 may reconstruct an L3 signal of the 3.1.2 channel layout 370 by de-mixing the L2 signal and the C signal (1). The audio decoding apparatus 500 and the audio decoding apparatus 700 may reconstruct an R3 signal of the 3.1.2 channel layout 170 by de-mixing the R2 signal and the C signal (2).

As a result, the audio decoding apparatus 500 and the audio decoding apparatus 700 may output the L3, R3, C, Lfe, Hfl3, and Hfr3 signals as the audio signal of the 3.1.2 channel layout 370.

TTo transmit the audio signal of a 5.1.2 channel layout omni-directionally around the listener 380, the audio encoding apparatus 400 and the audio encoding apparatus 600 may further compress L5 and R5 signals to generate a compressed audio signal of the second dependent channel group.

As described above, the audio decoding apparatus 500 and the audio decoding apparatus 700 may reconstruct the L2/R2 signal by decompressing the compressed audio signal of the base channel group and reconstruct the C, LFE, Hfl3, and Hfr3 signals by decompressing the compressed audio signal of the first dependent channel group. In addition, the audio decoding apparatus 500 and the audio decoding apparatus 700 may reconstruct the L5 and R5 signals by decompressing the compressed audio signal of the second dependent channel group. Moreover, as described above, the audio decoding apparatus 500 and the audio decoding apparatus 700 may reconstruct the L3 and R3 signals by de-mixing some of the decompressed audio signals.

In addition, the audio decoding apparatus 500 and the audio decoding apparatus 700 may reconstruct an Ls5 signal by de-mixing the L3 and L5 signals (3). The audio decoding apparatus 500 and the audio decoding apparatus 700 may reconstruct an Rs5 signal by de-mixing the R3 and R5 signals (4).

The audio decoding apparatus 500 and the audio decoding apparatus 700 may reconstruct an Hl5 signal by de-mixing the Hfl3 and Ls5 signals (5).

The audio decoding apparatus 500 and the audio decoding apparatus 700 may reconstruct a Hr5 signal by de-mixing the Hfr3 and Rs5 signals (6). Hfr3 and Hr5 are front right channels among height channels.

As a result, the audio decoding apparatus 500 and the audio decoding apparatus 700 may output the Hl5, Hr5, LFE, L, R, C, Ls5, and Rs5 signals as audio signals of the 5.1.2 channel layout 380.

To transmit an audio signal of a 7.1.4 channel layout 390, the audio encoding apparatus 400 and the audio encoding apparatus 600 may further compress the Hfl, Hfr, Ls, and Rs signals as audio signals of a third dependent channel group.

As described above, the audio decoding apparatus 500 and the audio decoding apparatus 700 may decompress the compressed audio signal of the base channel group, the compressed audio signal of the first dependent channel group, and the compressed audio signal of the second dependent channel group and reconstruct the Hl5, Hr5, LFE, L, R, C, Ls5, and Rs5 signals through de-mixing (1), (2), (3), (4), (5), and (6).

In addition, the audio decoding apparatus 500 and the audio decoding apparatus 700 may reconstruct the Hfl, Hfr, Ls, and Rs signals by decompressing the compressed audio signal of the third dependent channel group. The audio decoding apparatus 500 and the audio decoding apparatus 700 may reconstruct a Lb signal of a 7.1.4 channel layout 390 by (7) de-mixing the Ls5 signal and the Ls signal.

The audio decoding apparatus 500 and the audio decoding apparatus 700 may reconstruct an Rb signal of the 7.1.4 channel layout 190 by (8) de-mixing the Rs5 signal and the Rs signal.

The audio decoding apparatus 500 and the audio decoding apparatus 700 may reconstruct an Hbl signal of the 7.1.4 channel layout 190 by (9) de-mixing the Hfl signal and the Hl5 signal.

The audio decoding apparatus 500 and the audio decoding apparatus 700 may reconstruct an Hbr signal of the 7.1.4 channel layout 190 by (10) de-mixing the Hfr signal and the Hr5 signal.

As a result, the audio decoding apparatus 500 and the audio decoding apparatus 700 may output the Hfl, Hfr, LFE, C, L, R, Ls, Rs, Lb, Rb, Hbl, and Hbr signals as audio signals of the 7.1.4 channel layout 390.

Thus, the audio decoding apparatus 500 and the audio decoding apparatus 700 may reconstruct the audio signal of the 3D audio channel in front of the listener and the audio signal of the 3D audio channel omni-directionally around the listener as well as the audio signal of the related-art stereo channel layout, by supporting a scalable channel layout in which the number of channels is increased by a de-mixing operation.

A scalable channel layout structure described above in detail with reference to FIG. 3B is merely an example, and a channel layout structure may be implemented scalable to include various channel layouts.

Figure 4A:
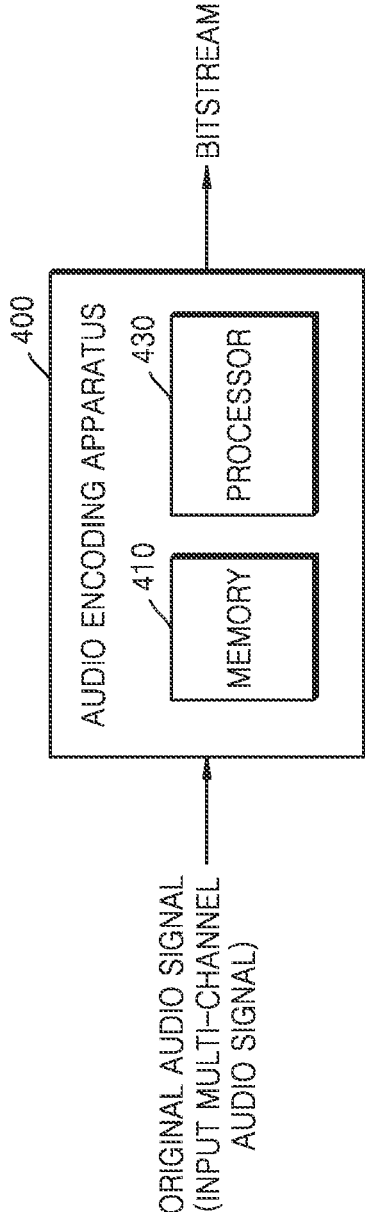
FIG. 4A is a block diagram of an audio encoding apparatus according to an embodiment of the disclosure.

FIG. 4A is a block diagram of an audio encoding apparatus according to an embodiment of the disclosure.

An audio encoding apparatus 400 may include a memory 410 and a processor 430. The audio encoding apparatus 400 may be implemented as an apparatus capable of performing audio processing such as a server, a TV, a camera, a cellular phone, a tablet personal computer (PC), a laptop computer, etc.

While the memory 410 and the processor 430 are shown separately in FIG. 4A, the memory 410 and the processor 430 may be implemented through one hardware module (e.g., a chip).

The processor 430 may be implemented as a dedicated processor for audio processing based on a neural network. Alternatively, the processor 430 may be implemented through a combination of a general-purpose processor, such as an application processor (AP), a central processing unit (CPU), or a graphics processing unit (GPU), and software. The dedicated processor may include a memory for implementing an embodiment of the disclosure or a memory processor for using external memory.

The processor 430 may include a plurality of processors. In this case, the processor 330 may be implemented as a combination of dedicated processors, or may be implemented through a combination of software and a plurality of general-purpose processors such as an AP, a CPU, or a GPU.

The memory 410 may store one or more instructions for audio processing. In an embodiment of the disclosure, the memory 410 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 410. The neural network may be implemented by an external device (e.g., a server), and in this case, the audio encoding apparatus 400 may request and receive result information based on the neural network from the external device.

The processor 430 may sequentially process successive frames according to an instruction stored in the memory 410 and obtain successive encoded (compressed) frames. The successive frames may refer to frames that constitute audio.

The processor 430 may perform an audio processing operation with the original audio signal as an input and output a bitstream including a compressed audio signal. In this case, the original audio signal may be a multi-channel audio signal. The compressed audio signal may be a multi-channel audio signal having channels of a number less than or equal to the number of channels of the original audio signal.

The processor 430 may perform at least some of functions of the audio scene classifiers 100 and 210 and the multi-channel audio signal processor 200 in FIG. 1A, FIG. 1B, FIG. 1C, FIG. 1D, and FIG. 2A.

In this case, the bitstream may include a base channel group, and furthermore, n dependent channel groups (n is an integer greater than or equal to 1). Thus, according to the number of dependent channel groups, the number of channels may be freely increased.

Figure 4B:
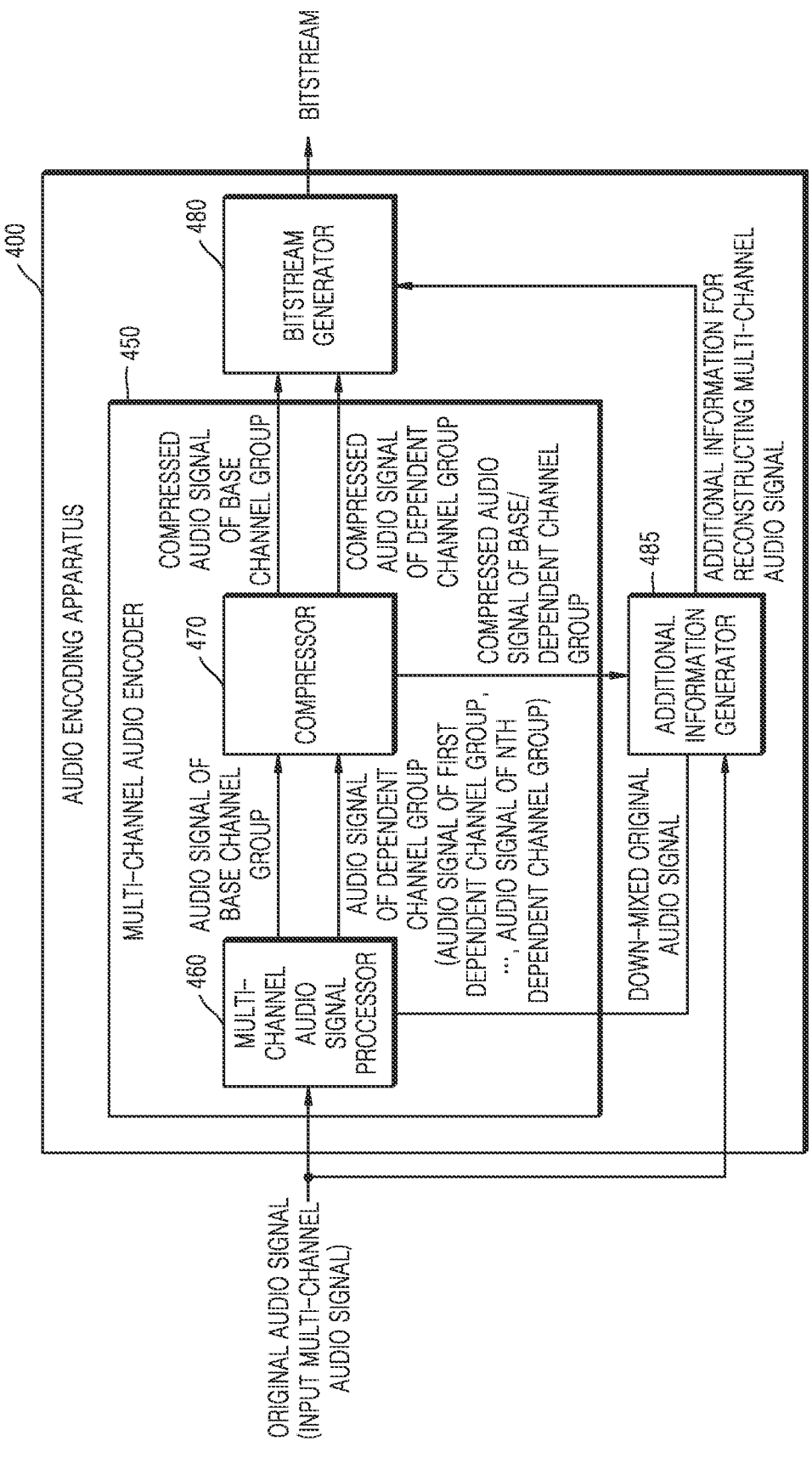
FIG. 4B is a block diagram of an audio encoding apparatus according to an embodiment of the disclosure.

FIG. 4B is a block diagram of an audio encoding apparatus according to an embodiment of the disclosure.

Referring to FIG. 4B, the audio encoding apparatus 400 may include a multi-channel audio encoder 450, a bitstream generator 480, and an additional information generator 485. The multi-channel audio encoder 450 may include a multi-channel audio signal processor 460 and a compressor 470.

Referring back to FIG. 4A, as described above, the audio encoding apparatus 400 may include the memory 410 and the processor 430, and an instruction for implementing the components such as the multi-channel audio encoder 450, the multi-channel audio signal processor 460, the compressor 470, the bitstream generator 480, and the additional information generator 485 of FIG. 4B may be stored in the memory 410 of FIG. 4A. The processor 430 may execute the instruction stored in the memory 410. The elements, such as the multi-channel audio encoder 450, the multi-channel audio signal processor 460, the compressor 470, the bitstream generator 480, and the additional information generator 485, shown in FIG. 4B may be obtained by classifying operations performed by the processor 430 executing a program (or instruction) stored in the memory 410 according to functions. Accordingly, operations described below as being performed by the elements, such as the multi-channel audio encoder 450, the multi-channel audio signal processor 460, the compressor 470, the bitstream generator 480, and the additional information generator 485, shown in FIG. 4B may be considered as actually being performed by the processor 430.

The multi-channel audio signal processor 460 may obtain at least one audio signal of a base channel group and at least one audio signal of at least one dependent channel group from the original audio signal. For example, when the original audio signal is an audio signal of a 7.1.4 channel layout, the multi-channel audio signal processor 460 may obtain an audio signal of a 2-channel (stereo channel) as an audio signal of a base channel group in an audio signal of a 7.1.4 channel layout.

The multi-channel audio signal processor 460 may obtain an audio signal of a channel other than an audio signal of a 2-channel, out of an audio signal of a 3.1.2 channel layout, as the audio signal of the first dependent channel group, to reconstruct the audio signal of the 3.1.2 channel layout, which is one of the 3D audio channels in front of the listener. In this case, audio signals of some channels of the first dependent channel group may be de-mixed to generate an audio signal of a de-mixed channel.

The multi-channel audio signal processor 460 may obtain an audio signal of a channel other than an audio signal of the base channel group and an audio signal of the first dependent channel group, out of an audio signal of a 5.1.2 channel layout, as an audio signal of the second dependent channel group, to reconstruct the audio signal of the 5.1.2 channel layout, which is one of the 3D audio channels in front of and behind the listener. In this case, audio signals of some channels of the second dependent channel group may be de-mixed to generate an audio signal of a de-mixed channel.

The multi-channel audio signal processor 460 may obtain an audio signal of a channel other than the audio signal of the first dependent channel group and the audio signal of the second dependent channel group, out of an audio signal of a 7.1.4 channel layout, as an audio signal of the third dependent channel group, to reconstruct the audio signal of the 7.1.4 channel layout, which is one of the 3D audio channels omni-directionally around the listener. Likewise, audio signals of some channels of the third dependent channel group may be de-mixed to obtain an audio signal of a de-mixed channel.

A detailed operation of the multi-channel audio signal processor 460 will be described later with reference to FIG. 4C.

The compressor 470 may compress the audio signal of the base channel group and the audio signal of the dependent channel group. That is, the compressor 470 may compress at least one audio signal of the base channel group to obtain at least one compressed audio signal of the base channel group. Herein, compression may mean compression based on various audio codecs. For example, compression may include transformation and quantization processes.

Herein, the audio signal of the base channel group may be a mono or stereo signal. Alternatively, the audio signal of the base channel group may include an audio signal of a first channel generated by mixing an audio signal L of a left stereo channel with C_1. Here, C_1 may be an audio signal of a center channel of the front of the listener, decompressed after compressed. In the name ("X_Y") of an audio signal, "X" may represent the name of a channel, and "Y" may represent being decoded, being up-mixed, an error removal factor being applied (i.e., being scaled), or an LFE gain being applied. For example, a decoded signal may be expressed as "X_1", and a signal generated by up-mixing the decoded signal (an up-mixed signal) may be expressed as "X_2". Alternatively, a signal to which the LFE gain is applied to the decoded LFE signal may also be expressed as "X_2". A signal to which the error removal factor is applied (i.e., a scaled signal) to the up-mixed signal may be expressed as "X_3".

The audio signal of the base channel group may include an audio signal of a second channel generated by mixing an audio signal R of a right stereo channel with C_1.

The compressor 470 may obtain at least one compressed audio signal of at least one dependent channel group by compressing at least one audio signal of at least one dependent channel group.

The additional information generator 485 may generate additional information based on at least one of the original audio signal, the compressed audio signal of the base channel group, or the compressed audio signal of the dependent channel group. In this case, the additional information may be information related to a multi-channel audio signal and include various pieces of information for reconstructing the multi-channel audio signal.

For example, the additional information may include an audio object signal of a 3D audio channel in front of the listener indicating at least one of an audio signal, a position, a shape, an area, or a direction of an audio object (sound source). Alternatively, the additional information may include information about the total number of audio streams including a base channel audio stream and a dependent channel audio stream. The additional information may include down-mix gain information. The additional information may include channel mapping table information. The additional information may include volume information. The additional information may include LFE gain information. The additional information may include dynamic range control (DRC) information. The additional information may include channel layout rendering information. The additional information may also include information of the number of coupled audio streams, information indicating a multi-channel layout, information about whether a dialogue exists in an audio signal and a dialogue level, information indicating whether an LFE is output, information about whether an audio object exists on the screen, information about existence or absence of an audio signal of a continuous audio channel (or a scene-based audio signal or an ambisonic audio signal), and information about existence or absence of an audio signal of a discrete audio channel (or an object-based audio signal or a spatial multi-channel audio signal). The additional information may include information about de-mixing including at least one de-mixing weight parameter of a de-mixing matrix for reconstructing a multi-channel audio signal. De-mixing and (down)mixing correspond to each other, such that information about de-mixing may correspond to information about (down)mixing, and the information about de-mixing may include the information about (down)mixing. For example, the information about de-mixing may include at least one (down)mixing weight parameter of a (down)mixing matrix. A de-mixing weight parameter may be obtained based on the (down)mixing weight parameter.

The additional information may be various combinations of the aforementioned pieces of information. In other words, the additional information may include at least one of the aforementioned pieces of information.

When there is an audio signal of a dependent channel corresponding to at least one audio signal of the base channel group, the additional information generator 485 may generate dependent channel audio signal identification information indicating that the audio signal of the dependent channel exists.

The bitstream generator 480 may generate a bitstream including the compressed audio signal of the base channel group and the compressed audio signal of the dependent channel group. The bitstream generator 480 may generate a bitstream further including the additional information generated by the additional information generator 485.

More specifically, the bitstream generator 480 may generate a base channel audio stream and a dependent channel audio stream. The base channel audio stream may include the compressed audio signal of the base channel group, and the dependent channel audio stream may include the compressed audio signal of the dependent channel group.

The bitstream generator 480 may generate a bitstream including the base channel audio stream and a plurality of dependent channel audio streams. The plurality of dependent channel audio streams may include n dependent channel audio streams (n is an integer greater than 1). In this case, the base channel audio stream may include an audio signal of a mono channel or a compressed audio signal of a stereo channel.

For example, among channels of a first multi-channel layout reconstructed from the base channel audio stream and the first dependent channel audio stream, the number of surround channels may be $S_{n-1}$, the number of subwoofer channels may be $W_{n-1}$, and the number of height channels may be $H_{n-1}$ In a second multi-channel layout reconstructed from the base channel audio stream, the first dependent channel audio stream, and the second dependent channel audio stream, the number of surround channels may be $S_n$, the number of subwoofer channels may be $W_n$, and the number of height channels may be $H_n$.

In this case, $S_{n-1}$ may be less than or equal to $S_n$, $W_{n-1}$ may be less than or equal to $W_n$, and $H_{n-1}$ may be less than or equal to $H_n$. Herein, a case where $S_{n-1}$ is equal to $S_n$, $W_{n-1}$ is equal to $W_n$, and $H_{n-1}$ is equal to $H_n$ may be excluded.

That is, the number of surround channels of the second multi-channel layout needs to be greater than the number of surround channels of the first multi-channel layout. Alternatively, the number of subwoofer channels of the second multi-channel layout needs to be greater than the number of subwoofer channels of the first multi-channel layout. Alternatively, the number of height channels of the second multi-channel layout needs to be greater than the number of height channels of the first multi-channel layout.

Moreover, the number of surround channels of the second multi-channel layout may not be less than the number of surround channels of the first multi-channel layout. Likewise, the number of subwoofer channels of the second multi-channel layout may not be less than the number of subwoofer channels of the first multi-channel layout. The number of height channels of the second multi-channel layout may not be less than the number of height channels of the first multi-channel layout.

In addition, the case where the number of surround channels of the second multi-channel layout is equal to the number of surround channels of the first multi-channel layout and the number of subwoofer channels of the second multi-channel layout is equal to the number of subwoofer channels of the first multi-channel layout and the number of height channels of the second multi-channel layout is equal to the number of height channels of the first multi-channel layout does not exist. That is, all channels of the second multi-channel layout may not be the same as all channels of the first multi-channel layout.

More specifically, for example, when the first multi-channel layout is the 5.1.2 channel layout, the second multi-channel layout may be the 7.1.4 channel layout.

In addition, the bitstream generator 480 may generate metadata including additional information.

As a result, the bitstream generator 480 may generate a bitstream including the base channel audio stream, the dependent channel audio stream, and the metadata.

The bitstream generator 480 may generate a bitstream in a form in which the number of channels may freely increase from the base channel group.

That is, the audio signal of the base channel group may be reconstructed from the base channel audio stream, and the multi-channel audio signal in which the number of channels increases from the base channel group may be reconstructed from the base channel audio stream and the dependent channel audio stream.

The bitstream generator 480 may generate a file stream having a plurality of audio tracks. The bitstream generator 480 may generate an audio stream of a first audio track including at least one compressed audio signal of the base channel group. The bitstream generator 480 may generate an audio stream of a second audio track including dependent channel audio signal identification information. In this case, the second audio track, which follows the first audio track, may be adjacent to the first audio track.

When there is a dependent channel audio signal corresponding to at least one audio signal of the base channel group, the bitstream generator 480 may generate an audio stream of the second audio track including at least one compressed audio signal of at least one dependent channel group.

When there is no dependent channel audio signal corresponding to at least one audio signal of the base channel group, the bitstream generator 480 may generate the audio stream of the second audio track including the next audio signal of a base channel group with respect to the audio signal of the first audio track of the base channel group.

Figure 4C:
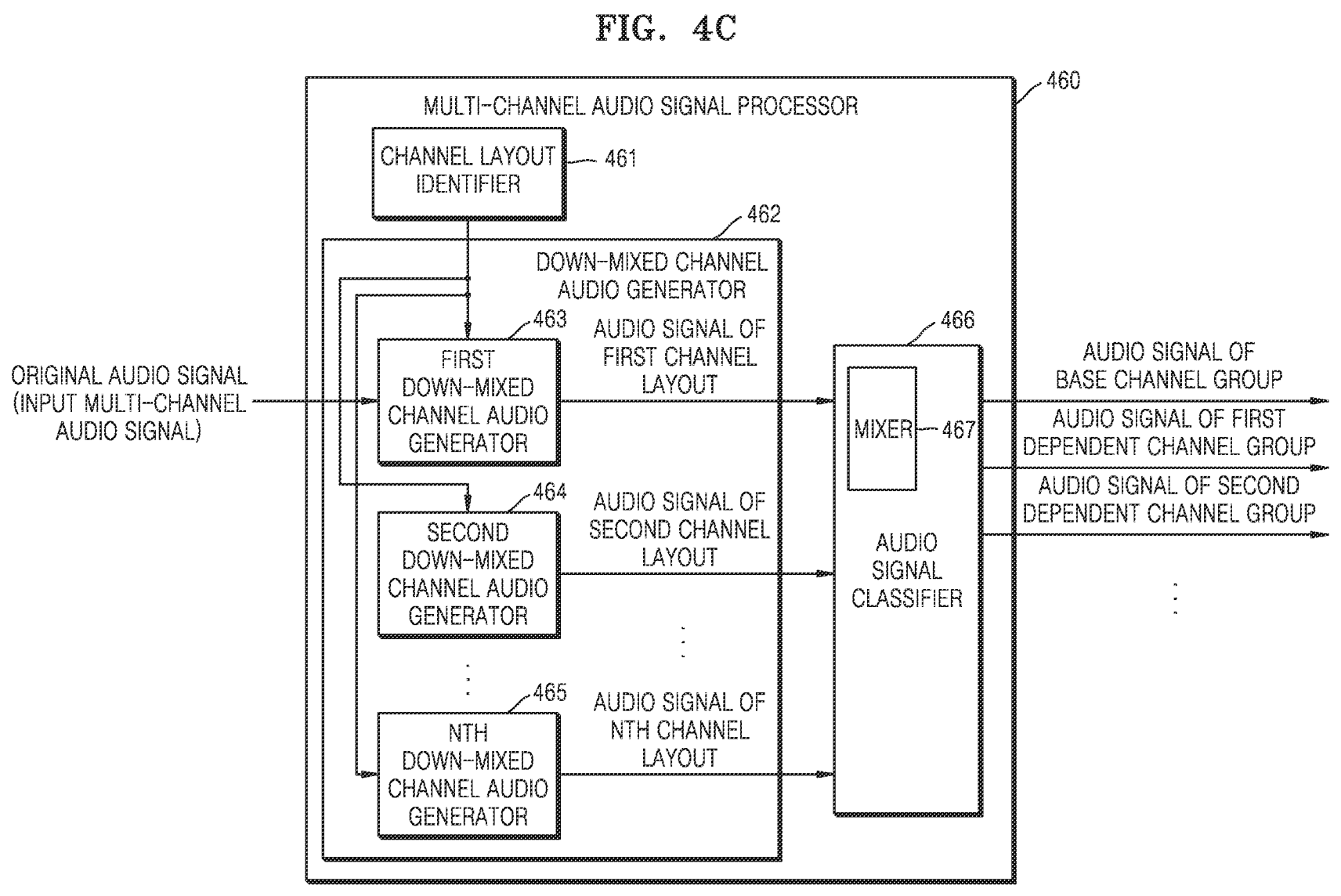

FIG. 4C is a block diagram of a multi-channel audio signal processor 460 according to an embodiment of the disclosure.

Referring to FIG. 4C, the multi-channel audio signal processor 460 may include a channel layout identifier 461, a down-mixed channel audio generator 462, and an audio signal classifier 466.

The channel layout identifier 461 may identify at least one channel layout from the original audio signal. In this case, the at least one channel layout may include a plurality of hierarchical channel layouts. The channel layout identifier 461 may identify a channel layout of the original audio signal. The channel layout identifier 461 may identify a channel layout that is lower than the channel layout of the original audio signal. For example, when the original audio signal is an audio signal of the 7.1.4 channel layout, the channel layout identifier 461 may identify the 7.1.4 channel layout and identify the 5.1.2 channel layout, the 3.1.2 channel layout, the 2 channel layout, etc., that are lower than the 7.1.4 channel layout. A higher channel layout may mean a layout in which the number of at least one of surround channels/subwoofer channels/height channels is greater than that of a lower channel layout. Depending on whether the number of surround channels is large or small, a higher/lower channel layout may be determined, and for the same number of surround channels, the higher/lower channel layout may be determined depending on whether the number of subwoofer channels is large or small. For the same number of surround channels and subwoofer channels, the higher/lower channel layout may be determined depending on whether the number of height channels is large or small.

In addition, the identified channel layout may include a target channel layout. The target channel layout may mean the highest channel layout of an audio signal included in a finally output bitstream. The target channel layout may be a channel layout of the original audio signal or a lower channel layout than the channel layout of the original audio signal.

More specifically, a channel layout identified from the original audio signal may be hierarchically determined from the channel layout of the original audio signal. In this case, the channel layout identifier 461 may identify at least one channel layout among predetermined channel layouts. For example, the channel layout identifier 461 may identify some of predetermined channel layouts, the 7.1.4 channel layout, the 5.1.4 channel layout, the 5.1.2 channel layout, the 3.1.2 channel layout, and the 2 channel layout, from the layout of the original audio signal.

The channel layout identifier 461 may transfer a control signal to a down-mixed channel audio generator corresponding to at least one identified channel layout from among a first down-mixed channel audio generator 463, a second down-mixed channel audio generator 464, . . . , an $N^{th}$ down-mixed channel audio generator 465 based on the identified channel layout, and the down-mixed channel audio generator 462 may generate a down-mixed channel audio from the original audio signal based on the at least one channel layout identified in the channel layout identifier 461. The down-mixed channel audio generator 462 may generate the down-mixed channel audio from the original audio signal by using a down-mixing matrix including at least one down-mixing weight parameter.

For example, when the channel layout of the original audio signal is an $n^{th}$ channel layout in an ascending order among predetermined channel layouts, the down-mixed channel audio generator 462 may generate a down-mixed channel audio of an $(n-1)^{th}$ channel layout immediately lower than the channel layout of the original audio signal from the original audio signal. By repeating this process, the down-mixed channel audio generator 462 may generate down-mixed channel audios of lower channel layouts than the current channel layout.

For example, the down-mixed channel audio generator 462 may include the first down-mixed channel audio generator 463, the second down-mixed channel audio generator 464, and an $(n-1)^{th}$ down-mixed channel audio generator. $(n-1)$ may be less than or equal to N.

In this case, an $(n-1)^{th}$ down-mixed channel audio generator may generate an audio signal of an $(n-1)^{th}$ channel layout from the original audio signal. In addition, an $(n-2)^{th}$ down-mixed channel audio generator may generate an audio signal of an $(n-2)^{th}$ channel layout from the original audio signal. In this manner, the first down-mixed channel audio generator 463 may generate the audio signal of the first channel layout from the original audio signal. In this case, the audio signal of the first channel layout may be the audio signal of the base channel group.

Each of the first down-mixed channel audio generator 463, the second down-mixed channel audio generator 464, and the $(n-1)^{th}$ down-mixed channel audio generator 465 may be connected in a cascaded manner. That is, the down-mixed channel audio generators 463, 464, and 465 may be connected such that an output of a higher down-mixed channel audio generator becomes an input of the lower down-mixed channel audio generator. For example, the audio signal of the $(n-1)^{th}$ channel layout may be output from the $(n-1)^{th}$ down-mixed channel audio generator with the original audio signal as an input, and the audio signal of the $(n-1)^{th}$ channel layout may be input to the $(n-2)^{th}$ down-mixed channel audio generator and an $(n-2)^{th}$ down-mixed channel audio may be generated from an $(n-2)^{th}$ down-mixed channel audio generator. In this way, the first down-mixed channel audio generator 463, the second down-mixed channel audio generator 464, and the $(n-1)^{th}$ down-mixed channel audio generator 465 may be connected to output an audio signal of each channel layout.

The audio signal classifier 466 may obtain an audio signal of a base channel group and an audio signal of a dependent channel group, based on an audio signal of at least one channel layout. In this case, the audio signal classifier 466 may mix an audio signal of at least one channel included in an audio signal of at least one channel layout through a mixer 467. The audio signal classifier 466 may classify the mixed audio signal as at least one of an audio signal of the base channel group or an audio signal of the dependent channel group.

Figure 4D:
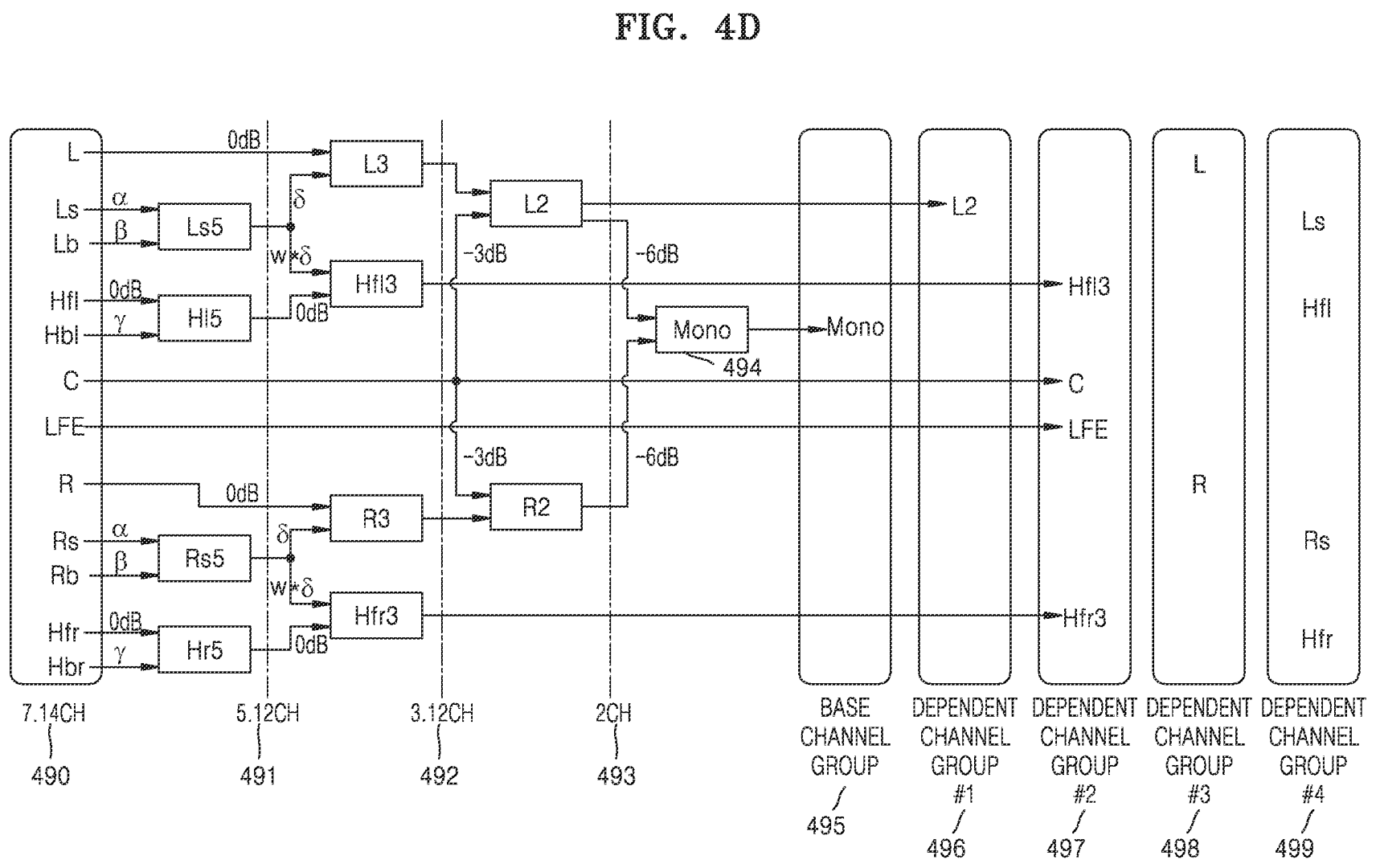

FIG. 4D is a diagram for describing detailed operations of an audio signal classifier 466.

Referring to FIG. 4D, the down-mixed channel audio generator 462 of FIG. 4C may obtain, from the original audio signal of the 7.1.4 channel layout 490, the audio signal of the 5.1.2 channel layout 491, the audio signal of the 3.1.2 channel layout 492, the audio signal of the 2 channel layout 493, and the audio signal of the mono channel layout 494, which are audio signals of lower channel layouts. The first down-mixed channel audio generator 463, the second down-mixed channel audio generator 464, and the $(n-1)^{th}$ down-mixed channel audio generator 465 of the down-mixed channel audio generator 462 are connected in a cascaded manner, such that audio signals may be obtained sequentially from the current channel layout to the lower channel layout.

The audio signal classifier 466 of FIG. 4C may classify the audio signal of the mono channel layout 494 as the audio signal of the base channel group 495.

The audio signal classifier 466 may classify the audio signal of the L2 channel that is a part of the audio signal of the 2 channel layout 493 as an audio signal of the dependent channel group #1 496. The audio signal of the L2 channel and the audio signal of the R2 channel are mixed to generate the audio signal of the mono channel layout 494, such that in reverse, the audio decoding apparatus 500 and the audio decoding apparatus 700 may de-mix the audio signal of the mono channel layout 494 and the audio signal of the L2 channel to reconstruct the audio signal of the R2 channel. Thus, the audio signal of the R2 channel may not be classified as an audio signal of a separate channel group.

The audio signal classifier 466 may classify the audio signal of the Hfl3 channel, the audio signal of the C channel, the audio signal of the LFE channel, and the audio signal of the Hfr3 channel, among the audio signals of the 3.1.2 channel layout 492, as an audio signal of a dependent channel group #2 497. The audio signal of the L2 channel is generated by mixing the audio signal of the L3 channel and the audio signal of the Hfl3 channel, such that in reverse, the audio decoding apparatus 500 and the audio decoding apparatus 700 may reconstruct the audio signal of the L2 channel of the dependent channel group #1 496 and the audio signal of the Hfl3 channel of the dependent channel group #2 497.

Thus, the audio signal of the L3 channel among the audio signals of the 3.1.2 channel layout 492 may not be classified as an audio signal of a particular channel group.

For the same reason, the R3 channel may not be classified as the audio signal of the particular channel group.

The audio signal classifier 466 may transmit the audio signal of the L channel and the audio signal of the R channel, which are audio signals of some channels of the 5.1.2 channel layout 491, as an audio signal of a dependent channel group #3 498, in order to transmit the audio signal of the 5.1.2 channel layout 491. The audio signal of one of the Ls5, Hl5, Rs5, and Hr5 channels may be one of the audio signals of the 5.1.2 channel layout 491, but may not be classified as an audio signal of a separate dependent channel group. This is because signals of the Ls5, Hl5, Rs5, and Hr5 channels may not be a channel audio signal in front of the listener, and may be a signal in which audio signals of at least one of audio channels in front of, beside, and behind the listener, among the audio signals of the 7.1.4 channel layout 490, may be mixed. By compressing the audio signal of the audio channel in front of the listener out of the original audio signal, rather than classifying the mixed signal as the audio signal of the dependent channel group and compressing the same, the sound quality of the audio signal of the audio channel in front of the listener may be improved. As a result, the listener may feel that the sound quality of the reproduced audio signal is improved.

However, according to circumstances, Ls5 or Hl5 instead of L may be classified as the audio signal of the dependent channel group #3 498, Rs5 or Hr5 instead of R may be classified as the audio signal of the dependent channel group #3 498.

The audio signal classifier 466 may classify the audio signal of the Ls, Hfl, Rs, or Hfr channel among the audio signals of the 7.1.4 channel layout 490 as an audio signal of a dependent channel group #4 499. In this case, Lb in place of Ls, Hbl in place of Hfl, Rb in place of Rs, and Hbr in place of Hfr may not be classified as the audio signal of the dependent channel group #4 499. By compressing the audio signal of the side audio channel close to the front of the listener rather than classifying the audio signal of the audio channel behind the listener among the audio signals of the 7.1.4 channel layout 490 as the audio signal of the channel group and compressing the same, the sound quality of the audio signal of the side audio channel close to the front of the listener may be improved. Thus, the listener may feel that the sound quality of the reproduced audio signal is improved. However, according to circumstances, Lb in place of Ls, Hbl in place of Hfl, Rb in place of Rs, and Hbr in place of Hfr may be classified as the audio signal of the dependent channel group #4 499.

As a result, the down-mixed channel audio generator 462 of FIG. 4C may generate an audio signal (a down-mixed channel audio) of a plurality of lower layouts based on a plurality of lower channel layouts identified from the original audio signal layout. The audio signal classifier 466 of FIG. 4C may classify the audio signal of the base channel group 495 and the audio signals of the dependent channel groups #1 496, the dependent channel group #2 497, the dependent channel group #3 498, and the dependent channel group #4 499. The classified audio signal of the channel may classify a part of the audio signal of the independent channel out of the audio signal of each channel as the audio signal of the channel group according to each channel layout. The audio decoding apparatus 500 and the audio decoding apparatus 700 may reconstruct the audio signal that is not classified by the audio signal classifier 466 through de-mixing. When the audio signal of the left channel with respect to the listener is classified as the audio signal of the particular channel group, the audio signal of the right channel corresponding to the left channel may be classified as the audio signal of the corresponding channel group. That is, the audio signals of the coupled channels may be classified as audio signals of one channel group.

When the audio signal of the stereo channel layout is classified as the audio signal of the base channel group 495, the audio signals of the coupled channels all may be classified as audio signals of one channel group. However, as described above with reference to FIG. 4D, when the audio signal of the mono channel layout is classified as the audio signal of the base channel group 495, exceptionally, one of audio signals of the stereo channel may be classified as the audio signal of the dependent channel group #1 496. However, a method of classifying an audio signal of a channel group may be various without being limited to the description made with reference to FIG. 4D. That is, when the classified audio signal of the channel group is de-mixed and an audio signal of a channel, which is not classified as an audio signal of a channel group, may be reconstructed from the de-mixed audio signal, then the audio signal of the channel group may be classified in various forms.

Figure 5A:
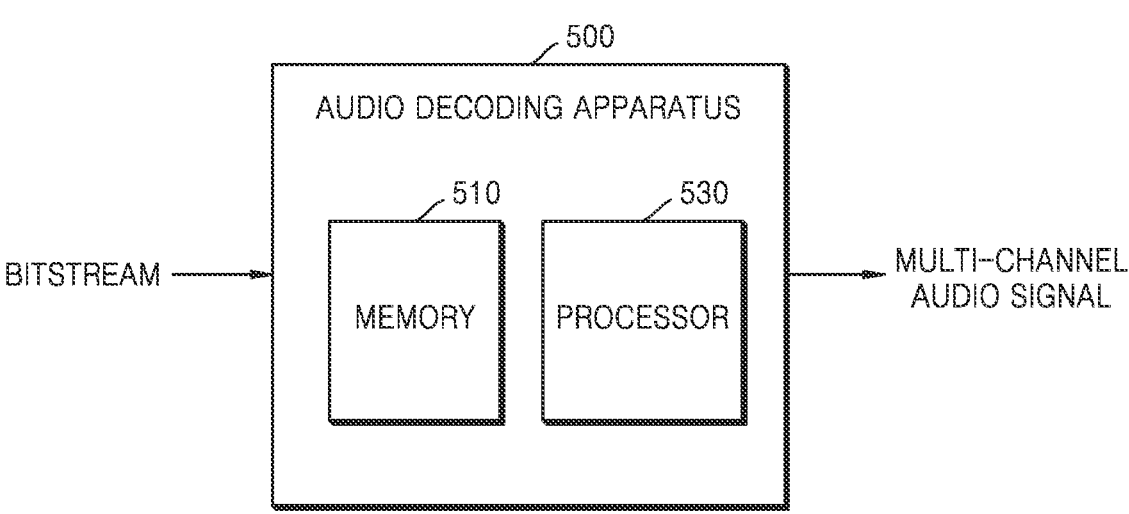
FIG. 5A is a block diagram of a multi-channel audio decoding apparatus according to an embodiment of the disclosure.

FIG. 5A is a block diagram of a multi-channel audio decoding apparatus 500 according to an embodiment of the disclosure.

An audio decoding apparatus 500 may include a memory 510 and a processor 530. The audio decoding apparatus 500 may be implemented as a device capable of audio processing, such as a server, a TV, a camera, a mobile phone, a tablet PC, a laptop, and the like.

While the memory 510 and the processor 530 are shown separately in FIG. 5A, the memory 510 and the processor 530 may be implemented through one hardware module (e.g., a chip).

The processor 530 may be implemented as a dedicated processor for audio processing based on a neural network. Alternatively, the processor 530 may be implemented through a combination of a general-purpose processor, such as an AP, a CPU, or a GPU, and software. The dedicated processor may include a memory for implementing an embodiment of the disclosure or a memory processor for using an external memory.

The processor 530 may include a plurality of processors. In this case, the processor 530 may be implemented as a combination of dedicated processors, or may be implemented through a combination of software and a plurality of general-purpose processors such as an AP, a CPU, or a GPU.

The memory 510 may store one or more instructions for audio processing. In an embodiment of the disclosure, the memory 510 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 510. The neural network may be implemented by an external device (e.g., a server), and in this case, the audio decoding apparatus 500 may request and receive result information based on the neural network from the external device.

The processor 530 may sequentially process successive frames according to an instruction stored in the memory 510 to obtain successive reconstructed frames. The successive frames may refer to frames that constitute audio.

The processor 530 may output a multi-channel audio signal by performing an audio processing operation on an input bitstream. The bitstream may be implemented in a scalable form to increase the number of channels from the base channel group. For example, the processor 530 may obtain a compressed audio signal of a base channel group from the bitstream, and may reconstruct an audio signal of the base channel group (for example, a stereo channel audio signal) by decompressing the compressed audio signal of the base channel group. Additionally, the processor 530 may reconstruct an audio signal of a dependent channel group by decompressing a compressed audio signal of the dependent channel group from the bitstream. The processor 530 may reconstruct a multi-channel audio signal based on the audio signal of the base channel group and the audio signal of the dependent channel group.

The processor 530 may reconstruct an audio signal of a first dependent channel group by decompressing a compressed audio signal of the first dependent channel group from the bitstream. The processor 530 may reconstruct an audio signal of the second dependent channel group by decompressing a compressed audio signal of the second dependent channel group.

The processor 530 may reconstruct a multi-channel audio signal of an increased number of channels, based on the audio signal of the base channel group and the respective audio signals of the first and second dependent channel groups. Likewise, the processor 330 may decompress compressed audio signals of n dependent channel groups (where n is an integer greater than 2), and may reconstruct a multi-channel audio signal of a further increased number of channels based on the audio signal of the base channel group and the respective audio signals of the base channel group and the n dependent channel groups.

Figure 5B:
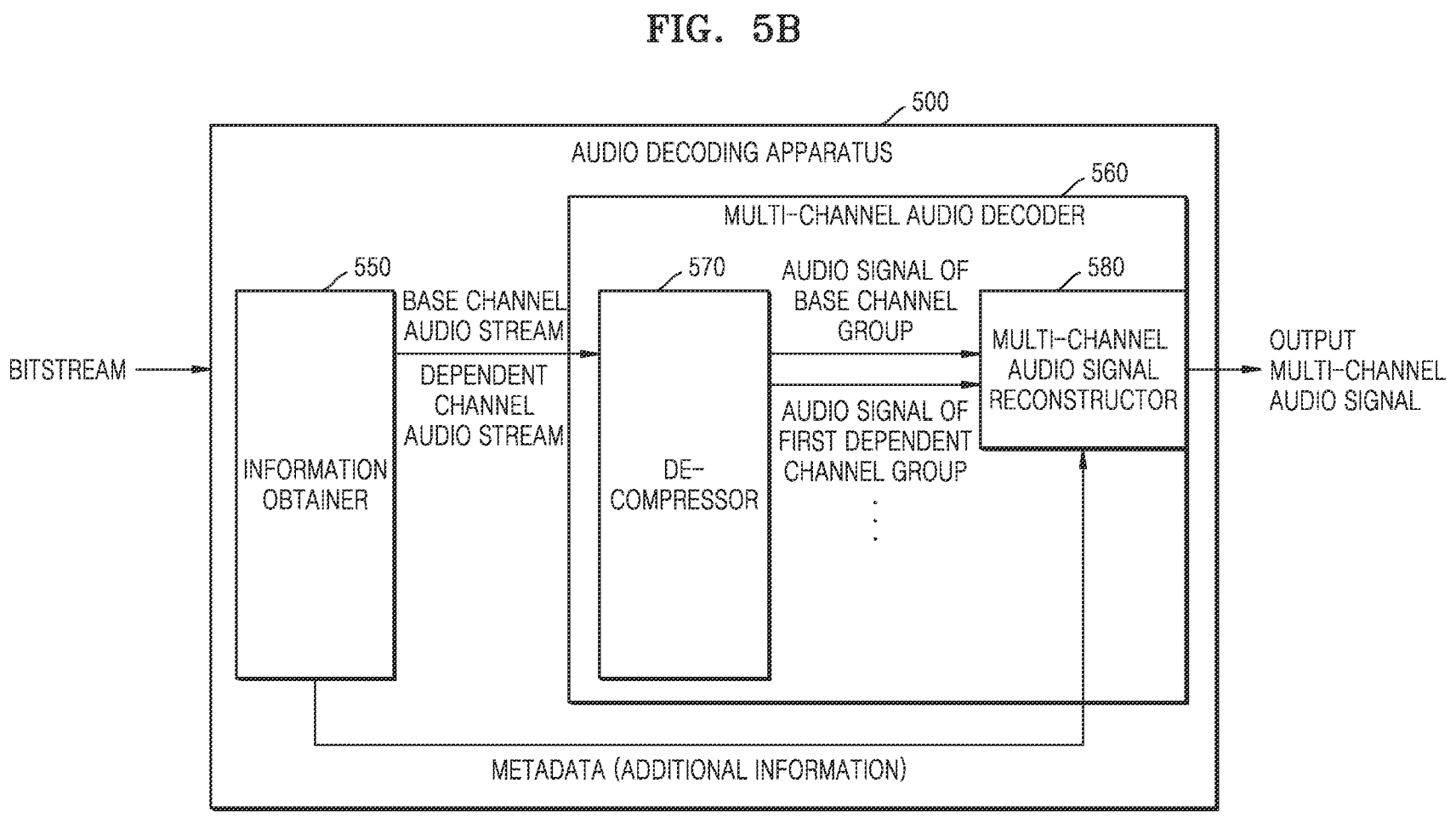

FIG. 5B is a block diagram of a multi-channel audio decoding apparatus 500 according to an embodiment of the disclosure.

Referring to FIG. 5B, the audio decoding apparatus 500 may include an information obtainer 550 and a multi-channel audio decoder 560. The multi-channel audio decoder 560 may include a decompressor 570 and a multi-channel audio signal reconstructor 580.

The audio decoding apparatus 500 may include the memory 510 and the processor 530 of FIG. 5A, and an instruction for implementing the components, such as the information obtainer 550, the multi-channel audio decoder 560, the decompressor 570, and the multi-channel audio signal reconstructor 580, of FIG. 5B may be stored in the memory 510. The processor 530 may execute the instruction stored in the memory 510. The elements, such as the information obtainer 550, the multi-channel audio decoder 560, the decompressor 570, and the multi-channel audio signal reconstructor 580, shown in FIG. 5B may be obtained by classifying operations performed by the processor 530 executing a program (or instruction) stored in the memory 510 according to functions. Accordingly, operations described below as being performed by the elements, such as the information obtainer 550, the multi-channel audio decoder 560, the decompressor 570, and the multi-channel audio signal reconstructor 580, shown in FIG. 5B may be considered as actually being performed by the processor 530.

The information obtainer 550 may obtain the compressed audio signal of the base channel group from the bitstream. That is, the information obtainer 550 may classify a base channel audio stream including at least one compressed audio signal of the base channel group from the bitstream.

The information obtainer 550 may also obtain at least one compressed audio signal of at least one dependent channel group from the bitstream. That is, the information obtainer 550 may classify at least one dependent channel audio stream including at least one compressed audio signal of the dependent channel group from the bitstream.

The bitstream may include a base channel audio stream and a plurality of dependent channel streams. The plurality of dependent channel audio streams may include a first dependent channel audio stream and a second dependent channel audio stream.

In this case, limitation of channels of a multi-channel first audio signal reconstructed through the base channel audio stream and the first dependent channel audio stream and a multi-channel second audio signal reconstructed through the base channel audio stream, the first dependent channel audio stream, and the second dependent channel audio stream will be described.

For example, among the channels of the first multi-channel layout reconstructed from the base channel audio stream and the first dependent channel audio stream, the number of surround channels may be $S_{n-1}$, the number of subwoofer channels may be $W_{n-1}$, and the number of height channels may be $H_{n-1}$. In the second multi-channel layout reconstructed from the base channel audio stream, the first dependent channel audio stream, and the second dependent channel audio stream, the number of surround channels may be $S_n$, the number of subwoofer channels may be $W_n$, and the number of height channels may be $H_n$. In this case, $S_{n-1}$ may be less than or equal to $S_n$, $W_{n-1}$ may be less than or equal to $W_n$, and $H_{n-1}$ may be less than or equal to $H_n$. Herein, a case where $S_{n-1}$ is equal to $S_n$, $W_{n-1}$ is equal to $W_n$, and $H_{n-1}$ is equal to $H_n$ may be excluded.

That is, the number of surround channels of the second multi-channel layout needs to be greater than the number of surround channels of the first multi-channel layout. Alternatively, the number of subwoofer channels of the second multi-channel layout needs to be greater than the number of subwoofer channels of the first multi-channel layout. Alternatively, the number of height channels of the second multi-channel layout needs to be greater than the number of height channels of the first multi-channel layout.

Moreover, the number of surround channels of the second multi-channel layout may not be less than the number of surround channels of the first multi-channel layout. Likewise, the number of subwoofer channels of the second multi-channel layout may not be less than the number of subwoofer channels of the first multi-channel layout. The number of height channels of the second multi-channel layout may not be less than the number of height channels of the first multi-channel layout.

In addition, the case where the number of surround channels of the second multi-channel layout is equal to the number of surround channels of the first multi-channel layout and the number of subwoofer channels of the second multi-channel layout is equal to the number of subwoofer channels of the first multi-channel layout and the number of height channels of the second multi-channel layout is equal to the number of height channels of the first multi-channel layout does not exist. That is, all channels of the second multi-channel layout may not be the same as all channels of the first multi-channel layout.

More specifically, for example, when the first multi-channel layout is the 5.1.2 channel layout, the second multi-channel layout may be the 7.1.4 channel layout.

The bitstream may include a file stream having a plurality of audio tracks including a first audio track and a second audio track. A process in which the information obtainer 550 obtains at least one compressed audio signal of at least one dependent channel group according to additional information included in an audio track will be described below.

The information obtainer 550 may obtain at least one compressed audio signal of the base channel group from the first audio track.

The information obtainer 550 may obtain dependent channel audio signal identification information from a second audio track that is adjacent to the first audio track.

When the dependent channel audio signal identification information indicates that the dependent channel audio signal exists in the second audio track, the information obtainer 550 may obtain at least one audio signal of at least one dependent channel group from the second audio track.

When the dependent channel audio signal identification information indicates that the dependent channel audio signal does not exist in the second audio track, the information obtainer 550 may obtain the next audio signal of the base channel group from the second audio track.

The information obtainer 550 may obtain additional information related to reconstruction of multi-channel audio from the bitstream. That is, the information obtainer 550 may classify metadata including the additional information from the bitstream and obtain the additional information from the classified metadata.

The decompressor 570 may reconstruct the audio signal of the base channel group by decompressing at least one compressed audio signal of the base channel group.

The decompressor 570 may reconstruct at least one audio signal of the at least one dependent channel group by decompressing at least one compressed audio signal of the at least one dependent channel group.

In this case, the decompressor 570 may include an additional a first decompressor, . . . , an n$^{th}$ decompressor for decoding a decompressed audio signal of each channel group (n channel groups). In this case, the first decompressor, . . . , the n$^{th}$ decompressor may operate in parallel to each other.

The multi-channel audio signal reconstructor 580 may reconstruct a multi-channel audio signal, based on at least one audio signal of the base channel group and at least one audio signal of the at least one dependent channel group.

For example, when the audio signal of the base channel group is an audio signal of a stereo channel, the multi-channel audio signal reconstructor 580 may reconstruct an audio signal of a 3D audio channel in front of the listener, based on the audio signal of the base channel group and the audio signal of the first dependent channel group. For example, the 3D audio channel in front of the listener may be a 3.1.2 channel.

Alternatively, the multi-channel audio signal reconstructor 580 may reconstruct an audio signal of an audio channel omni-directionally around the listener, based on the audio signal of the base channel group, the audio signal of the first dependent channel group, and the audio signal of the second dependent channel group. For example, the 3D audio channel omni-directionally around the listener may be the 5.1.2 channel or the 7.1.4 channel.

The multi-channel audio signal reconstructor 580 may reconstruct a multi-channel audio signal, based on not only the audio signal of the base channel group and the audio signal of the dependent channel group, but also the additional information. In this case, the additional information may be additional information for reconstructing the multi-channel audio signal. The multi-channel audio signal reconstructor 580 may output the reconstructed at least one multi-channel audio signal.

The multi-channel audio signal reconstructor 580 according to an embodiment of the disclosure may generate a first audio signal of a 3D audio channel in front of the listener from at least one audio signal of the base channel group and at least one audio signal of the at least one dependent channel group. The multi-channel audio signal reconstructor 580 may reconstruct a multi-channel audio signal including a second audio signal of a 3D audio channel in front of the listener, based on the first audio signal and the audio object signal of the 3D audio channel in front of the listener. In this case, the audio object signal may indicate at least one of an audio signal, a shape, an area, a position, or a direction of an audio object (a sound source), and may be obtained from the information obtainer 550.

A detailed operation of the multi-channel audio signal reconstructor 580 will be described later with reference to FIG. 5C.

Figure 5C:
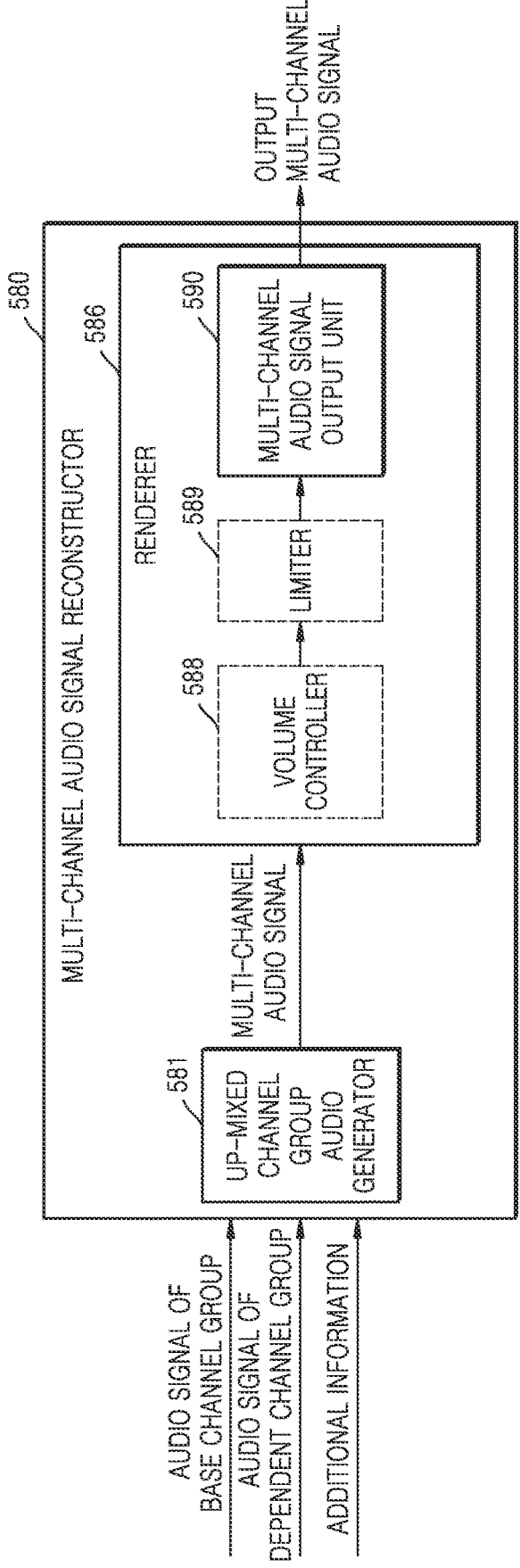
FIG. 5C is a block diagram of a multi-channel audio signal reconstructor according to an embodiment of the disclosure.

FIG. 5C is a block diagram of a multi-channel audio signal reconstructor 580 according to an embodiment of the disclosure.

Referring to FIG. 5C, the multi-channel audio signal reconstructor 580 may include an up-mix channel group audio generator 581 and a renderer 586.

The up-mix channel group audio generator 581 may generate an audio signal of an up-mix channel group based on the audio signal of the base channel group and the audio signal of the dependent channel group. In this case, the audio signal of the up-mix channel group may be a multi-channel audio signal. In this case, additionally, further based on the additional information (e.g., information about a dynamic de-mixing weight parameter), the multi-channel audio signal may be generated.

The up-mix channel group audio generator 581 may generate an audio signal of an up-mixed channel by de-mixing the audio signal of the base channel group and some of the audio signals of the dependent channel group. For example, by de-mixing the audio signals L and R of the base channel group and a part of the audio signals of the dependent channel group, C, the audio signals L3 and R3 of the de-mixed channel (or the up-mixed channel) may be generated.

The up-mix channel group audio generator 581 may generate an audio signal of some channel of the multi-channel audio signal, by bypassing a de-mixing operation with respect to some of the audio signals of the dependent channel group. For example, the up-mix channel group audio generator 581 may generate audio signals of the C, LFE, Hfl3, and Hfr3 channels of the multi-channel audio signal, by bypassing the de-mixing operation with respect to the audio signals of the C, LFE, Hfl3, and Hfr3 channels that are some audio signals of the dependent channel group.

As a result, the up-mix channel group audio generator 581 may generate the audio signal of the up-mix channel group based on the audio signal of the up-mixed channel generated through de-mixing and the audio signal of the dependent channel group in which the de-mixing operation is bypassed. For example, the up-mix channel group audio generator 581 may generate the audio signals of the L3, R3, C, LFE, Hfl3, and Hfr3 channels, which are audio signals of the 3.1.2 channel, based on the audio signals of the L3 and R3 channels, which are audio signals of the de-mixed channels, and the audio signals of the C, LFE, Hfl3, and Hfr3 channels, which are audio signals of the dependent channel group.

A detailed operation of the up-mix channel group audio generator 581 will be described later with reference to FIG. 5D.

The renderer 586 may include a volume controller 588 and a limiter 589. The multi-channel audio signal input to the renderer 586 may be a multi-channel audio signal of at least one channel layout. The multi-channel audio signal input to the renderer 586 may be a pulse-code modulation (PCM) signal.

A volume (loudness) of an audio signal of each channel may be measured based on ITU-R BS.1770, which may be signaled through additional information of a bitstream.

The volume controller 588 may control the volume of the audio signal of each channel to a target volume (for example, −24 LKFS), based on volume information signaled through the bitstream.

A true peak may be measured based on ITU-R BS.1770.

The limiter 589 may limit a true peak level of the audio signal (e.g., to −1 dBTP) after volume control.

While post-processing components, such as the volume controller 588 and the limiter 589, included in the renderer 586 have been described so far, at least one component may be omitted and the order of each component may be changed according to circumstances, without being limited thereto.

A multi-channel audio signal output unit 590 may output post-processed at least one multi-channel audio signal. For example, the multi-channel audio signal output unit 590 may output an audio signal of each channel of a multi-channel audio signal to an audio output device corresponding to each channel, with a post-processed multi-channel audio signal as an input, according to a target channel layout. The audio output device may include various types of speakers.

Figure 5D:
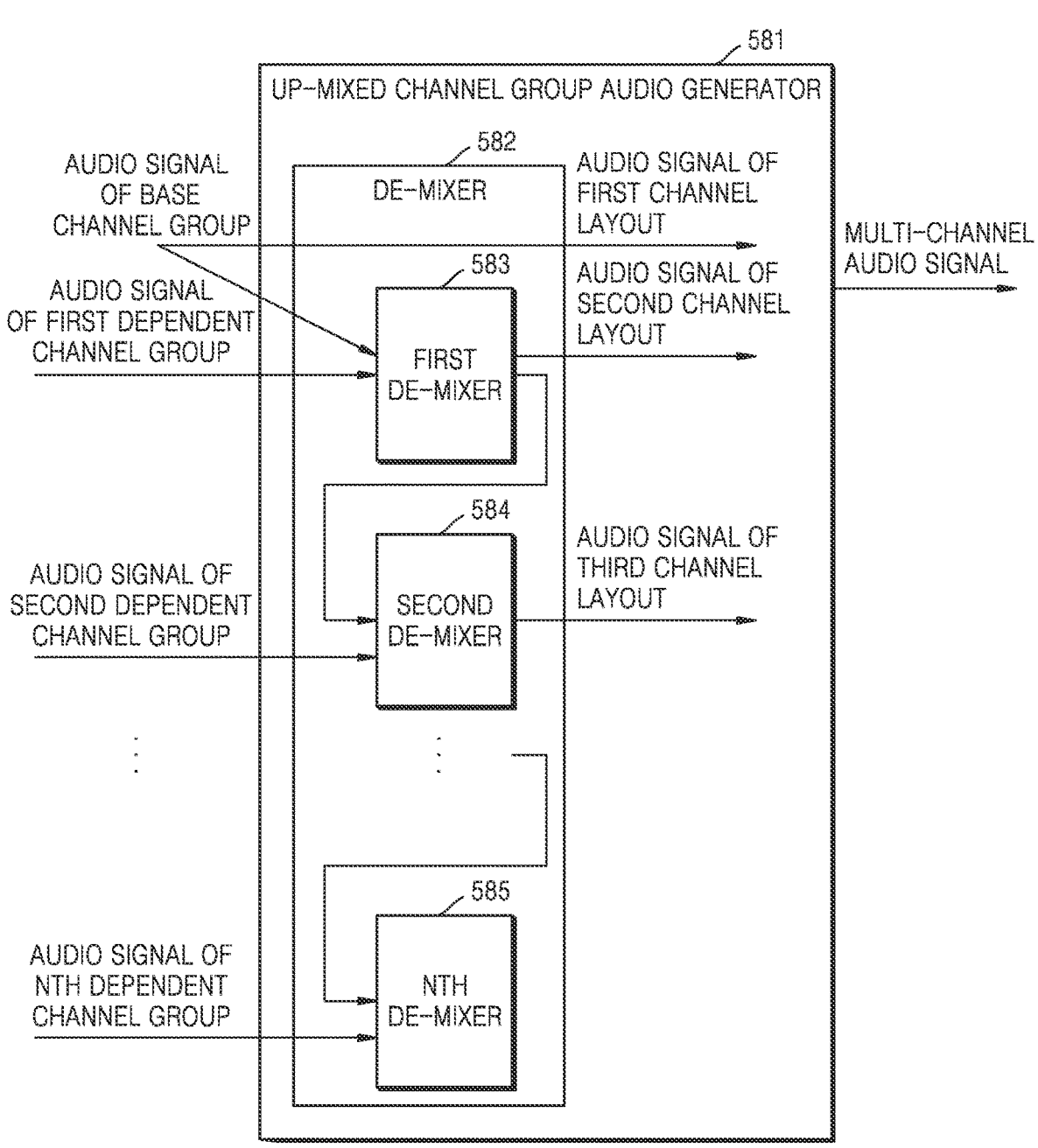
FIG. 5D is a block diagram of an up-mixed channel audio generator according to an embodiment of the disclosure.

FIG. 5D is a block diagram of an up-mixed channel audio generator 581 according to an embodiment of the disclosure.

Referring to FIG. 5D, the up-mix channel group audio generator 581 may include a de-mixer 582. The de-mixer 582 may include a first de-mixer 583, and a second de-mixer 584 through to an $N^{th}$ de-mixer 585.

The de-mixer 582 may obtain an audio signal of a new channel (an up-mixed channel or a de-mixed channel) from the audio signal of the base channel group and audio signals of some of channels (decoded channels) of the audio signals of the dependent channel group. That is, the de-mixer 582 may obtain an audio signal of one up-mixed channel from at least one audio signal where several channels are mixed. The de-mixer 582 may output an audio signal of a particular layout including the audio signal of the up-mixed channel and the audio signal of the decoded channel.

For example, the de-mixing operation may be bypassed in the de-mixer 582 such that the audio signal of the base channel group may be output as the audio signal of the first channel layout.

The first de-mixer 583 may de-mix audio signals of some channels with the audio signal of the base channel group and the audio signal of the first dependent channel group as inputs. In this case, the audio signal of the de-mixed channel (or the up-mixed channel) may be generated. The first de-mixer 583 may generate the audio signal of the independent channel by bypassing a mixing operation with respect to the audio signals of the other channels. The first de-mixer 583 may output an audio signal of a second channel layout, which is a signal including the audio signal of the up-mixed channel and the audio signal of the independent channel.

The second de-mixer 584 may generate the audio signal of the de-mixed channel (or the up-mixed channel) by de-mixing audio signals of some channels among the audio signals of the second channel layout and the audio signal of the second dependent channel. The second de-mixer 584 may generate the audio signal of the independent channel by bypassing the mixing operation with respect to the audio signals of the other channels. The second de-mixer 584 may output an audio signal of a third channel layout, which includes the audio signal of the up-mixed channel and the audio signal of the independent channel.

An $n^{th}$ de-mixer may output an audio signal of an $n^{th}$ channel layout, based on an audio signal of an $(n-1)^{th}$ channel layout and an audio signal of an $(n-1)^{th}$ dependent channel group, similarly with an operation of the second de-mixer 584. Also, n may be less than or equal to N.

The $N^{th}$ de-mixer 585 may output an audio signal of an $N^{th}$ channel layout, based on an audio signal of an $(N-1)^{th}$ channel layout and an audio signal of an $(N-1)^{th}$ dependent channel group.

Although it is shown that an audio signal of a lower channel layout is directly input to the respective de-mixers, such as de-mixer 583, the de-mixer 584, and through to the $N^{th}$ de-mixer 585, an audio signal of a channel layout output through the renderer 586 of FIG. 5C may be input to each of the de-mixers, such as the de-mixer 583, the de-mixer 584, and through to the $N^{th}$ de-mixer 585. That is, the post-processed audio signal of the lower channel layout may be input to each of the de-mixers, such as the de-mixer 583, the de-mixer 584, and the $N^{th}$ de-mixer 585.

With reference to FIG. 5D, it is described that the de-mixer 583, the de-mixer 584, and the $N^{th}$ de-mixer 585 may be connected in a cascaded manner to output an audio signal of each channel layout.

However, without connecting the de-mixer 583, the de-mixer 584, and the $N^{th}$ de-mixer 585 in a cascaded manner, an audio signal of a particular layout may be output from the audio signal of the base channel group and the audio signal of the at least one dependent channel group.

The audio signal generated by mixing signals of several channels in the audio encoding apparatus 400 and the audio encoding apparatus 600 may have a lowered level by using a down-mix gain for preventing clipping. The audio decoding apparatus 500 and the audio decoding apparatus 700 may match the level of the audio signal to the level of the original audio signal based on a corresponding down-mix gain for the signal generated by mixing.

An operation based on the above-described down-mix gain may be performed for each channel or channel group. The audio encoding apparatus 400 and the audio encoding apparatus 600 may signal information about a down-mix gain through additional information of a bitstream for each channel or each channel group. Thus, the audio decoding apparatus 500 and the audio decoding apparatus 700 may obtain the information about the down-mix gain from the additional information of the bitstream for each channel or each channel group, and perform the above-described operation based on the down-mix gain.

The de-mixer 582 may perform the de-mixing operation based on a dynamic de-mixing weight parameter of a de-mixing matrix (corresponding to a down-mixing weight parameter of a down-mixing matrix). In this case, the audio encoding apparatus 400 and the audio encoding apparatus 600 may signal the dynamic de-mixing weight parameter or the dynamic down-mixing weight parameter corresponding thereto through the additional information of the bitstream. Some de-mixing weight parameters may not be signaled and have a fixed value.

Thus, the audio decoding apparatus 500 and the audio decoding apparatus 700 may obtain information about the dynamic de-mixing weight parameter (or information about the dynamic down-mixing weight parameter) from the additional information of the bitstream, and perform the de-mixing operation based on the obtained information about the dynamic de-mixing weight parameter (or the information about the dynamic down-mixing weight parameter).

Figure 6A:
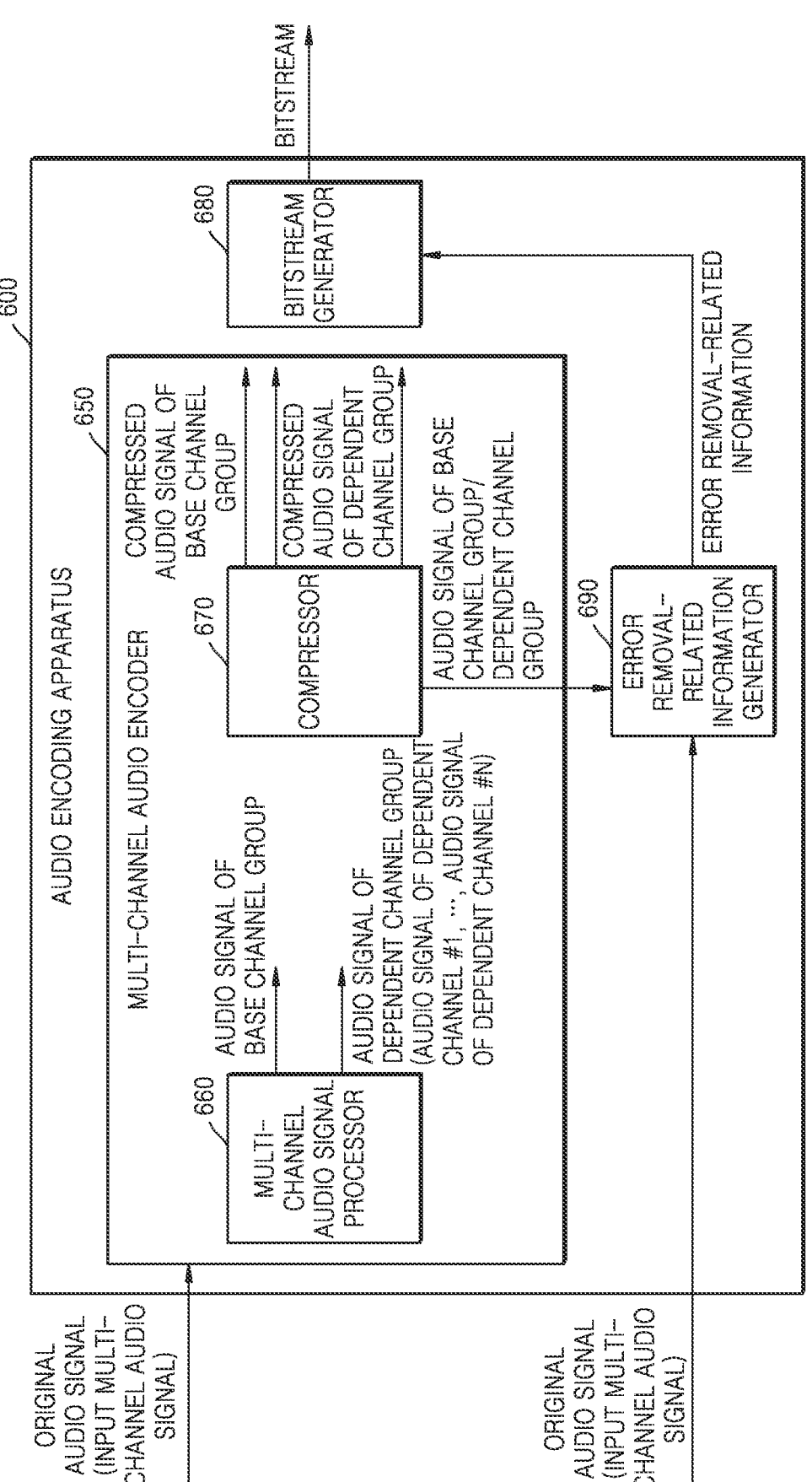
FIG. 6A is a block diagram of an audio encoding apparatus according to an embodiment of the disclosure.

FIG. 6A is a block diagram of an audio encoding apparatus 600 according to an embodiment of the disclosure.

Referring to FIG. 6A, the audio encoding apparatus 600 may include a multi-channel audio encoder 650, a bitstream generator 680, and an error removal-related information generator 690. The multi-channel audio encoder 650 may include a multi-channel audio signal processor 660 and a compressor 670.

Referring to FIG. 4A again, each of the multi-channel audio encoder 650, the multi-channel audio signal processor 660, the compressor 670, the bitstream generator 680, and the error removal-related information generator 690 of FIG. 6A may be implemented by the memory 410 and the processor 430 of FIG. 4A. As described above, the audio encoding apparatus 400 may include the memory 410 and the processor 430, and an instruction for implementing the multi-channel audio encoder 650, the multi-channel audio signal processor 660, the compressor 670, the bitstream generator 680, and the error removal-related information generator 690 of FIG. 6A may be stored in the memory 410 of FIG. 4A. The processor 430 may execute the instruction stored in the memory 410. The multi-channel audio encoder 650, the multi-channel audio signal processor 660, the compressor 670, the bitstream generator 680, and the error removal-related information generator 690 shown in FIG. 6A may be obtained by classifying the operations performed by the processor 430 executing a program (or instruction) stored in the memory 410 according to functions. Accordingly, operations described as being performed by the multi-channel audio encoder 650, the multi-channel audio signal processor 660, the compressor 670, the bitstream generator 680, and the error removal-related information generator 690 shown in FIG. 6A may be considered as actually being performed by the processor 430.

Operations of the multi-channel audio encoder 650, the multi-channel audio signal processor 660, the compressor 670, and the bitstream generator 680 of FIG. 6A correspond to the operations of the multi-channel audio encoder 450, the multi-channel audio signal processor 460, the compressor 470, and the bitstream generator 480, respectively, and thus a detailed description thereof will be replaced with the description of FIG. 4B.

The error removal-related information generator 690 may be included in the additional information generator 485 of FIG. 4B, but may also exist separately, without being limited thereto.

The error removal-related information generator 690 may determine an error removal factor (e.g., a scaling factor) based on a first power value and a second power value. In this case, the first power value may be an energy value of one channel of the original audio signal or an audio signal of one channel obtained by down-mixing from the original audio signal. The second power value may be a power value of an audio signal of an up-mixed channel as one of audio signals of an up-mix channel group. The audio signal of the up-mix channel group may be an audio signal obtained by de-mixing a base channel reconstructed signal and a dependent channel reconstructed signal.

The error removal-related information generator 690 may determine an error removal factor for each channel.

The error removal-related information generator 690 may generate information related to error removal (or error removal-related information) including information about the determined error removal factor. The bitstream generator 680 may generate a bitstream further including the error removal-related information. A detailed operation of the error removal-related information generator 690 will be described later with reference to FIG. 6B.

Figure 6B:
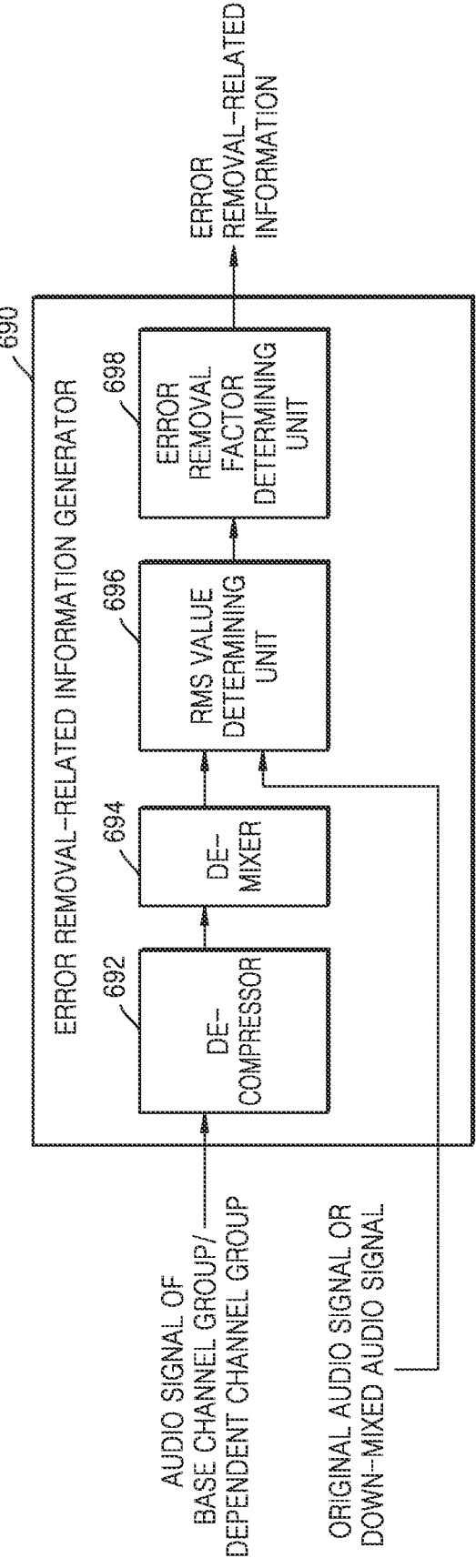
FIG. 6B is a block diagram of an error removal-related information generator according to an embodiment of the disclosure.

FIG. 6B is a block diagram of a reconstructor according to an embodiment of the disclosure.

Referring to FIG. 6B, the error removal-related information generator 690 may include a decompressor 692, a de-mixer 694, a root mean square (RMS) value determining unit 696, and an error removal factor determining unit 698.

The decompressor 692 may generate the base channel reconstructed signal by decompressing the compressed audio signal of the base channel group. In addition, the decompressor 692 may generate the dependent channel reconstructed signal by decompressing the compressed audio signal of the dependent channel group.

The de-mixer 694 may de-mix the base channel reconstructed signal and the dependent channel reconstructed signal to generate the audio signal of the up-mix channel group. More specifically, the de-mixer 694 may generate an audio signal of an up-mixed channel (or a de-mixed channel) by de-mixing audio signals of some channels among audio signals of the base channel group and the dependent channel group. The de-mixer 694 may bypass a de-mixing operation with respect to some audio signals among the audio signals of the base channel group and the dependent channel group.

The de-mixer 694 may obtain an audio signal of an up-mix channel group including the audio signal of the up-mixed channel and the audio signal for which the de-mixing operation is bypassed.

The root mean square (RMS) value determining unit 696 may determine an RMS value of a first audio signal of one up-mixed channel of the up-mix channel group. The RMS value determining unit 696 may determine an RMS value of a second audio signal of one channel of the original audio signal or an RMS value of a second audio signal of one channel of an audio signal down-mixed from the original audio signal. In this case, the channel of the first audio signal and the channel of the second audio signal may indicate the same channel in a channel layout.

The error removal factor determining unit 698 may determine an error removal factor based on the RMS value of the first audio signal and the RMS value of the second audio signal. For example, a value generated by dividing the RMS value of the first audio signal by the RMS value of the second audio signal may be obtained as a value of the error removal factor. The error removal factor determining unit 698 may generate information about the determined error removal factor. The error removal factor determining unit 698 may output the error removal-related information including the information about the error removal factor.

Figure 7A:
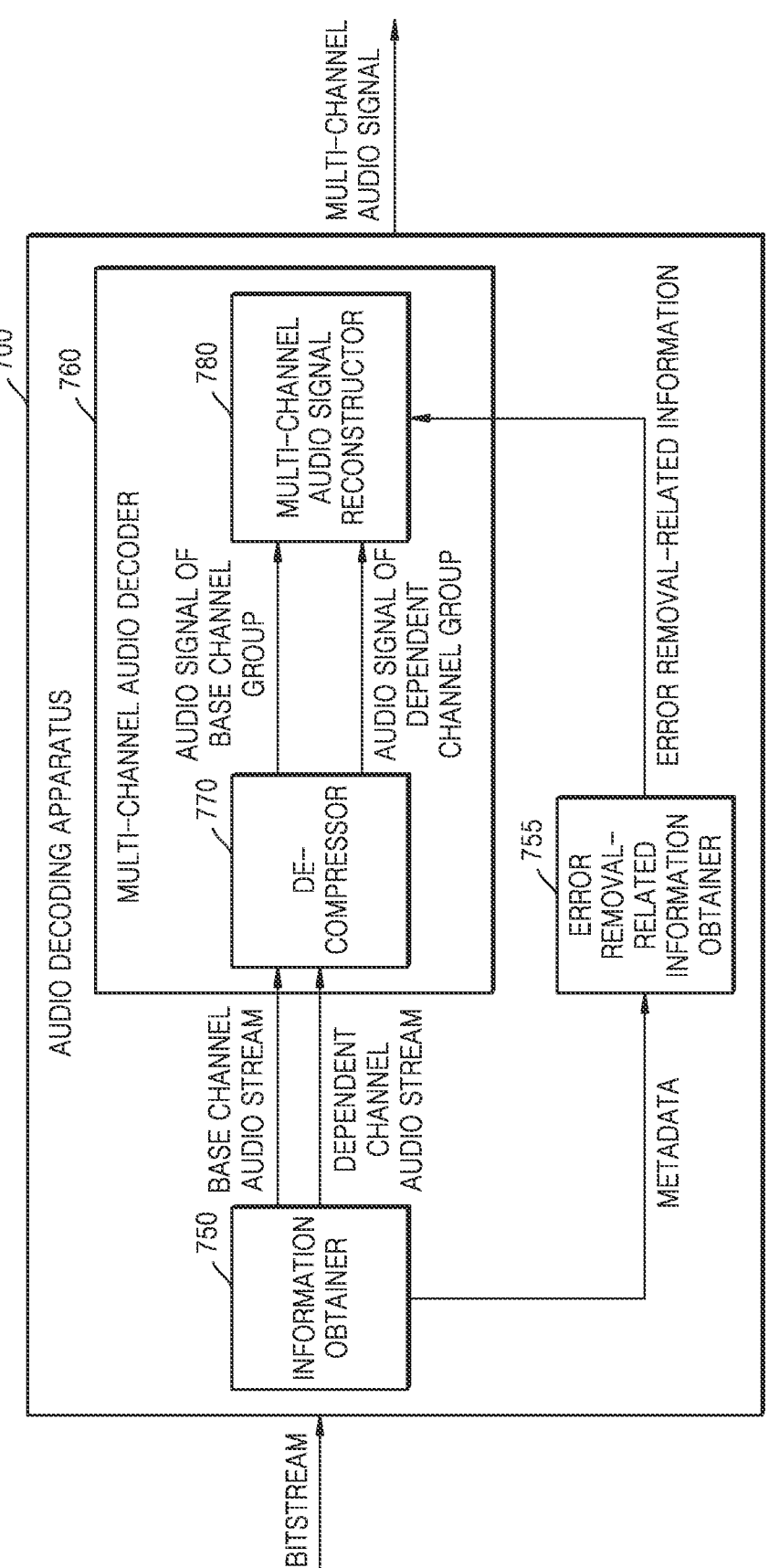
FIG. 7A is a block diagram of an audio decoding apparatus according to an embodiment of the disclosure.

FIG. 7A is a block diagram of an audio decoding apparatus according to an embodiment of the disclosure.

Referring to FIG. 7A, the audio decoding apparatus 700 may include an information obtainer 750, a multi-channel audio decoder 760, a decompressor 770, a multi-channel audio signal reconstructor 780, and an error removal-related information obtainer 755.

Referring to FIG. 5A again, each of the information obtainer 750, the error removal-related information obtainer 755, the multi-channel audio decoder 760, the decompressor 770, and multi-channel audio signal reconstructor 780 of FIG. 7A may be implemented by the memory 510 and the processor 530 of FIG. 5A. As described above, the audio decoding apparatus 500 may include the memory 510 and the processor 530, and an instruction for implementing the information obtainer 750, the error removal-related information obtainer 755, the multi-channel audio decoder 760, the decompressor 770, and multi-channel audio signal reconstructor 780 of FIG. 7B may be stored in the memory 510 of FIG. 5A. The processor 530 may execute the instruction stored in the memory 510. The information obtainer 750, the error removal-related information obtainer 755, the multi-channel audio decoder 760, the decompressor 770, and multi-channel audio signal reconstructor 780 shown in FIG. 7A may be obtained by classifying operations performed by the processor 530 executing a program (or instruction) stored in the memory 510 according to functions. Accordingly, operations described below as being performed by the information obtainer 750, the error removal-related information obtainer 755, the multi-channel audio decoder 760, the decompressor 770, and multi-channel audio signal reconstructor 780 shown in FIG. 7A may be considered as being performed by the processor 530.

Operations of the information obtainer 750, the decompressor 770, and the multi-channel audio signal reconstructor 780 of FIG. 7A respectively include the operations of the information obtainer 550, the decompressor 570, and the multi-channel audio signal reconstructor 580 of FIG. 5B, and thus a redundant description will be replaced with the description made with reference to FIG. 5B. Hereinafter, a description that is not redundant to the description of FIG. 5B will be provided.

The information obtainer 750 may obtain metadata from the bitstream.

The error removal-related information obtainer 755 may obtain the error removal-related information from the metadata included in the bitstream. Herein, the information about the error removal factor included in the error removal-related information may be an error removal factor of an audio signal of one up-mixed channel of an up-mix channel group. The error removal-related information obtainer 755 may be included in the information obtainer 750.

The multi-channel audio signal reconstructor 780 may generate an audio signal of the up-mix channel group based on at least one audio signal of the base channel and at least one audio signal of at least one dependent channel group. The audio signal of the up-mix channel group may be a multi-channel audio signal. The multi-channel audio signal reconstructor 780 may reconstruct the audio signal of the one up-mixed channel by applying the error removal factor to the audio signal of the one up-mixed channel included in the up-mix channel group.

The multi-channel audio signal reconstructor 780 may output the multi-channel audio signal including the reconstructed audio signal of the one up-mixed channel.

Figure 7B:
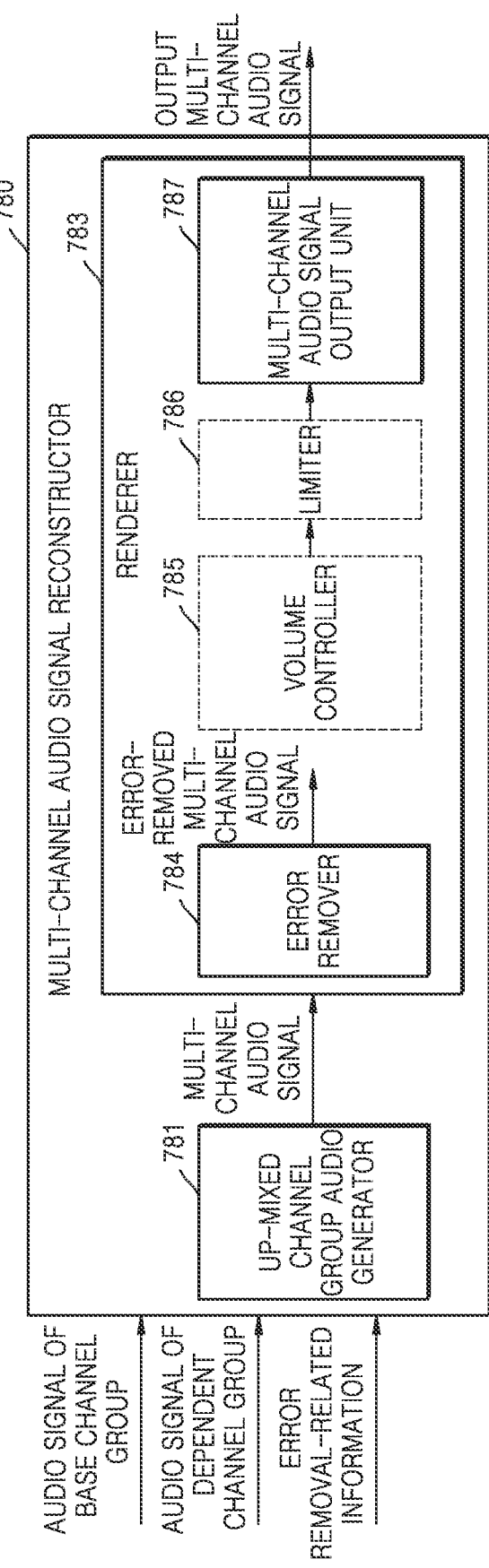
FIG. 7B is a block diagram of a multi-channel audio signal reconstructor according to an embodiment of the disclosure.

FIG. 7B is a block diagram of a multi-channel audio signal reconstructor according to an embodiment of the disclosure.

The multi-channel audio signal reconstructor 780 may include an up-mix channel group audio generator 781 and a renderer 783. The renderer 783 may include an error remover 784, a volume controller 785, a limiter 786, and a multi-channel audio signal output unit 787.

The up-mix channel group audio generator 781, the error remover 784, the volume controller 785, the limiter 786, and the multi-channel audio signal output unit 787 of FIG. 7B may include operations of the up-mix channel group audio generator 581, the volume controller 588, the limiter 589, and the multi-channel audio signal output unit 590 of FIG. 5C, and thus a redundant description will be replaced with the description made with reference to FIG. 5C. Hereinafter, a description that is not redundant to the description of FIG. 5C will be provided.

The error remover 784 may reconstruct the error-removed audio signal of the first channel based on the audio signal of a first up-mixed channel of the up-mix channel group of the multi-channel audio signal and the error removal factor of the first up-mixed channel. In this case, the error removal factor may be a value based on an RMS value of the original audio signal or an audio signal of the first channel of the audio signal down-mixed from the original audio signal and an RMS value of an audio signal of the first up-mixed channel of the up-mix channel group. The first channel and the first up-mixed channel may indicate the same channel of a channel layout. The error remover 784 may remove an error caused by encoding by causing the RMS value of the audio signal of the first up-mixed channel of the current up-mix channel group to be the RMS value of the original audio signal or the audio signal of the first channel of the audio signal down-mixed from the original audio signal.

The error removal factor may differ between adjacent audio frames. In this case, in an end section of a previous frame and an initial section of a next frame, an audio signal may bounce due to discontinuous factors for error removal.

Thus, the error remover 784 may determine the error removal factor used in a frame boundary adjacent section by performing smoothing on the error removal factor. The frame boundary adjacent section may mean the end section of the previous frame with respect to the boundary and the first section of the next frame with respect to the boundary. Each section may include a certain number of samples.

Here, smoothing may refer to an operation of converting a discontinuous error removal factor between adjacent audio frames into a continuous error removal factor in a frame boundary section.

The multi-channel audio signal output unit 787 may output the multi-channel audio signal including the error-removed audio signal of one channel.

At least one component of the post-processed components 785 and 786 included in the renderer 783 may be omitted, and the order of the post-processed components, such as the error remover 784, the volume controller 785, and the limiter 786, may be changed depending on circumstances.

As described above, the audio encoding apparatus 400 and the audio encoding apparatus 600 may generate a bitstream. The audio encoding apparatus 400 and the audio encoding apparatus 600 may transmit the generated bitstream.

In this case, the bitstream may be generated in the form of a file stream. The audio decoding apparatus 500 and the audio decoding apparatus 700 may receive the bitstream. The audio decoding apparatus 500 and the audio decoding apparatus 700 may reconstruct the multi-channel audio signal based on the information obtained from the received bitstream. In this case, the bitstream may be included in a certain file container. For example, the file container may be a Moving Picture Experts Group (MPEG)-4 media container for compressing various pieces of multimedia digital data, such as an MPEG-4 Part 14 (MP4), etc.

FIG. 8A is a view for describing a transmission order and a rule of an audio stream in each channel group by the audio encoding apparatuses according to an embodiment of the disclosure.

In a scalable format, transmission order and rule of an audio stream in each channel group may be as described below.

The audio encoding apparatus 400 and the audio encoding apparatus 600 may first transmit a coupled stream and then transmit a non-coupled stream.

The audio encoding apparatus 400 and the audio encoding apparatus 600 may first transmit a coupled stream for a surround channel and then transmit a coupled stream for a height channel.

The audio encoding apparatus 400 and the audio encoding apparatus 600 may first transmit a coupled stream for a front channel and then transmit a coupled stream for a side or back channel.

For non-coupled stream transmission, the audio encoding apparatus 400 and the audio encoding apparatus 600 may first transmit a stream for a center channel, and then transmit a stream for the LFE channel and other channel(s). Herein, the other channel(s) may exist when the base channel group includes a mono channel signal. In this case, the other channel(s) may be one of a left channel L2 or a right channel R2 of a stereo channel.

The audio encoding apparatus 400 and the audio encoding apparatus 600 may compress audio signals of coupled channels into one pair. The audio encoding apparatus 400 and the audio encoding apparatus 600 may first transmit a coupled stream including the audio signals compressed into one pair. For example, the coupled channels may mean left-right symmetric channels such as L/R, Ls/Rs, Lb/Rb, Hfl/Hfr, Hbl/Hbr channels, etc.

Hereinbelow, according to the above-described transmission order and rule of streams in each channel group, a stream configuration of each channel group in a bitstream 810 of Case 1 will be described.

Referring to FIG. 8A, for example, the audio encoding apparatus 400 and the audio encoding apparatus 600 may compress L1 and R1 signals that are 2-channel audio signals, and the compressed L1 and R1 signals may be included in a C1 bitstream of a base channel group (BCG).

Next to the base channel group, the audio encoding apparatus 400 and the audio encoding apparatus 600 may compress a 4-channel audio signal into an audio signal of a dependent channel group #1.

The audio encoding apparatus 400 and the audio encoding apparatus 600 may compress the Hfl3 signal and the Hfr3 signal, and the compressed Hfl3 signal and Hfr3 signal may be included in a C2 bitstream of bitstreams of the dependent channel group #1.

The audio encoding apparatus 400 and the audio encoding apparatus 600 may compress the C signal, and the compressed C signal may be included in the M1 bitstream of the bitstreams of the dependent channel group #1.

The audio encoding apparatus 400 and the audio encoding apparatus 600 may compress the LFE signal, and the compressed LFE signal may be included in the M2 bitstream of the bitstreams of the dependent channel group #1.

The audio decoding apparatus 500 and the audio decoding apparatus 700 may reconstruct the audio signal of the 3.1.2 channel layout, based on compressed audio signals of the base channel group and the dependent channel group #1.

Next to a dependent channel group #2, the audio encoding apparatus 400 and the audio encoding apparatus 600 may compress a 6-channel audio signal into an audio signal of the dependent channel group #2.

The audio encoding apparatus 400 and the audio encoding apparatus 600 may first compress the L signal and the R signal, and the compressed L signal and R signal may be included in a C3 bitstream of bitstreams of the dependent channel group #2.

Next to the C3 bitstream, the audio encoding apparatus 400 and the audio encoding apparatus 600 may compress the Ls signal and the Rs signal, and the compressed Ls and Rs signals may be included in a C4 bitstream of the bitstreams of the dependent channel group #2.

Next to a C4 bitstream, the audio encoding apparatus 400 and the audio encoding apparatus 600 may compress the Hfl signal and the Hfr signal, and the compressed Hfl and Hfr signals may be included in a C5 bitstream of the bitstreams of the dependent channel group #2.

The audio decoding apparatus 500 and the audio decoding apparatus 700 may reconstruct the audio signal of the 7.1.4 channel layout, based on compressed audio signals of the base channel group, the dependent channel group #1, and the dependent channel group #2.

Hereinbelow, according to the above-described transmission order and rule of streams in each channel group, a stream configuration of each channel group in a bitstream 820 of Case 2 will be described.

The audio encoding apparatus 400 and the audio encoding apparatus 600 may compress the L2 signal and the R2 signal which are 2-channel audio signals, and the compressed L2 and R2 signals may be included in the C1 bitstream of the bitstreams of the base channel group.

Next to the base channel group, the audio encoding apparatus 400 and the audio encoding apparatus 600 may compress a 6-channel audio signal into an audio signal of a dependent channel group #1.

The audio encoding apparatus 400 and the audio encoding apparatus 600 may first compress the L signal and the R signal, and the compressed L signal and R signal may be included in the C2 bitstream of the bitstreams of the dependent channel group #1.

The audio encoding apparatus 400 and the audio encoding apparatus 600 may compress the Ls signal and the Rs signal, and the compressed Ls signal and Rs signal may be included in the C3 bitstream of the bitstreams of the dependent channel group #1.

The audio encoding apparatus 400 and the audio encoding apparatus 600 may compress the C signal, and the compressed C signal may be included in the M1 bitstream of the bitstreams of the dependent channel group #1.

The audio encoding apparatus 400 and the audio encoding apparatus 600 may compress the LFE signal, and the compressed LFE signal may be included in the M2 bitstream of the bitstreams of the dependent channel group #1.

The audio encoding apparatus 500 and the audio decoding apparatus 700 may reconstruct the audio signal of the 7.1.0 channel layout, based on the compressed audio signals of the base channel group and the dependent channel group #1.

Next to a dependent channel group #1, the audio encoding apparatus 400 and the audio encoding apparatus 600 may compress a 4-channel audio signal into an audio signal of the dependent channel group #2.

The audio encoding apparatus 400 and the audio encoding apparatus 600 may compress the Hfl signal and the Hfr signal, and the compressed Hfl signal and Hfr signal may be included in the C4 bitstream of the bitstreams of the dependent channel group #2.

The audio encoding apparatus 400 and the audio encoding apparatus 600 may compress the Hbl signal and the Hbr signal, and the compressed Hfl signal and Hfr signal may be included in the C5 bitstream of the bitstreams of the dependent channel group #2.

The audio decoding apparatus 500 and the audio decoding apparatus 700 may reconstruct the audio signal of the 7.1.4 channel layout, based on compressed audio signals of the base channel group, the dependent channel group #1, and the dependent channel group #2.

Hereinbelow, according to the above-described transmission order and rule of streams in each channel group, a stream configuration of each channel group in a bitstream 830 of Case 3 will be described.

The audio encoding apparatus 400 and the audio encoding apparatus 600 may compress the L2 signal and the R2 signal which are 2-channel audio signals, and the compressed L2 and R2 signals may be included in the C1 bitstream of the bitstreams of the base channel group.

Next to the base channel group, the audio encoding apparatus 400 and the audio encoding apparatus 600 may compress a 10-channel audio signal into an audio signal of a dependent channel group #1.

The audio encoding apparatus 400 and the audio encoding apparatus 600 may first compress the L signal and the R signal, and the compressed L signal and R signal may be included in the C2 bitstream of the bitstreams of the dependent channel group #1.

The audio encoding apparatus 400 and the audio encoding apparatus 600 may compress the Ls signal and the Rs signal, and the compressed Ls signal and Rs signal may be included in the C3 bitstream of the bitstreams of the dependent channel group #1.

The audio encoding apparatus 400 and the audio encoding apparatus 600 may compress the Hfl signal and the Hfr signal, and the compressed Hfl signal and Hfr signal may be included in the C4 bitstream of the bitstreams of the dependent channel group #1.

The audio encoding apparatus 400 and the audio encoding apparatus 600 may compress the Hbl signal and the Hbr signal, and the compressed Hfl signal and Hfr signal may be included in the C5 bitstream of the bitstreams of the dependent channel group #1.

The audio encoding apparatus 400 and the audio encoding apparatus 600 may compress the C signal, and the compressed C signal may be included in the M1 bitstream of the bitstreams of the dependent channel group #1.

The audio encoding apparatus 400 and the audio encoding apparatus 600 may compress the LFE signal, and the compressed LFE signal may be included in the M2 bitstream of the bitstreams of the dependent channel group #1.

The audio decoding apparatus 500 and the audio decoding apparatus 700 may reconstruct the audio signal of the 7.1.4 channel layout, based on the compressed audio signals of the base channel group and the dependent channel group #1.

The audio decoding apparatus 500 and the audio decoding apparatus 700 may perform de-mixing in a stepwise manner, by using at least one up-mixing unit. De-mixing may be performed based on audio signals of channels included in at least one channel group.

For example, a 1.x to 2.x up-mixing unit (first up-mixing unit) may de-mix an audio signal of a right channel from an audio signal of a mono channel that is a mixed right channel.

Alternatively, a 2.x to 3.x up-mixing unit (second up-mixing unit) may de-mix an audio signal of a center channel from audio signals of the L2 and R2 channels corresponding to a mixed center channel. Alternatively, the 2.x to 3.x up-mixing unit (second up-mixing unit) may de-mix an audio signal of an L3 channel and an audio signal of an R3 channel from audio signals of the L2 and R2 channels of the mixed L3 and R3 channels and the audio signal of the C channel.

A 3.x to 5.x up-mixing unit (third up-mixing unit) may de-mix audio signals of the Ls5 channel and the Rs5 channel from the audio signals of the L3, R3, L(5), and R(5) channels that correspond to an Ls5/Rs5 mixed channel.

A 5.x to 7.x up-mixing unit (fourth up-mixing unit) may de-mix an audio signal of a Lb channel and an audio signal of an Rb channel from audio signals of the Ls5, Ls7, and Rs7 channels that correspond to the mixed Lb/Rb channel.

An x.x.2(FH) to x.x.2(H) up-mixing unit (fourth up-mixing unit) may de-mix audio signals of the Hl channel and the Hr channel from the audio signals of the Hfl3, Hfr3, L3, L5, R3, and R5 channels that correspond to the mixed Ls/Rs channel.

An x.x.2(H) to x.x.4 up-mixing unit (fifth up-mixing unit) may de-mix audio signals of the Hbl channel and the Hbr channel from the audio signals of the Hl, Hr, Hfl, and Hfr channels that correspond to the mixed Hbl/Hbr channel.

For example, the audio decoding apparatus 500 and the audio decoding apparatus 700 may perform de-mixing to the 3.2.1 channel layout by using the first up-mixing unit.

The audio decoding apparatus 500 and the audio decoding apparatus 700 may perform de-mixing to the 7.1.4 channel layout by using the second up-mixing unit and the third mixing unit for the surround channel and the fourth up-mixing unit and the fifth up-mixing unit for the height channel.

Alternatively, the audio decoding apparatus 500 and the audio decoding apparatus 700 may perform de-mixing to the 7.1.0 channel layout by using the first mixing unit, the second mixing unit, and the third mixing unit. The audio decoding apparatus 500 and the audio decoding apparatus 700 may not perform de-mixing to the 7.1.4 channel layout from the 7.1.0 channel layout.

Alternatively, the audio decoding apparatus 500 and the audio decoding apparatus 700 may perform de-mixing to the 7.1.4 channel layout by using the first mixing unit, the second mixing unit, and the third mixing unit. The audio decoding apparatus 500 and the audio decoding apparatus 700 may not perform de-mixing on the height channel.

Hereinafter, rules for generating a channel group by the audio encoding apparatus 400 and the audio encoding apparatus 600 will be described. For a channel layout CLi (i is an integer from 0 to n, and Cli indicates Si, Wi, and Hi) for a scalable format, Si+Wi+Hi may mean the number of channels for a channel group #i. The number of channels for the channel group #i may be greater than the number of channels for a channel group #i−1.

The channel group #i may include as many original channels of Cli (display channels) as possible. The original channels may follow a priority described below.

When $H_{i-1}$ is 0, the priority of the height channel may be higher than those of other channels. The priorities of the center channel and the LFE channel may precede other channels.

The priority of the height front channel may precede the priorities of the side channel and the height back channel.

The priority of the side channel may precede the priority of the back channel. Moreover, the priority of the left channel may precede the priority of the right channel.

For example, when n is 4, CL0 is a stereo channel, CL1 is a 3.1.2 channel, CL2 is a 5.1.2 channel, and CL3 is a 7.1.4 channel, the channel group may be generated as described below.

The audio encoding apparatus 400 and the audio encoding apparatus 600 may generate the base channel group including the A(L2) and B(R2) signals. The audio encoding apparatus 400 and the audio encoding apparatus 600 may generate the dependent channel group #1 including the Q1(Hfl3), Q2(Hfr3), T(=C), and P(=LFE) signals. The audio encoding apparatus 400 and the audio encoding apparatus 600 may generate the dependent channel group #2 including the S1(=L) and S2(=R) signals.

The audio encoding apparatus 400 and the audio encoding apparatus 600 may generate the dependent channel group #3 including the V1(Hfl), V2(Hfr), U1(Ls), and U2(Rs) signals.

The audio decoding apparatus 500 and the audio decoding apparatus 700 may reconstruct the audio signal of the 7.1.4 channel from the decompressed audio signals by using a down-mixing matrix. In this case, the down-mixing matrix may include, for example, a down-mixing weight parameter as in Table 3 provided below.

weight parameter sets, and at least one of $\alpha$, $\beta$, $\gamma$, $\delta$, or w may be predefined in the LUT corresponding to the one down-mixing (or de-mixing) weight parameter set. Thus, the audio decoding apparatus 500 and the audio decoding apparatus 700 may obtain $\alpha$, $\beta$, $\gamma$, $\delta$, and w corresponding to one down-mixing (de-mixing) weight parameter set.

A matrix for down-mixing from a first channel layout to a second channel layout may include a plurality of matrices. For example, the matrix may include a first matrix for down-mixing from the first channel layout to a third channel layout and a second matrix for down-mixing from the third channel layout to the second channel layout.

More specifically, for example, a matrix for down-mixing from an audio signal of the 7.1.4 channel layout to an audio signal of the 3.1.2 channel layout may include a first matrix for down-mixing from the audio signal of the 7.1.4 channel layout to the audio signal of the 5.1.4 channel layout and a second matrix for down-mixing from the audio signal of the 5.1.4 channel layout to the audio signal of the 3.1.2 channel layout.

Tables 4 and 5 show the first matrix and the second matrix for down-mixing from the audio signal of the 7.1.4 channel layout to the audio signal of the 3.1.2 channel layout based on a content-based down-mixing parameter and a surround-to-height-based weight.

TABLE 3

|  | L | R | C | LFE | Ls | Rs | Lb | Rb | Hfl | Hfr | Hbl | Hbr |
|---|---|---|---|---|---|---|---|---|---|---|---|---|
| A(L2/L3) | 1 |  | cw |  | $\delta*\alpha$ |  | $\delta*\beta$ |  |  |  |  |  |
| B(L2/L3) |  | 1 | c2 |  |  | $\delta*\alpha$ |  | $\delta*\beta$ |  |  |  |  |
| T(C) |  |  | 1 |  |  |  |  |  |  |  |  |  |
| P(LFE) |  |  |  | 1 |  |  |  |  |  |  |  |  |
| Q1(Hfl3) |  |  |  |  | $w*\delta*\alpha$ |  | $w*\delta*\beta$ |  | 1 |  | $\gamma$ |  |
| Q2(Hfr3) |  |  |  |  |  | $w*\delta*\alpha$ |  | $w*\delta*\beta$ |  | 1 |  | $\gamma$ |
| S1(L) | 1 |  |  |  |  |  |  |  |  |  |  |  |
| S2(R) |  | 1 |  |  |  |  |  |  |  |  |  |  |
| U1(Ls7) |  |  |  |  | 1 |  |  |  |  |  |  |  |
| U2(Rs7) |  |  |  |  |  | 1 |  |  |  |  |  |  |
| V1(Hfl3) |  |  |  |  |  |  |  |  |  |  | 1 |  |

Herein, cw indicates a center weight that may be 0 when the channel layout of the base channel group is the 3.1.2 channel layout and may be 1 when the channel layout of the base channel group is the 2-channel layout. Also, w may indicate a surround-to-height mixing weight. $\alpha$, $\beta$, $\gamma$, and $\delta$ may indicate down-mixing weight parameters and may be variable. The audio encoding apparatus 400 and the audio encoding apparatus 600 may generate a bitstream including down-mixing weight parameter information such as $\alpha$, $\beta$, $\gamma$, $\delta$, and w, and the audio decoding apparatus 500 and the audio decoding apparatus 700 may obtain the down-mixing weight parameter information from the bitstream.

On the other hand, the weight parameter information of the down-mixing matrix (or the de-mixing matrix) may be in the form of an index. For example, the weight parameter information of the down-mixing matrix (or the de-mixing matrix) may be index information indicating one down-mixing (or de-mixing) weight parameter set among a plurality of down-mixing (or de-mixing) weight parameter sets, and at least one down-mixing (or de-mixing) weight parameter corresponding to one down-mixing (or de-mixing) weight parameter set may exist in the form of a lookup table (LUT). For example, the weight parameter information of the down-mixing (or de-mixing) matrix may be information indicating one down-mixing (or de-mixing) weight parameter set among a plurality of down-mixing (or de-mixing)

TABLE 4

|  | L | R | C | LFE | Ls | Rs | Lb | Rb |
|---|---|---|---|---|---|---|---|---|
| Ls5 |  |  |  |  | $\alpha$ |  | $\beta$ |  |
| Rs5 |  |  |  |  |  | $\alpha$ |  | $\beta$ |

First Matrix (7.1 to 5.1 Down-Mixing Matrices)

TABLE 5

|  | L | R | C | LFE | Ls5 | Rs5 | Hfl | Hfr | Hbl | Hbr |
|---|---|---|---|---|---|---|---|---|---|---|
| L3 | 1 | 0 | 0 | 0 | $\gamma$ | 0 | 0 | 0 | 0 | 0 |
| R3 | 0 | 1 | 0 | 0 | 0 | $\gamma$ | 0 | 0 | 0 | 0 |
| C | 0 | 0 | 1 | 0 | 0 | 0 | 0 | 0 | 0 | 0 |
| LFE | 0 | 0 | 0 | 1 | 0 | 0 | 0 | 0 | 0 | 0 |
| Hfl3 | 0 | 0 | 0 | 0 | $\gamma*w$ | 0 | 0 | 0 | $\delta$ | 0 |
| Hfl3 | 0 | 0 | 0 | 0 | 0 | $\gamma*w$ | 0 | 0 | 0 | $\delta$ |

Second Matrix (5.1.4 to 3.1.2 Down-Mixing Matrices)

Herein, $\alpha$, $\beta$, $\gamma$, or $\delta$ indicates one of down-mixing parameters, and w indicates a surround-to-height weight. For up-mixing (or de-mixing) from a 5.x channel to a 7.x channel, the de-mixing weight parameters $\alpha$ and $\beta$ may be used.

For up-mixing from an x.x.2(H) channel to an x.x.4 channel, the de-mixing weight parameter $\gamma$ may be used.

For up-mixing from a 3.x channel to a 5.x channel, the de-mixing weight parameter δ may be used.

For up-mixing from an x.x.2(FH) channel to an x.x.2(H) channel, the de-mixing weight parameters w and δ may be used.

For up-mixing from a 2.x channel to a 3.x channel, a de-mixing weight parameter of −3 dB may be used. That is, the de-mixing weight parameter may be a fixed value and may not be signaled.

Further, for up-mixing to the 1.x channel and the 2.x channel, a de-mixing weight parameter of −6 dB may be used. That is, the de-mixing weight parameter may be a fixed value and may not be signaled.

The de-mixing weight parameter used for de-mixing may be a parameter included in one of a plurality of types. For example, the de-mixing weight parameters α, β, γ, and δ of Type 1 may be 0 dB, 0 dB, −3 dB, and −3 dB. The de-mixing weight parameters α, β, γ, and δ of Type 2 may be −3 dB, −3 dB, −3 dB, and −3 dB. The de-mixing weight parameters α, β, γ, and δ of Type 3 may be 0 dB, −1.25 dB, −1.25 dB, and −1.25 dB. Type 1 may be a type indicating a case where an audio signal is a general audio signal, Type 2 may be a type (a dialogue type) indicating a case where a dialogue is included in an audio signal, and Type 3 may be a type (a sound effect type) indicating a case where a sound effect exists in the audio signal.

The audio encoding apparatus 400 and the audio encoding apparatus 600 may analyze an audio signal and determine one of a plurality of types according to the analyzed audio signal. The audio encoding apparatus 400 and the audio encoding apparatus 600 may perform down-mixing with respect to the original audio by using a de-mixing weight parameter of the determined type to generate an audio signal of a lower channel layout.

The audio encoding apparatus 400 and the audio encoding apparatus 600 may generate a bitstream including index information indicating one of the plurality of types. The audio decoding apparatus 500 and the audio decoding apparatus 700 may obtain the index information from the bitstream and identify one of the plurality of types based on the obtained index information. The audio decoding apparatus 500 and the audio decoding apparatus 700 may up-mix an audio signal of a decompressed channel group by using a de-mixing weight parameter of the identified type to reconstruct an audio signal of a particular channel layout.

Alternatively, the audio signal generated according to down-mixing may be expressed as Equation 1 provided below. That is, down-mixing may be performed based on an operation using an equation in the form of a first-degree polynomial, and each down-mixed audio signal may be generated.

Equation 1

$$Ls5 = \alpha \times Ls7 + \beta \times Lb7$$

$$Rs5 = \alpha \times Rs7 + \beta \times Rb7$$

$$L3 = L5 + \delta \times Ls5$$

$$R3 = R5 + \delta \times Rs5$$

$$L2 = L3 + p_2 \times C$$

$$R2 = R3 + p_2 \times C$$

$$Mono = p_1 \times (L2 + R2)$$

$$Hl = Hfl + \gamma \times Hbl$$

$$Hr = Hfr + \gamma \times Hbr$$

$$Hfl3 = Hl \times w' \times \delta \times Ls5$$

$$Hfr3 = Hr \times w' \times \delta \times Rs5 \qquad \text{-Eq. 1}$$

Herein, $p_1$ may be about 0.5 (i.e., −6 dB), and $p_2$ may be about 0.707 (i.e., −3 dB). α and β may be values used for down-mixing the number of surround channels from 7 channels to 5 channels. For example, α or β may be one (i.e., 0 dB), 0.866 (i.e., −1.25 dB), and 0.707 (i.e., −3 dB). Also, γ may be a value used to down-mix the number of height channels from 4 channels to 5 channels. For example, γ may be one of 0.866 or 0.707. δ may be a value used to down-mix the number of surround channels from 5 channels to 3 channels. δ may be one of 0.866 or 0.707. w' may be a value used for down-mixing from H2 (e.g., a height channel of the 5.1.2 channel layout or the 7.1.2 channel layout) to Hf2 (the height channel of the 3.1.2 channel layout).

Likewise, an audio signal generated by de-mixing may be expressed as in Equation 2. That is, de-mixing may be performed in a stepwise manner (an operation process of each equation corresponds to one de-mixing process) based on an operation using an equation in the form of a first-degree polynomial, without being limited to an operation using a de-mixing matrix, and each de-mixed audio signal may be generated.

Equation 2

$$R2 = \frac{1}{p_1} \times Mono - L2 \qquad \text{Eq. 2}$$

$$L3 = L2 - p_2 \times C$$

$$R3 = R2 - p_2 \times C$$

$$Ls5 = \frac{1}{\delta} \times (L3 - L5)$$

$$Rs5 = \frac{1}{\delta} \times (R3 - R5)$$

$$Lb7 = \frac{1}{\beta} \times (Ls5 - \alpha \times Ls7)$$

$$Rb7 = \frac{1}{\beta} \times (Rs5 - \alpha \times Rs7)$$

$$Hl = Hfl3 - w' \times (L3 - L5)$$

$$Hr = Hfr3 - w' \times (R3 - R5)$$

$$Hbl = \frac{1}{\gamma} \times (Hl - Hfl)$$

$$Hbr = \frac{1}{\gamma} \times (Hr - Hfr)$$

Also, w' may be a value used for down-mixing from H2 (e.g., the height channel of the 5.1.2 channel layout or the 7.1.2 channel layout) to Hf2 (the height channel of the 3.1.2 channel layout) or for de-mixing from Hf2 (the height channel of the 3.1.2 channel layout) to the H2 (e.g., the height channel of the 5.1.2 channel layout or the 7.1.2 channel layout).

A value of sum$_w$ and w' corresponding thereto may be updated according to w. w may be about −1 or 1, and may be transmitted for each frame.

For example, an initial value of sum$_w$ may be 0, and when w is 1 for each frame, the value of sum$_w$ may increase by 1, and when w is −1 for each frame, the value of sum$_w$ may decrease by 1. When the value of sum$_w$ increases or decreases by 1, the value of sum$_w$ may be maintained as 0 or 10 when the value is out of a range of 0-10. Table 5 showing a relationship between w' and sum$_w$ may be as below. That is, w' may be gradually updated for each frame and thus may be used for de-mixing from Hf2 to H2.

TABLE 6

| sum$_w$ | 0 | 1 | 2 | 3 | 4 | 5 |
|---|---|---|---|---|---|---|
| w' | 0 | 0.0179 | 0.0391 | 0.0658 | 0.1038 | 0.25 |
| sum$_w$ | 6 | 7 | 8 | 9 | 10 | |
| w' | 0.3962 | w' | 0.4609 | 0.4821 | 0.5 | |

Without being limited thereto, de-mixing may be performed by integrating a plurality of de-mixing processes. For example, a signal of an Ls5 channel or an Rs5 channel de-mixed from 2 surround channels of L2 and R2 may be expressed as Equation 3 that arranges second to fifth equations of Equation 2.

Equation 3

$$Ls5 = \frac{1}{\delta} \times (L2 - p_2 \times C - L5) \qquad \text{Eq. 3}$$

$$Rs5 = \frac{1}{\delta} \times (R2 - p_2 \times C - R5)$$

A signal of an Hl channel or an Hr channel de-mixed from the 2 surround channels of L2 and R2 may be expressed as Equation 4 that arranges the second and third equations and eighth and ninth equations of Equation 2.

Equation 4

$$Hl = Hfl3 - w \times (L2 - p_2 \times C - L5)$$

$$Hr = Hfr3 - w \times (R2 - p_2 \times C - R5) \qquad \text{-Eq. 4}$$

Figure 8B:
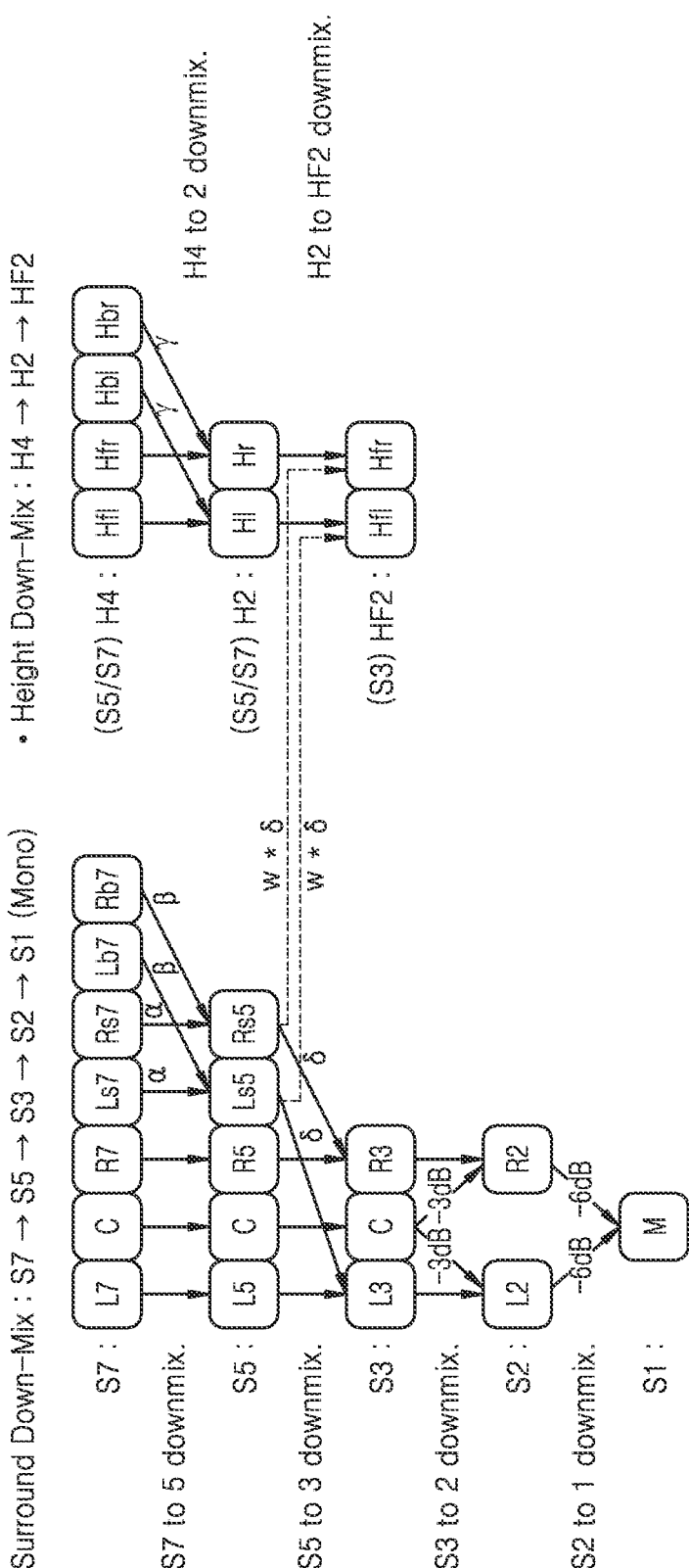
FIG. 8B and FIG. 8C are each diagrams for describing a mechanism of step-by-step down-mixing according to an embodiment of the disclosure.
Figure 8C:
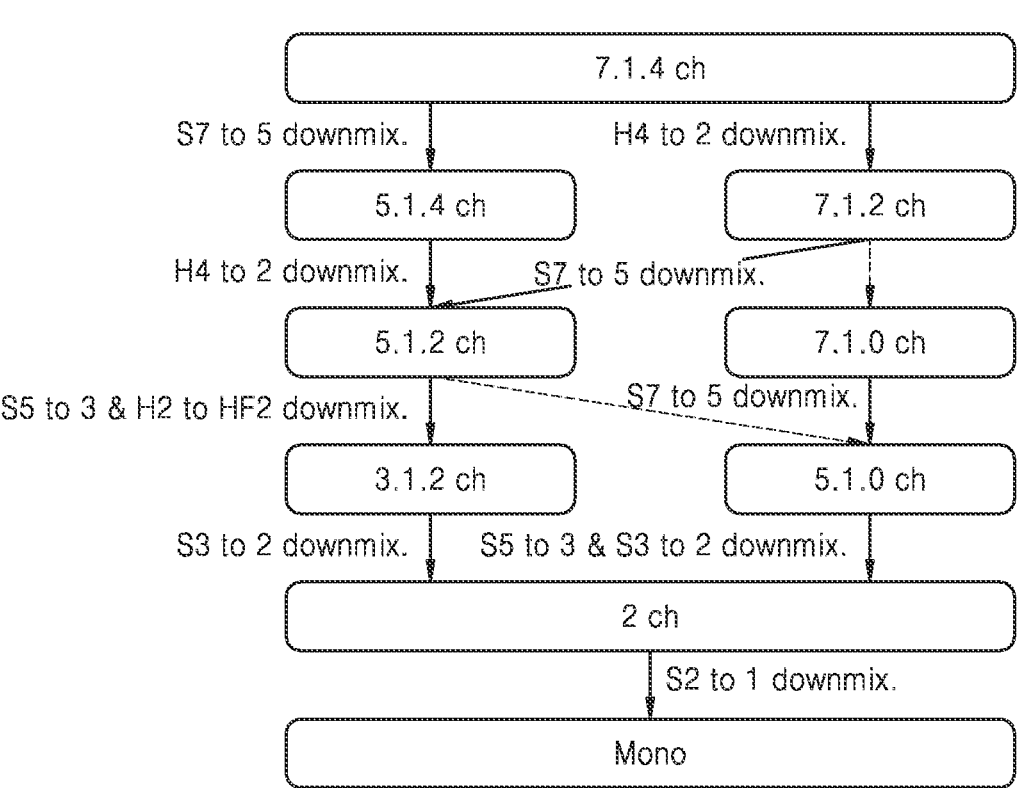

FIG. 8B and FIG. 8C are diagrams for describing a mechanism of step-by-step down-mixing according to an embodiment of the disclosure. A step-by-step down-mixing of a surround channel and a height channel may have, for example, the mechanism as shown in FIG. 8B and FIG. 8C.

Down-mixing-related information (or de-mixing-related information) may be index information indicating one of a plurality of modes based on combinations of preset 5 down-mixing weight parameters (or de-mixing weight parameters). For example, as shown in Table 7, down-mixing weight parameters corresponding to a plurality of modes may be previously determined.

TABLE 7

| Mode | Down-mixing weight parameter ($\alpha$, $\beta$, $\gamma$, $\delta$, w) (or de-mixing weight parameter) |
|---|---|
| 1 | (1, 1, 0.707, 0.707, −1) |
| 2 | (0.707, 0.707, 0.707, 0.707, −1) |
| 3 | (1, 0.866, 0.866, 0.866, −1) |
| 4 | (1, 1, 0.707, 0.707, 1) |
| 5 | (0.707, 0.707, 0.707, 0.707, 1) |
| 6 | (1, 0.866, 0.866, 0.866, 1) |

Hereinbelow, an audio encoding process and audio decoding process for performing down-mixing or de-mixing based on a scene classification result of an audio signal will be described with reference to FIG. 9A, FIG. 9B, FIG. 10A, FIG. 10B.

Hereinbelow, embodiments of the disclosure according to the technical spirit of the disclosure will be sequentially described in detail.

Figure 9A:
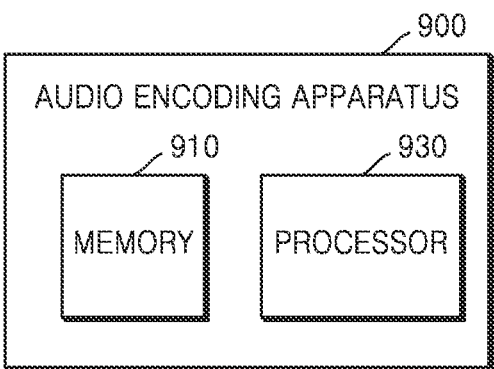
FIG. 9A is a block diagram of an audio encoding apparatus according to an embodiment of the disclosure.

FIG. 9A is a block diagram of an audio encoding apparatus according to an embodiment of the disclosure.

An audio encoding apparatus 900 may include a memory 910 and a processor 930. The audio encoding apparatus 900 may be implemented as an apparatus capable of performing audio processing such as a server, a TV, a camera, a cellular phone, a tablet PC, a laptop computer, etc.

While the memory 910 and the processor 930 are shown separately in FIG. 9A, the memory 910 and the processor 930 may be implemented through one hardware module (e.g., a chip).

The processor 930 may be implemented as a dedicated processor for audio processing based on a neural network. Alternatively, the processor 930 may be implemented through a combination of a general-purpose processor, such as an AP, a CPU, or a GPU, and software. The dedicated processor may include a memory for implementing an embodiment of the disclosure or a memory processor for using external memory.

The processor 930 may include a plurality of processors. In this case, the processor 330 may be implemented as a combination of dedicated processors, or may be implemented through a combination of software and a plurality of general-purpose processors such as an AP, a CPU, or a GPU.

The memory 910 may store one or more instructions for audio processing. In an embodiment of the disclosure, the memory 910 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 910. The neural network may be implemented by an external device (e.g., a server), and in this case, the audio encoding apparatus 900 may request and receive result information based on the neural network from the external device.

The processor 930 may sequentially process successive frames according to an instruction stored in the memory 910 and obtain successive encoded (compressed) frames. The successive frames may refer to frames that constitute audio.

The processor 930 may perform an audio processing operation with the original audio signal as an input and output a bitstream including a compressed audio signal. In this case, the original audio signal may be a multi-channel audio signal. The compressed audio signal may be a multi-channel audio signal having channels of a number less than or equal to the number of channels of the original audio signal. In this case, the bitstream may include a compressed audio signal of a base channel group, and furthermore, compressed audio signals of n dependent channel groups (n is an integer greater than or equal to 1). Thus, according to the number of dependent channel groups, the number of channels may be freely increased.

Figure 9B:
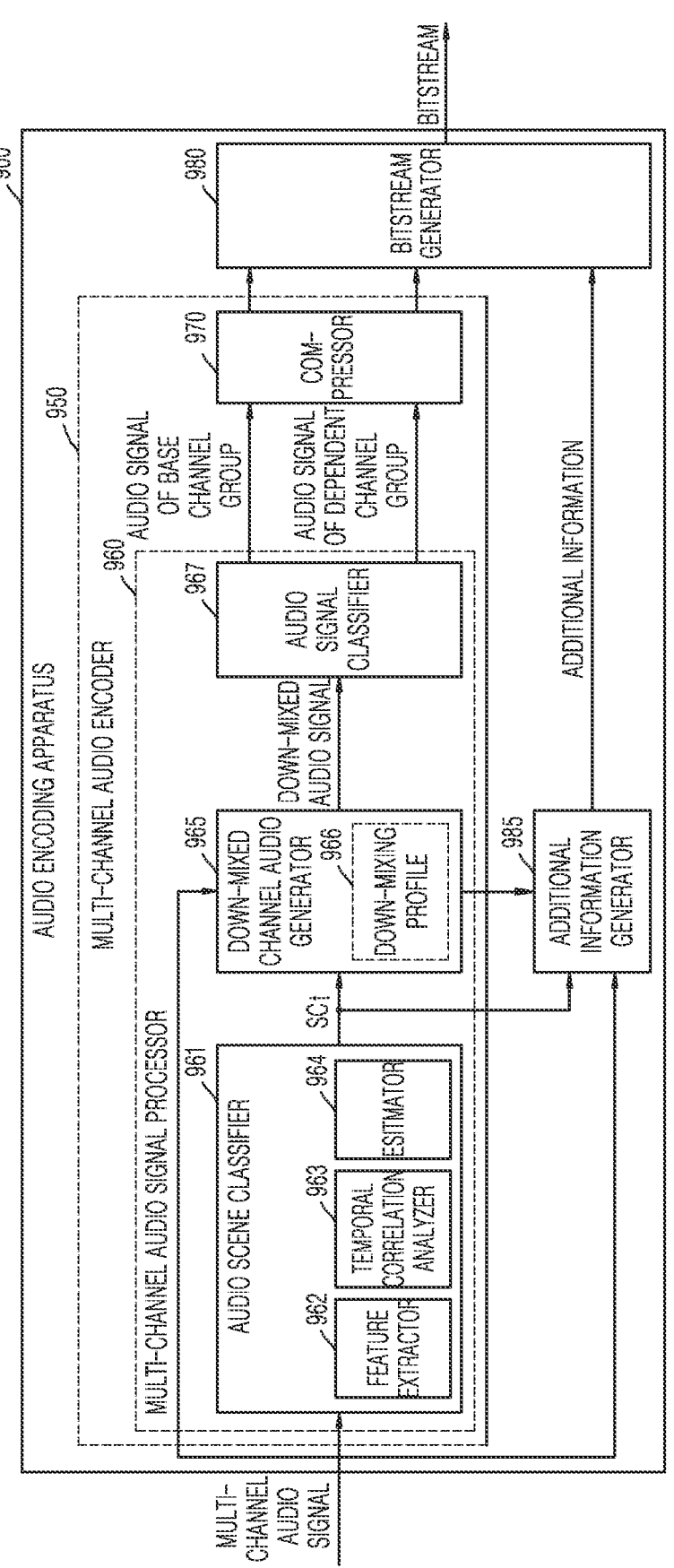
FIG. 9B is a block diagram of an audio encoding apparatus according to an embodiment of the disclosure.

FIG. 9B is a block diagram of an audio encoding apparatus 900 according to an embodiment of the disclosure.

An audio encoding apparatus 900 may include a multi-channel audio encoder 950, a bitstream generator 980, and an additional information generator 985. The multi-channel audio encoder 950 may include a multi-channel audio signal processor 960 and a compressor 970.

Referring back to FIG. 9A, as described above, the audio encoding apparatus 900 may include the memory 910 and the processor 930, and an instruction for implementing the components, such as the multi-channel audio encoder 950, the multi-channel audio signal processor 960, the down-mixed channel audio generator 965, the compressor 970, the bitstream generator 980, and the additional information generator 985, of FIG. 9B may be stored in the memory 910 of FIG. 9A. The processor 930 may execute the instruction stored in the memory 910. The multi-channel audio encoder 950, the multi-channel audio signal processor 960, the down-mixed channel audio generator 965, the compressor 970, the bitstream generator 980, and the additional information generator 985 shown in FIG. 9B may be obtained by classifying operations performed by the processor 930 executing a program (or instruction) stored in the memory 910 according to functions. Accordingly, operations described below as being performed by the multi-channel audio encoder 950, the multi-channel audio signal processor 960, the down-mixed channel audio generator 965, the compressor 970, the bitstream generator 980, and the additional information generator 985 shown in FIG. 9B may be considered as actually being performed by the processor 930.

The multi-channel audio signal processor 960 may obtain (for example, generate) at least one audio signal of a base channel group and at least one audio signal of at least one dependent channel group from a multi-channel audio signal (that is, the original audio signal).

The multi-channel audio signal processor 960 may include the audio scene classifier 961, the down-mixed channel audio generator 965, and the audio signal classifier 967. Operations of the audio scene classifier 961 and the down-mixed channel audio generator 965 correspond to operations of the audio scene classifier 100 and the audio scene classifier 210 and the down-mixed channel audio generator 220 of FIG. 1A, FIG. 1B, FIG. 1C, FIG. 1D, and FIG. 2A, respectively, and thus, detailed descriptions thereof are replaced with descriptions of FIG. 1A, FIG. 1B, FIG. 1C, FIG. 1D, and FIG. 2A.

The audio scene classifier 961 may include the feature extractor 962, the temporal correlation analyzer 963, and the estimator 964. Operations of the feature extractor 962, the temporal correlation analyzer 963, and the estimator 964 correspond to operations of the feature extractor 110 and the feature extractor 212, the temporal correlation analyzer 120 and the temporal correlation analyzer 214, and the estimator 130 and the estimator 216 of FIG. 1A, FIG. 1B, FIG. 1C, FIG. 1D, and FIG. 2A, respectively, and thus, detailed descriptions thereof are replaced with the descriptions of FIG. 1A, FIG. 1B, FIG. 1C, FIG. 1D, and FIG. 2A.

signal, an audio signal (for example, a C channel signal) of a center channel, an audio signal (for example, an L channel signal and an R channel signal) of a front channel, and an audio signal (for example, an SL channel signal and an SR channel signal) of a side channel. The audio scene classifier 961 may classify the multi-channel audio signal into a dialogue type, an effect type, or a music type based on the obtained audio signal of the center channel, the audio signal of the front channel, and the audio signal of the side channel. However, the disclosure is not limited thereto, and the multi-channel audio signal may be classified into various scene types having different features (for example, a frequency, a strength, a spectrum, etc.) from each other. In an embodiment of the disclosure, the audio scene classifier 961 may classify the multi-channel audio signal as a default type. Here, the default type indicates a type other than a predetermined scene type.

The audio scene classifier 961 may determine a scene type of the multi-channel audio signal by using a neural network (for example, a first neural network and a second neural network) for classifying a scene. Specifically, the audio scene classifier 961 may obtain a probability value corresponding to a predetermined scene type by using the neural network. The audio scene classifier 961 may determine a scene type of the multi-channel audio signal as a scene type having the highest probability value. The audio scene classifier 961 may output the determined scene type (that is, the scene classification result $SC_r$).

The down-mixed channel audio generator 965 may down-mix the multi-channel audio signal according to a predetermined channel layout, based on the scene classification result $SC_r$. The down-mixed channel audio generator 965 may generate an audio signal (that is, a down-mixed audio signal) of the predetermined channel layout as a result of the down-mixing. Specifically, the down-mixed channel audio generator 965 may receive the scene classification result $SC_r$. The down-mixed channel audio generator 965 may obtain the down-mixing profile 966 corresponding to the scene classification result $SC_r$. The down-mixed channel audio generator 965 may obtain, based on the down-mixing profile, down-mixing parameters for mixing the multi-channel audio signal into a multi-channel audio signal having a different channel layout. The down-mixed channel audio generator 965 may down-mix the multi-channel audio signal based on the down-mixing parameters.

TABLE 8

| Down-mixing | | (Input) 7.1.4 channel audio signal | | | | | | | | | | | |
|---|---|---|---|---|---|---|---|---|---|---|---|---|---|
| matrix | | L | R | C | LFE | SL | SR | BL | BR | Hfl | Hfr | Hbl | Hbr |
| (Output) | $L_{bot}$ | 1 | 0 | 0 | 0 | α | 0 | β | 0 | 0 | 0 | 0 | 0 |
| 3.1.2 | $R_{bot}$ | 0 | 1 | 0 | 0 | 0 | α | 0 | β | 0 | 0 | 0 | 0 |
| channel | C | 0 | 0 | 1 | 0 | 0 | 0 | 0 | 0 | 0 | 0 | 0 | 0 |
| audio | LFE | 0 | 0 | 0 | 1 | 0 | 0 | 0 | 0 | 0 | 0 | 0 | 0 |
| signal | $L_{top}$ | 0 | 0 | 0 | 0 | α | 0 | β | 0 | 1 | 0 | γ | 0 |
| | $R_{top}$ | 0 | 0 | 0 | 0 | 0 | α | 0 | β | 0 | 1 | 0 | γ |

The audio scene classifier 961 may classify a scene corresponding to a multi-channel audio signal. The audio scene classifier 961 may classify the scene for each frame of the multi-channel audio signal.

The audio scene classifier 961 may down-sample the multi-channel audio signal and classify the scene corresponding to the multi-channel audio signal based on the down-sampled multi-channel audio signal.

In an embodiment of the disclosure, the audio scene classifier 961 may obtain, from the multi-channel audio

TABLE 9

| Down-mixing Parameter setting | α | β | γ |
|---|---|---|---|
| Dialogue | 0.707 | 0.707 | 0.707 |
| Sound effect | 0.866 | 0.750 | 0.866 |
| Music | 0.500 | 0.500 | 0.707 |

Referring to Table 8, for example, the down-mixed channel audio generator 965 may down-mix an audio signal of a 7.1.4 channel into an audio signal of a 3.1.2 channel by using the down-mixing matrix. Referring to Table 9 together with Table 8, down-mixing parameters (for example, α, β, γ) included in the down-mixing matrix may be differently configured according to scene types. The down-mixing profile 966 may include data corresponding to a down-mixing matrix and down-mixing parameter settings. A specific operation performed by the down-mixed channel audio generator 965 for down-mixing is similar to that described by using Equation 1, and thus is omitted.

The audio signal classifier 967 may generate at least one audio signal of a base channel group and at least one audio signal of a dependent channel group based on the down-mixed audio signal.

The compressor 970 may compress the audio signal of the base channel group and the audio signal of the dependent channel group. That is, the compressor 970 may compress at least one audio signal of the base channel group to obtain at least one compressed audio signal of the base channel group. Herein, compression may mean compression based on various audio codecs. For example, compression may include transformation and quantization processes.

The compressor 970 may obtain at least one compressed audio signal of at least one dependent channel group by compressing at least one audio signal of at least one dependent channel group.

The additional information generator 985 may generate additional information including a scene classification result SCt.

The bitstream generator 980 may generate a bitstream including the compressed audio signal of the base channel group and the compressed audio signal of the dependent channel group.

The bitstream generator 980 may generate a bitstream further including the additional information generated by the additional information generator 985.

More specifically, the bitstream generator 980 may generate a base audio stream and an auxiliary audio stream. The base audio stream may include the compressed audio signal of the base channel group, and the auxiliary audio stream may include the compressed audio signal of the dependent channel group.

In addition, the bitstream generator 980 may generate metadata including additional information. As a result, the bitstream generator 980 may generate a bitstream including the base audio stream, the auxiliary audio stream, and the metadata.

Although not described with reference to FIG. 9A and FIG. 9B, the audio encoding apparatus 900 may perform operations and functions of the audio encoding apparatus 400 and the audio encoding apparatus 600 described with reference to FIG. 4A, FIG. 4B, FIG. 4C, FIG. 4D, FIG. 6A, and FIG. 6B.

Figure 10A:
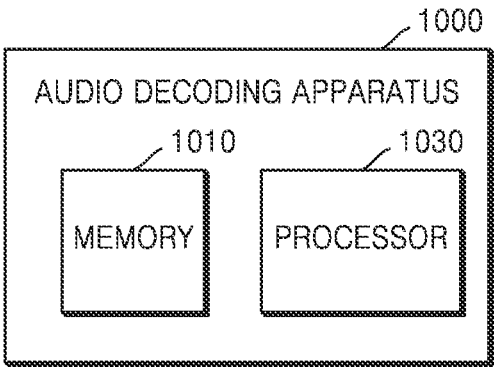
FIG. 10A is a block diagram of an audio decoding apparatus according to an embodiment of the disclosure.

FIG. 10A is a block diagram of an audio decoding apparatus 1000 according to an embodiment of the disclosure.

An audio decoding apparatus 1000 may include a memory 1010 and a processor 1030. The audio decoding apparatus 1000 may be implemented as a device capable of audio processing, such as a server, a TV, a camera, a mobile phone, a tablet PC, a laptop, and the like.

While the memory 1010 and the processor 1030 are shown separately in FIG. 10A, the memory 1010 and the processor 1030 may be implemented through one hardware module (e.g., a chip).

The processor 1030 may be implemented as a dedicated processor for audio processing based on a neural network. Alternatively, the processor 1030 may be implemented through a combination of a general-purpose processor, such as an AP, a CPU, or a GPU, and software. The dedicated processor may include a memory for implementing an embodiment of the disclosure or a memory processor for using an external memory.

The processor 1030 may include a plurality of processors. In this case, the processor 1030 may be implemented as a combination of dedicated processors, or may be implemented through a combination of software and a plurality of general-purpose processors such as an AP, a CPU, or a GPU.

The memory 1010 may store one or more instructions for audio processing. In an embodiment of the disclosure, the memory 1010 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 1010. The neural network may be implemented by an external device (e.g., a server), and in this case, the audio decoding apparatus 1000 may request and receive result information based on the neural network from the external device.

The processor 1030 may sequentially process successive frames according to an instruction stored in the memory 1010 to obtain successive reconstructed frames. The successive frames may refer to frames that constitute audio.

The processor 1030 may output a multi-channel audio signal by performing an audio processing operation on an input bitstream. The bitstream may be implemented in a scalable form to increase the number of channels from the base channel group. For example, the processor 1030 may obtain a compressed audio signal of a base channel group from the bitstream, and may reconstruct an audio signal of the base channel group (for example, a stereo channel audio signal) by decompressing the compressed audio signal of the base channel group. Additionally, the processor 1030 may reconstruct an audio signal of a dependent channel group by decompressing a compressed audio signal of the dependent channel group from the bitstream. The processor 1030 may reconstruct a multi-channel audio signal based on the audio signal of the base channel group and the audio signal of the dependent channel group.

The processor 1030 may reconstruct an audio signal of a first dependent channel group by decompressing a compressed audio signal of the first dependent channel group from the bitstream. The processor 1030 may reconstruct an audio signal of the second dependent channel group by decompressing a compressed audio signal of the second dependent channel group.

The processor 1030 may reconstruct a multi-channel audio signal of an increased number of channels, based on the audio signal of the base channel group and the respective audio signals of the first and second dependent channel groups. Likewise, the processor 330 may decompress compressed audio signals of n dependent channel groups (where n is an integer greater than 2), and may reconstruct a multi-channel audio signal of a further increased number of channels based on the audio signal of the base channel group and the respective audio signals of the base channel group and the n dependent channel groups.

Figure 10B:
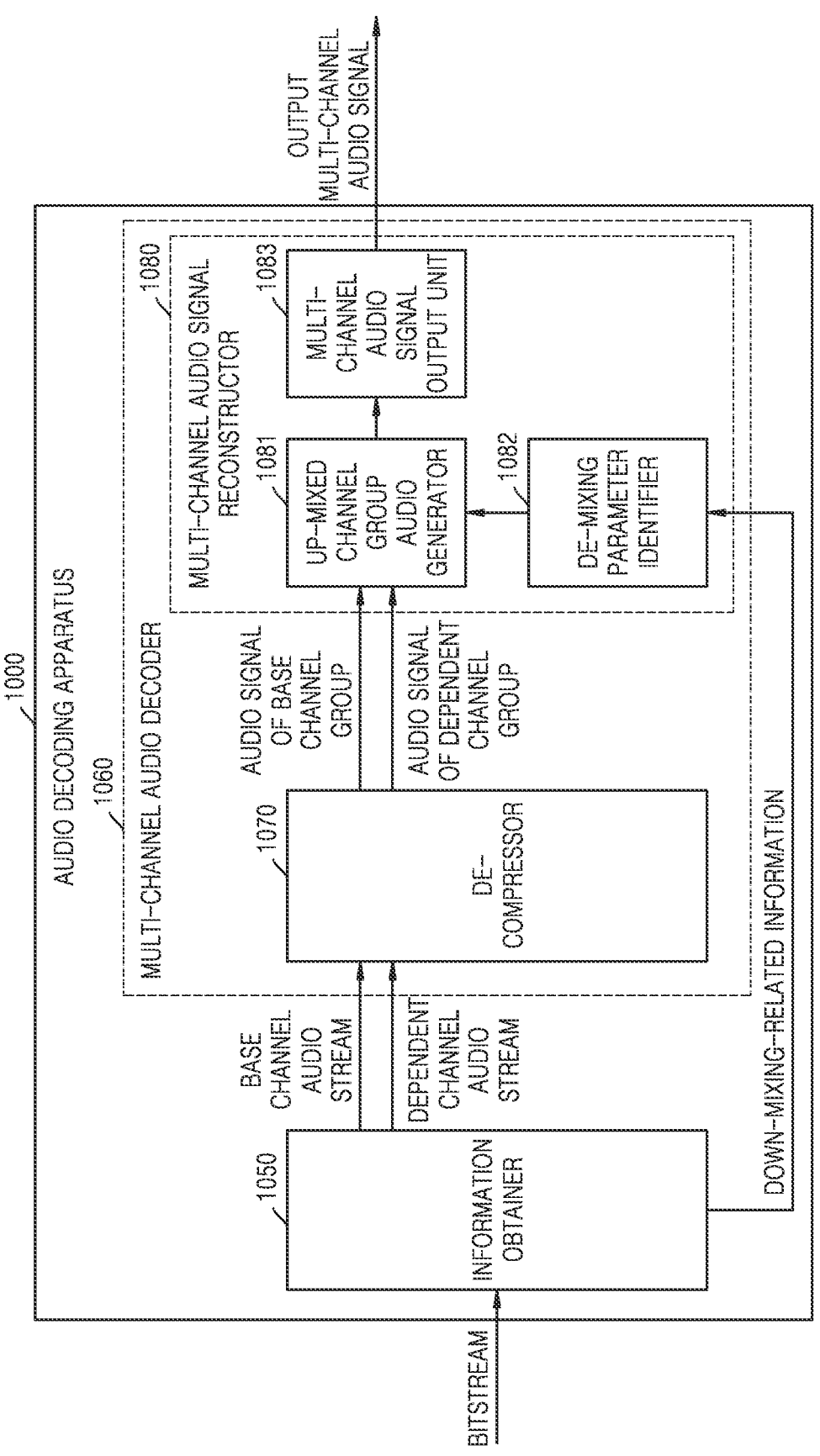
FIG. 10B is a block diagram of an audio decoding apparatus according to an embodiment of the disclosure.

FIG. 10B is a block diagram of an audio decoding apparatus 1000 according to an embodiment of the disclosure.

Referring to FIG. 10B, the audio decoding apparatus 1000 may include an information obtainer 1050 and a multi-channel audio decoder 1060. The multi-channel audio decoder 1060 may include a decompressor 1070 and a multi-channel audio signal reconstructor 1080. The multi-channel audio signal reconstructor 1080 may include an up-mix channel group audio generator 1081, a de-mixing parameter identifier 1082, and a multi-channel audio signal output unit 1083.

The audio decoding apparatus 1000 may include the memory 1010 and the processor 1030 of FIG. 10A, and an instruction for implementing each of the information obtainer 1050, the multi-channel audio decoder 1060, the decompressor 1070, the multi-channel audio signal reconstructor 1080, the up-mix channel group audio generator 1081, the de-mixing parameter identifier 1082, and the multi-channel audio signal output unit 1083 of FIG. 10B may be stored in the memory 1010. The processor 1030 may execute the instruction stored in the memory 1010. The processor 1030 may execute the instructions stored in the memory 1010. The information obtainer 1050, the multi-channel audio decoder 1060, the decompressr 1070, the multi-channel audio signal reconstructor 1080, the up-mix channel group audio generator 1081, the de-mixing parameter identifier 1082, and the multi-channel audio signal output unit 1083 shown in FIG. 10B may be obtained by classifying operations performed by the processor 1030 executing a program (or instruction) stored in the memory 1010 according to functions. Accordingly, operations described below as being performed by the elements the information obtainer 1050, the multi-channel audio decoder 1060, the decompressor 1070, the multi-channel audio signal reconstructor 1080, the up-mix channel group audio generator 1081, the de-mixing parameter identifier 1082, and the multi-channel audio signal output unit 1083 shown in FIG. 10B may be considered as actually being performed by the processor 1030.

The information obtainer 1050 may obtain down-mixing-related information corresponding to a down-mixed audio signal corresponding to an original audio signal and a scene classification result. The scene classification result may be obtained based on a temporal correlation vector between a first feature vector corresponding to a first frame of the original audio signal and at least one second feature vector corresponding to at least one second frame before the first frame of the original audio signal. A specific process of obtaining the scene classification result is described with reference to FIG. 1A, FIG. 1B, FIG. 1C, FIG. 1D, FIG. 2A, and FIG. 2B, and thus is omitted below.

Specifically, the information obtainer 1050 may obtain a base audio stream and at least one auxiliary audio stream from a bitstream. The base audio stream may include at least one compressed audio signal of the base channel group. The auxiliary audio stream may obtain at least one compressed audio signal of at least one dependent channel group.

The information obtainer 1050 may obtain metadata from the bitstream. The metadata may include additional information. For example, the metadata may be down-mixing-related information including a scene classification result of the multi-channel audio signal (that is, the original audio signal). The down-mixing-related information may include index information indicating one of a plurality of scene types. The down-mixing-related information may be obtained for each frame, but may be periodically obtained for various data units. Alternatively, the down-mixing-related information may be non-periodically obtained every time when the scene is changed.

The decompressor 1070 may obtain an audio signal of the base channel group included in the base audio stream by decompressing at least one compressed audio signal of the base channel group. The decompressor 1070 may obtain at least one audio signal of the at least one dependent channel group included in the auxiliary audio stream from at least one compressed audio signal of the at least one dependent channel group.

The de-mixing parameter identifier 1082 may identify de-mixing parameters based on the down-mixing-related information. That is, the de-mixing parameter identifier 1082 may identify a de-mixing parameter corresponding to the scene classification result. In other words, the de-mixing parameter identifier 1082 may identify one scene type from among a plurality of scene types based on index information related to the scene classification result, and identify de-mixing parameters corresponding to the identified scene type. De-mixing parameters respectively corresponding to the plurality of scene types may be stored in the memory.

The up-mix channel group audio generator 1081 may generate (or reconstruct) an up-mix channel group audio signal by de-mixing at least one audio signal of the base channel group and at least one audio signal of at least one dependent channel group according to the de-mixing parameter. In an embodiment of the disclosure, the up-mix channel group audio signal may be an audio signal including at least one channel. In an embodiment of the disclosure, the up-mix channel group audio signal may be a multi-channel audio signal.

The multi-channel audio signal output unit 1083 may output at least one up-mix channel group audio signal (that is, an output multi-channel audio signal).

Although not described with reference to FIG. 10A and FIG. 10B, the audio decoding apparatus 1000 may perform the operations and functions of the audio decoding apparatus 500 and the audio decoding apparatus 700 described with reference to FIG. 5A, FIG. 5B, FIG. 5C, FIG. 5D, FIG. 7A, and FIG. 7B.

Above, the audio decoding apparatus 1000 perform an operation of de-mixing a down-mixed audio signal by using down-mixing-related information generated in units of frame. However, an audio signal in a higher channel layout (for example, a 7.1.4 channel layout) than an audio signal in an output channel layout may be reconstructed. That is, an audio signal in an output layout may not be reconstructed through de-mixing.

In this case, the audio decoding apparatus 1000 may reconstruct the audio signal in the output channel layout by down-mixing the reconstructed audio signal in the higher channel layout by using the down-mixing-related information generated in units of frame. As a result, the down-mixing-related information received from the audio decoding apparatus 900 is not limited to being used in the de-mixing operation by the audio decoding apparatus 1000, and may also be used in a down-mixing operation according to circumstances.

However, the flag information is not limited to being transmitted in units of frame, and down-mixing-related information may be signaled for a higher audio data unit (e.g., a parameter sampling unit) including k frames (k is an integer greater than 1). In this case, information about a size of the higher audio data unit and down-mixing-related information received from the higher audio data unit may be signaled through a bitstream. The information about the size of the higher audio data unit may be information about a value of k.

When down-mixing-related information is received from the higher audio data unit, the down-mixing-related information may not be obtained in units of frame included in the higher data unit. For example, down-mixing-related information may be obtained in a first frame included in the higher audio data unit and may not be obtained in frames after the first frame of the higher audio data unit.

A flag may be obtained in the frames after the first frame of the higher audio data unit.

Based on the flag, when it is identified that a scene type of a previous frame is not the same as that of a current frame, down-mixing-related information may be additionally obtained. Down-mixing-related information updated through the flag may be used in frames after the frame in which the flag is obtained in the higher audio data unit.

When the scene type of the previous frame is the same as that of the current frame, a flag for the current frame is not obtained, but down-mixing-related information previously obtained may be used.

According to an embodiment of the disclosure, an original sound effect may be maintained through appropriate down-mixing or up-mixing processing according to a scene classification result.

According to an embodiment of the disclosure, an audio signal may be dynamically mixed so that audio of a surround channel and audio of a height channel may be well represented in a large screen. That is, when audio being reproduced is concentrated in surround, an audio signal of surround channels Ls and Rs may be distributed not only to the L/R channels but also to the height channels, and thereby, the surround effect is maximized. Alternatively, by mixing the audio signal of the surround channels Ls and Rs to the L/R channel and not to the height channel, a horizontal sound and a vertical sound may be distinguished so that the surround effect and the height effect may be expressed in a balanced way at the same time.

Figure 11:
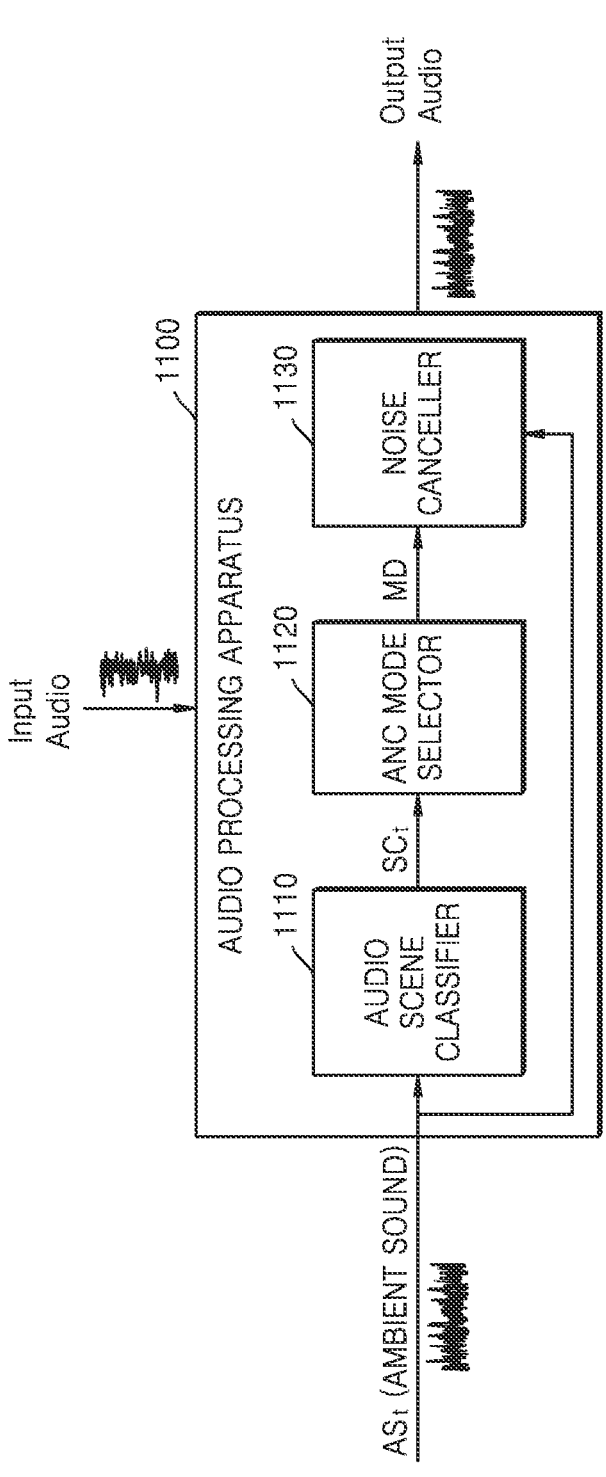
FIG. 11 is a block diagram of an audio processing apparatus according to an embodiment of the disclosure.

FIG. 11 is a block diagram of an audio processing apparatus according to an embodiment of the disclosure.

An audio processing apparatus 1100 may include an audio scene classifier 1110, an audio noise cancellation (ANC) mode selector 1120, and a noise canceler 1130. The audio processing apparatus 1100 may cancel ambient sounds while outputting an input audio signal.

The audio scene classifier 1110 may obtain an ambient sound $AS_t$. The audio scene classifier 1110 may classify a scene of the ambient sound $AS_t$. For example, the audio scene classifier 1110 may classify a degree of danger corresponding to the ambient sound $AS_t$. A configuration, operation, and function of the audio scene classifier 1110 correspond to the configuration, operation, and function of the audio scene classifier 100 described with reference to FIG. 1A, FIG. 1B, FIG. 1C, and FIG. 1D, and thus, detailed descriptions thereof are omitted.

Although not shown, the audio processing apparatus 1100 may further include a preprocessor. The preprocessor may receive the ambient sound $AS_t$. The preprocessor may transform the ambient sound $AS_t$ into a time-frequency domain. In an embodiment of the disclosure, the preprocessor may generate a spectrogram corresponding to the ambient sound $AS_t$. The preprocessor may transfer the transformed ambient sound (for example, a spectrogram) to the audio scene classifier 1110, and the audio scene classifier 1110 may classify a scene of the ambient sound $AS_t$ based on the transformed ambient sound.

The active noise canceling (ANC) mode selector 1120 may select a mode of an active noise cancellation based on the scene classification result $SC_t$. For example, the ANC mode selector 1120 may select a first mode of the active noise cancellation based on a first degree of danger and select a second mode of the active noise cancellation based on a second degree of danger. For example, when the degree of danger is large, the ANC mode selector 1120 may select the first mode in which noise canceling is performed with a stronger intensity, and when the degree of danger is smaller than the degree of danger corresponding to the first mode, select the second mode in which noise canceling is performed with a weaker strength. The ANC mode selector 1120 may transfer data MD corresponding to the selected mode to the noise canceler 1130.

The noise canceler 1130 may cancel the ambient sound $AS_t$. The noise canceler 1130 may determine a degree of cancellation of the ambient sound $AS_t$ according to the selected mode. The noise canceler 1130 may generate an opposite signal that cancels the ambient sound $AS_t$ according to the selected mode.

Although not shown, the audio processing apparatus 1100 may further include an audio output unit. The audio output unit may simultaneously output the input audio signal and the opposite signal.

According to an embodiment of the disclosure, as the audio scene classifier 1110 the scene of the ambient sound $AS_t$ with a small delay time, noise cancellation according to the scene may be quickly performed.

Figure 12:
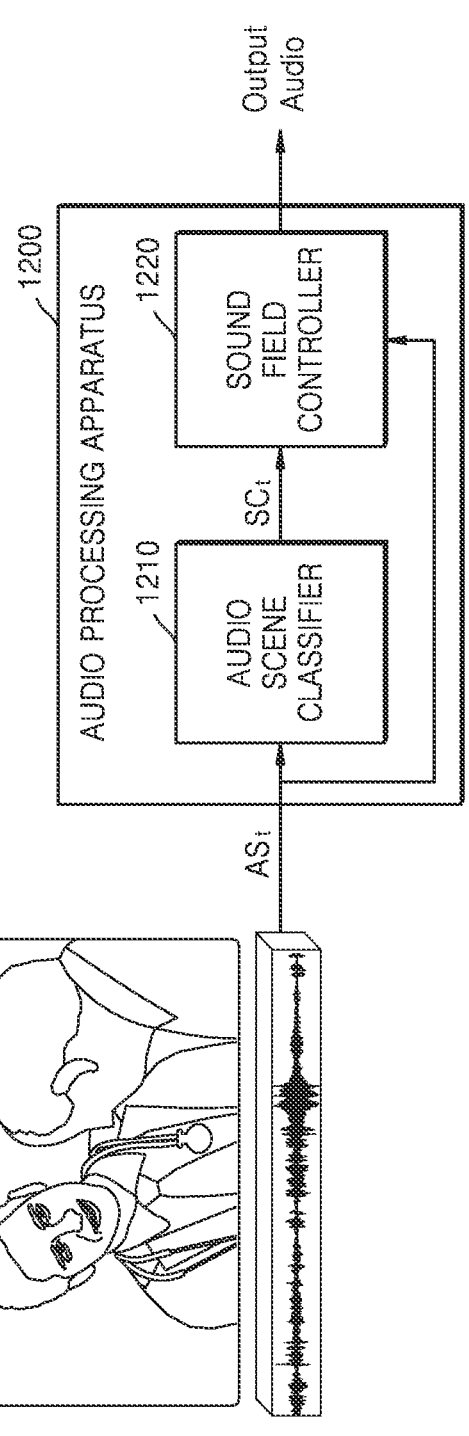
FIG. 12 is a block diagram of an audio processing apparatus according to an embodiment of the disclosure.

FIG. 12 is a block diagram of an audio processing apparatus according to an embodiment of the disclosure.

An audio processing apparatus 1200 may include an audio scene classifier 1210 and a sound field controller 1220.

The audio scene classifier 1210 may classify a scene of the first audio signal $AS_t$. For example, the first audio signal $AS_t$ may be an audio signal corresponding to a current frame (a first frame) from among audio signals (for example, a multi-channel audio signal and a stereo audio signal) provided through a streaming service (for example, an over-the-top (OTT) service). Configurations, operations, and functions of the audio scene classifier 1110 correspond to configurations, operations, and functions of the audio scene classifier 100 described with reference to FIG. 1A, FIG. 1B, FIG. 1C, and FIG. 1D, and thus, detailed descriptions thereof are omitted.

The sound field controller 1220 may adjust a sound field corresponding to the first audio signal $AS_t$ based on the scene classification result $SC_t$. For example, the sound field controller 1220 may obtain sound field control parameters corresponding to the scene classification result. The sound field control parameters may be predetermined by user or manufacturer settings. The sound field control parameters may vary for each scene type. The sound field controller 1220 may adjust a sound field in accordance with the scene type by deforming a frequency, intensity, or spectrum of the first audio signal $AS_t$ based on the sound field control parameters.

Although not shown, the audio processing apparatus 1200 may further include an audio output unit. The audio output unit may output an adaptive audio signal obtained by adjusting the sound field of the first audio signal $AS_t$.

According to an embodiment of the disclosure, as a scene of an audio signal is classified with a small delay time, a sound field may be adjusted by quickly responding to a scene change.

FIG. 13 is a flowchart of an audio processing method, according to an embodiment of the disclosure. For convenience of explanation, the audio processing method is described with reference to FIG. 1A, FIG. 1B, FIG. 1C, and FIG. 1D. The audio scene classifier 100 or multi-channel audio signal processor 200 may be referred to as an audio processing apparatus.

In operation S1310, the audio processing apparatus may obtain a first audio signal corresponding to a first frame.

In operation S1320, the audio processing apparatus may extract a first feature vector by using a first neural network with the first audio signal as an input.

In operation S1330, the audio processing apparatus may obtain a temporal correlation vector representing similarity between the first feature vector and at least one second feature vector extracted from at least one second audio signal corresponding to at least one second frame before the first frame.

In operation S1340, a scene of the first audio signal may be classified by using the first feature vector, the at least one second feature vector, and a second neural network with the temporal correlation vector as an input.

Figure 14A:
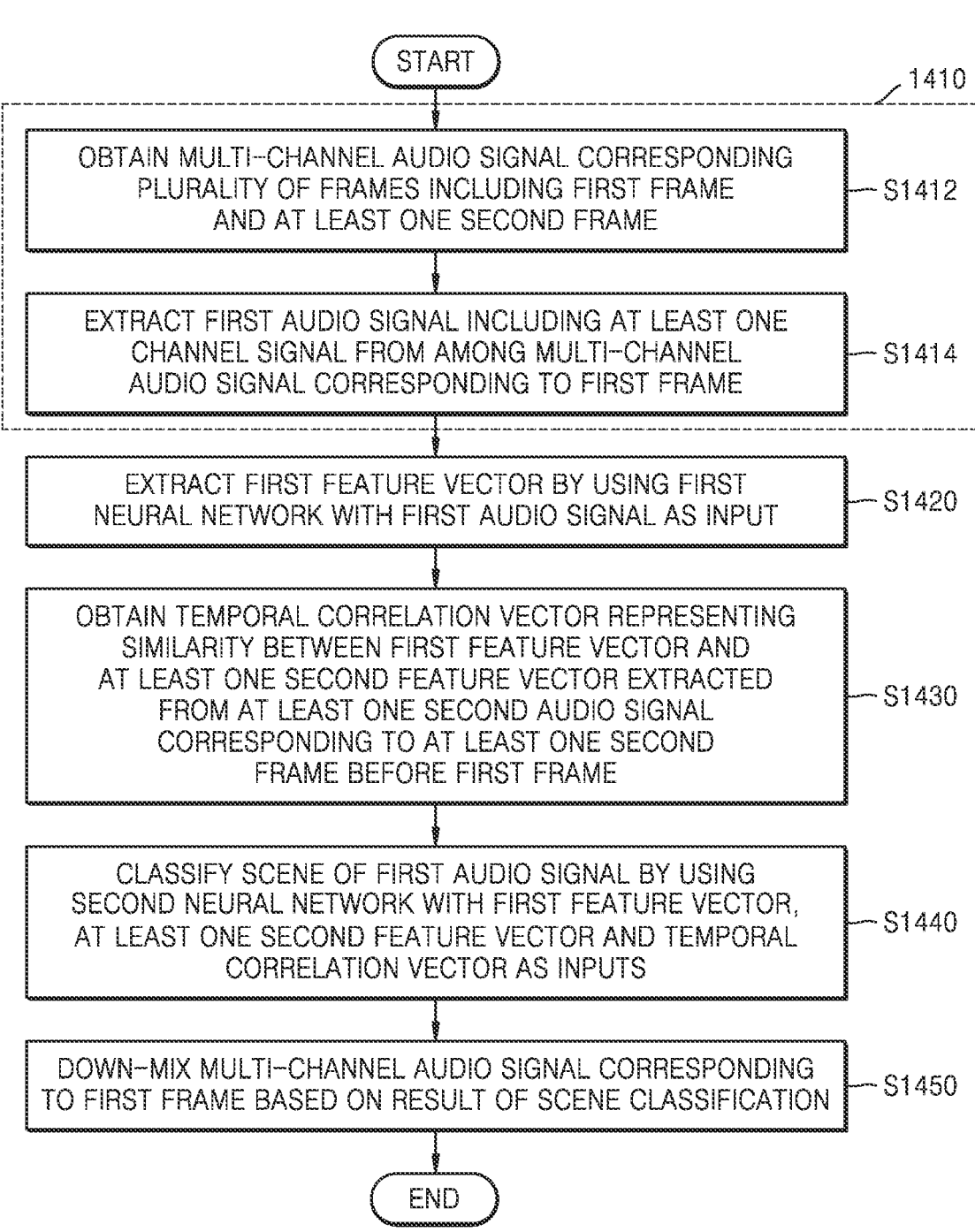
FIG. 14A is a flowchart of an audio processing method, according to an embodiment of the disclosure.

FIG. 14A is a flowchart of an audio processing method according to an embodiment of the disclosure. For convenience of explanation, the audio processing method is described with reference to FIG. 1A, FIG. 1B, FIG. 1C, FIG. 1D, FIG. 2A, and FIG. 13. The audio scene classifier 100 or multi-channel audio signal processor 200 may be referred to as an audio processing apparatus.

Operation S1410, operation S1420, operation S1430, and operation S1440 of FIG. 14A may correspond to operation S1310, operation S1320, operation S1330, and operation S1340 of FIG. 13, respectively. Accordingly, descriptions provided above with reference to FIG. 13 are omitted.

Operation S1410 of FIG. 14A may include operation S1412 and operation S1414.

In operation S1412, the audio processing apparatus may obtain a multi-channel audio signal corresponding to a plurality of frames including a first frame and at least one second frame.

In operation S1414, the audio processing apparatus may extract a first audio signal including at least one channel signal of a multi-channel audio signal corresponding to the first frame. In an embodiment of the disclosure, the audio processing apparatus may down-mix the multi-channel audio signal to the first audio signal.

In operation S1450, the audio processing apparatus may down-mix the multi-channel audio signal corresponding to the first frame based on the scene classification result.

FIG. 14B is a flowchart of an audio processing method according to an embodiment of the disclosure. For convenience of explanation, the audio processing method is described with reference to FIG. 1A, FIG. 1B, FIG. 1C, FIG. 1D, FIG. 2A, and FIG. 14A. The audio scene classifier 100 or multi-channel audio signal processor 200 may be referred to as an audio processing apparatus.

In an embodiment of the disclosure, operation S1450 of FIG. 14A may include operation S1452, operation S1454, and operation S1456.

In operation S1452, the audio processing apparatus may obtain a down-mixing profile corresponding to the scene classification result.

In operation S1454, the audio processing apparatus may obtain, based on the down-mixing profile, down-mixing parameters for mixing the multi-channel audio signal into a multi-channel audio signal having a different channel layout.

In operation S1456, the audio processing apparatus may down-mix the multi-channel audio signal corresponding to the first frame according to a channel layout, based on the down-mixing parameters.

Figure 15:
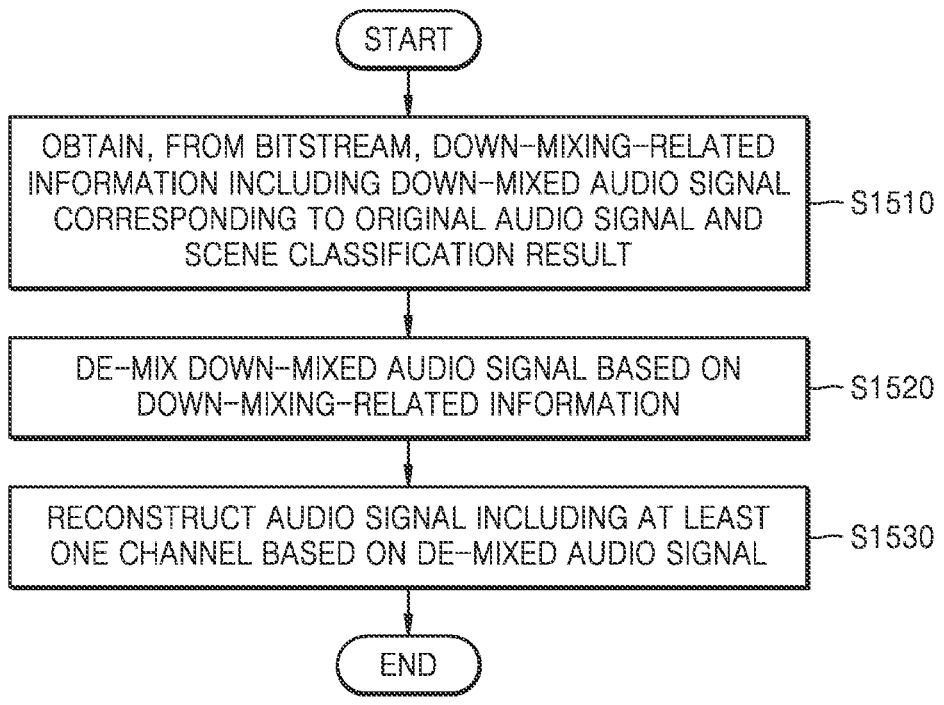
FIG. 15 is a flowchart of an audio processing method, according to an embodiment of the disclosure.

FIG. 15 is a flowchart of an audio processing method according to an embodiment of the disclosure. For convenience of explanation, the audio processing method is described with reference to FIG. 10A and FIG. 10B. An audio decoding apparatus 1000 may be referred to as an audio processing apparatus.

In operation S1510, the audio processing apparatus may obtain, from a bitstream, down-mixing-related information comprising a down-mixed audio signal corresponding to an original audio signal and a scene classification result.

In operation S1520, the audio processing apparatus may de-mix the down-mixed audio signal based on the down-mixing-related information.

In operation S1530, an audio signal including at least one channel may be reconstructed based on the de-mixed audio signal.

FIG. 16 is a flowchart of an audio processing method according to an embodiment of the disclosure. For convenience of explanation, the audio processing method is described with reference to FIG. 1A, FIG. 1B, FIG. 1C, FIG. 1D, FIG. 11, and FIG. 13.

Operation S1610, operation S1620, operation S1630, and operation S1640 of FIG. 16 may correspond to operation S1310, operation S1320, operation S1330, and operation S1340 of FIG. 13, respectively. Accordingly, descriptions provided above with reference to FIG. 13 are omitted.

In operation S1650, the audio processing apparatus may select one of modes of active noise cancellation based on the scene classification result. In an embodiment of the disclosure, the audio processing apparatus may generate an opposite signal for cancelling the first audio signal based on the selected mode.

Figure 17:
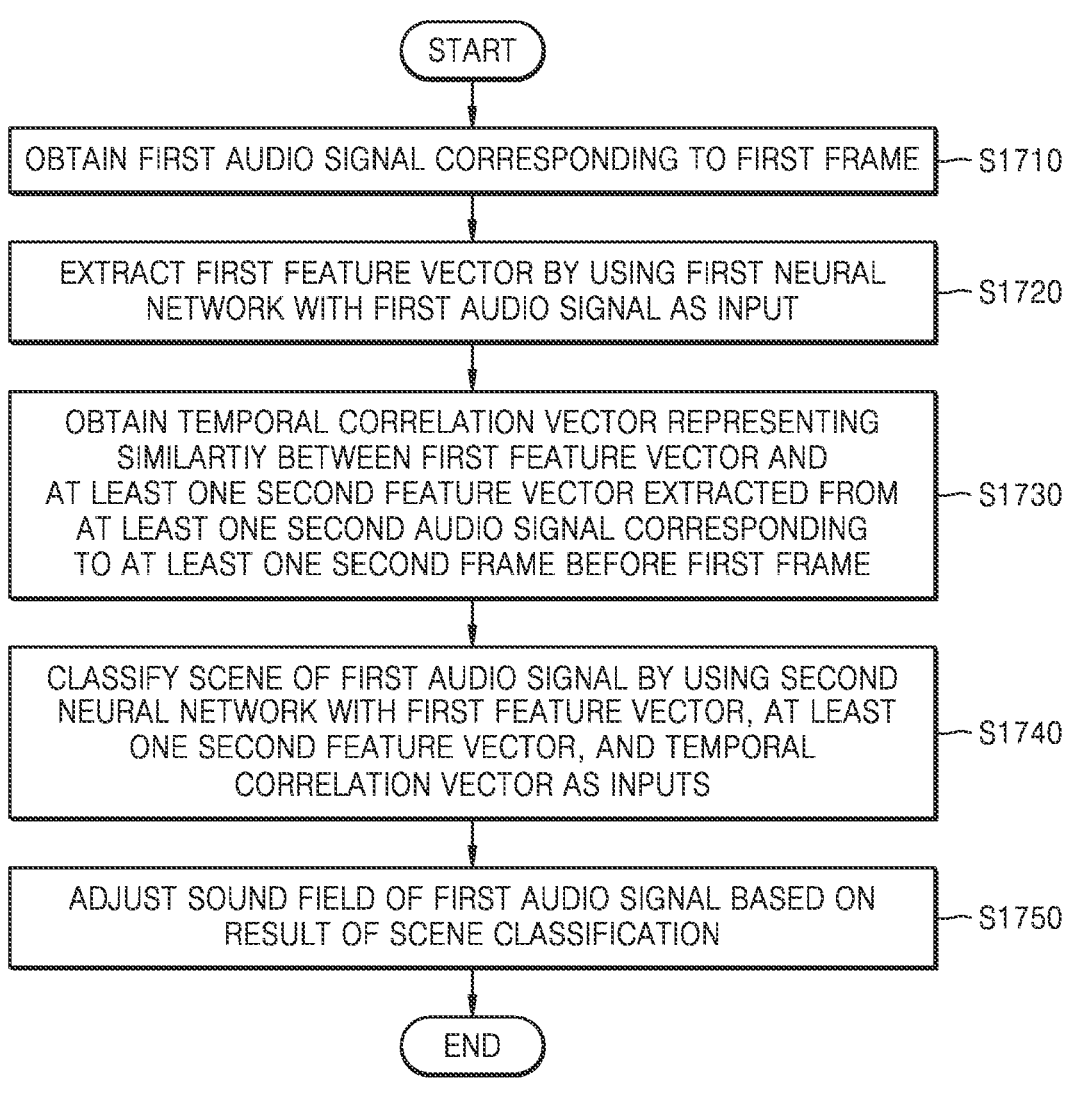
FIG. 17 is a flowchart of an audio processing method, according to an embodiment of the disclosure.

FIG. 17 is a flowchart of an audio processing method according to an embodiment of the disclosure. For convenience of explanation, the audio processing method is described with reference to FIG. 1A, FIG. 1B, FIG. 1C, FIG. 1D, FIG. 12, and FIG. 13.

Operation S1710, operation S1720, operation S1730, and operation S1740 of FIG. 17 may correspond to operations operation S1310, operation S1320, operation S1330, and operation S1340 of FIG. 13, respectively. Accordingly, descriptions provided with reference to FIG. 13 are omitted.

In operation S1750, the audio processing apparatus may adjust a sound field of the first audio signal based on the scene classification result. In an embodiment of the disclosure, the audio processing apparatus may output the adjusted signal.

Figure 18:
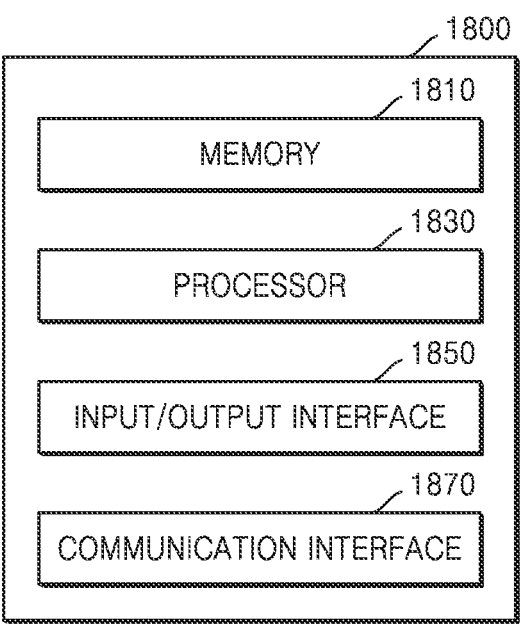
FIG. 18 is a block diagram of an audio processing apparatus according to an embodiment of the disclosure.

FIG. 18 is a block diagram of an audio processing apparatus according to an embodiment of the disclosure. Referring to FIG. 18, an audio processing apparatus 1800 may be a speaker apparatus for reproducing audio or may be a separate server apparatus. An audio processing method according to embodiments introduced in the specification may be performed by a speaker apparatus, may be performed by a separate server apparatus, or may be jointly performed (processes included in the audio processing method are divided and performed by a plurality of apparatuses) by the speaker apparatus and the separate server apparatus.

Hereinafter, for convenience of explanation, descriptions are provided under the assumption that the audio processing apparatus 1800 performs an audio processing method. However, as described above, the disclosure is not limited thereto, a separate server apparatus may be present, and the additional server apparatus may perform part or all of the processes. Accordingly, in the embodiments described below, it is to be understood as that operations performed by the audio processing apparatus 1800 may also be performed by a separate computing apparatus, such as a server apparatus, even when there is no specific explanation.

Referring to FIG. 18, the audio processing apparatus 1800 according to an embodiment of the disclosure may include a memory 1810, a processor 1830, an input/output interface 1850, and a communication interface 1870. However, elements of the audio processing apparatus 1800 are not limited to the example described above, and the audio processing apparatus 1800 may include more or fewer elements than those described above. In an embodiment of the disclosure, at least some of the memory 1810, the processor 1830, the input/output interface 1850, and the communication interface 1870 may be implemented in the form of a single chip, and the processor 1830 may include one or more processors.

The memory 1810 is an element for storing various program or data and may include a storage medium, such as read-only memory (ROM), random access memory (RAM), a hard disk, a compact disc read-only memory (CD-ROM), and a digital video disc (DVD), or a combination of storage media. The memory 1810 may not be separately present but integrated into the processor 1830. The memory 1810 may include a volatile memory, a non-volatile memory, or a combination of a volatile memory and a non-volatile memory. A program for performing operations according to embodiments to be described later may be stored in the memory 1810. The memory 1810 may provide the stored data to the processor 1830 in response to a request of the processor 1830.

The processor 1830 is an element for controlling a series of processes such that the audio processing apparatus 1800 operates according to the embodiments described with reference to FIG. 1A, FIG. 1B, FIG. 1C, FIG. 1D, FIG. 2A, FIG. 2B, FIG. 3A, FIG. 3B, FIG. 4A, FIG. 4B, FIG. 4C, FIG. 4D, FIG. 5A, FIG. 5B, FIG. 5C, FIG. 5D, FIG. 6A, FIG. 6B, FIG. 7A, FIG. 7B, FIG. 8A, FIG. 8B, FIG. 8C, FIG. 9A, FIG. 9B, FIG. 10A, FIG. 10B, FIG. 11, FIG. 12, FIG. 13, FIG. 14A, FIG. 14B, FIG. 15, FIG. 16, and FIG. 17, and may include one or more processors. The one or more processors may include a universal processor such as a central processing unit (CPU), an application processor (AP), a digital signal processor (DSP), etc., a dedicated graphic processor such as a graphics processing unit (GP), a vision processing unit (VPU), etc., or a dedicated AI processor such as a neural processing unit (NPU). For example, when the one or more processors are the dedicated AI processors, they may be designed in a hardware structure that is specific to dealing with a particular AI model (for example, a neural network model).

The processor 1830 may record data in the memory 1810 or read data stored in the memory 1810. In particular, the processor 1830 may process data according to a predefined rule or AI model by executing a program stored in the memory 1810. Accordingly, the processor 1830 may perform the operations described in the embodiments described above, and the operations described as being performed by the audio processing apparatus 1800 in the embodiments described above may be considered as being performed by the processor 1830, unless there is a specific explanation.

The input/output interface 1850 may include an input interface (e.g., a touch screen, a hard button, a microphone, etc.) for receiving input of a control command or information from a user, and an output interface (e.g., a display panel, a speaker, etc.) for displaying an execution result of an operation according to control by the user or a state of the audio processing apparatus 1800. According to an embodiment of the disclosure, the input/output interface 1850 may display a moving image being reproduced, or may receive, from the user, an input for enlarging a partial area of the moving image or selecting a specific object included in the moving image.

The communication interface 1870 is an element for transmitting and receiving a signal (a control command, data, etc.) to and from an external apparatus via a cable or wirelessly, and may be configured to include a communication chipset supporting various communication protocols. The communication interface 1870 may receive a signal from the outside and output the received signal to the processor 1830 or may transmit a signal output from the processor 1830 to the outside.

The elements (for example, the feature extractor 110, the first neural network 112, the temporal correlation analyzer 120, the estimator 130, the concatenation function 132, the second neural network 134, the preprocessor 140, the audio scene classifier 210, the feature extractor 212, the temporal correlation analyzer 214, the estimator 216, the down-mixed channel audio generator 220, the audio scene classifier 1110, the ANC mode selector 1120, the noise canceler 1130, the audio scene classifier 1210, and the sound field controller 1220) shown in FIG. 1A, FIG. 1B, FIG. 1C, FIG. 1D, FIG. 2A, FIG. 11, and FIG. 12 may be obtained by classifying operations performed by the processor 1830 of FIG. 18 executing a program (or instruction) stored in the memory 1810 according to functions. Accordingly, the operations described as being performed by the elements shown in FIG. 1A, FIG. 1B, FIG. 1C, FIG. 1D, FIG. 2A, FIG. 11, and FIG. 12 may be considered as actually being performed by the processor 1830.

In an embodiment of the disclosure, the audio processing apparatus 1800 of FIG. 18 may correspond to the audio encoding apparatus 400 and the audio encoding apparatus 900 of FIG. 4A and FIG. 9A or the audio decoding apparatus 500 and the audio decoding apparatus 1000 of FIG. 5A and FIG. 10A, and may perform at least some of the functions of the audio encoding apparatus 400, the audio encoding apparatus 600, and the audio encoding apparatus 900 or the audio decoding apparatus 500, the audio decoding apparatus 700, and the audio decoding apparatus 1000 described with reference to FIG. 3A, FIG. 3B, FIG. 4A, FIG. 4B, FIG. 4C, FIG. 4D, FIG. 5A, FIG. 5B, FIG. 5C, FIG. 5D, FIG. 6A, FIG. 6B, FIG. 7A, FIG. 7B, FIG. 8A, FIG. 8B, FIG. 8C, FIG. 9A, FIG. 9B, FIG. 10A, and FIG. 10B.

In an embodiment of the disclosure, an audio processing method may include an operation of obtaining a first audio signal corresponding to a first frame. The audio processing method may include an operation of extracting a first feature vector by using a first neural network with the first audio signal as an input. The audio processing method may include an operation of obtaining a temporal correlation vector representing similarity between the first feature vector and at least one second feature vector extracted from at least one second audio signal corresponding to at least one second frame before the first frame. The audio processing method may include an operation of classifying a scene of the first audio signal by using a second neural network with the first feature vector, the at least one second feature vector, and the temporal correlation vector as inputs.

In an embodiment of the disclosure, the operation of obtaining the first audio signal may include an operation of obtaining a multi-channel audio signal corresponding to a plurality of frames including the first frame and the at least one second frame. The operation of obtaining the first audio signal may include an operation of extracting the first audio signal including at least one channel signal of the multi-channel audio signal corresponding to the first frame. According to an embodiment of the disclosure, for scene classification corresponding to the multi-channel audio signal, some channels of the multi-channel audio signal may be used so that computing resources may be efficiently used.

In an embodiment of the disclosure, the audio processing method may further include an operation of down-mixing the multi-channel audio signal corresponding to the first frame based on the scene classification result.

In an embodiment of the disclosure, the down-mixing operation may include an operation of obtaining a down-mixing profile corresponding to the scene classification result. The down-mixing operation may include obtaining, based on the down-mixing profile, down-mixing parameters for mixing the multi-channel audio signal into a multi-channel audio signal having a different channel layout. The down-mixing operation may include an operation of down-mixing the multi-channel audio signal corresponding to the first frame according to the channel layout, based on the down-mixing parameters. In an embodiment of the disclosure, an audio signal having a small channel layout may be efficiently generated by down-mixing the multi-channel audio signal according to a scene type.

In an embodiment of the disclosure, the temporal correlation vector may include an inner product of the first feature vector and the at least one second feature vector and an inner product of the first feature vector and the first feature vector.

In an embodiment of the disclosure, the second neural network may receive a value obtained by concatenating the first feature vector, the at least one second feature vector, and the temporal correlation vector as an input.

In an embodiment of the disclosure, the at least one second feature vector may include N second feature vectors. The second neural network may receive a value obtained by concatenating the first feature vector, M second feature vectors from among the N second feature vectors, and the temporal correlation vector as an input. Here, N is a natural number greater than M. According to an embodiment of the disclosure, data of a relatively small size is input to the neural network, so that computing resources may be efficiently used.

In an embodiment of the disclosure, the classification step may include an operation of classifying a scene of the first audio signal into a dialogue type, a music type, or a sound effect type.

In an embodiment of the disclosure, the audio processing method may further include an operation of selecting one of modes of active noise cancellation based on the scene classification result.

In an embodiment of the disclosure, the classification step may include an operation of classifying a degree of danger corresponding to the first audio signal. The selection step may include an operation of selecting a first mode of the active noise cancellation based on a first degree of danger, and selecting a second mode of the active noise cancellation based on a second degree of danger. According to an embodiment of the disclosure, it is determined whether to cancel an ambient sound according to the scene classification result, so that a user may quickly recognize a dangerous situation through the ambient sound.

In an embodiment of the disclosure, the audio processing method may further include an operation of adjusting a sound field of the first audio signal based on the scene classification result. According to an embodiment of the disclosure, as a sound field is adjusted according to the scene corresponding to the first audio signal, richer listening experience may be provided to the user.

In an embodiment of the disclosure, the audio processing apparatus may include a memory storing one or more instructions. The audio processing apparatus may include at least one processor that executes the one or more instructions stored in the memory. The at least one processor may execute the one or more instructions to obtain a first audio signal corresponding to a first frame. The at least one processor may execute the one or more instructions to extract a first feature vector by using a first neural network with the first audio signal as an input. The at least one processor may execute the one or more instructions to obtain a temporal correlation vector representing similarity between the first feature vector and at least one second feature vector extracted from at least one second audio signal corresponding to at least one second frame before the first frame. The at least one processor may execute the one or more instructions to classify a scene of the first audio signal by using a second neural network having the first feature vector, the at least one second feature vector, and the temporal correlation vector as inputs.

In an embodiment of the disclosure, the audio processing method may include an operation of obtaining, from a bitstream, down-mixing-related information including a down-mixed audio signal corresponding to an original audio signal and a scene classification result. The audio processing method may include an operation of de-mixing the down-mixed audio signal based on the down-mixing-related information. The audio processing method may include an operation of reconstructing an audio signal including at least one channel based on the de-mixed audio signal. The scene classification result may be obtained based on a temporal correlation vector between a first feature vector corresponding to a first frame of the original audio signal and at least one second feature vector corresponding to at least one second frame before the first frame of the original audio signal.

In an embodiment of the disclosure, the audio processing apparatus may include a memory storing one or more instructions. The audio processing apparatus may include at least one processor executing the one or more instructions stored in the memory. The at least one processor may execute the one or more instructions to obtain, from an original audio signal, down-mixing-related information including a down-mixed audio signal and a scene classification result. The at least one processor may execute the one or more instructions to de-mixing the down-mixed audio signal based on the down-mixing-related information. The at least one processor may execute the one or more instructions to reconstruct an audio signal based on the de-mixed audio signal. The scene classification result may be obtained based on a temporal correlation vector between a first feature vector corresponding to a first frame of the original audio signal and at least one second feature vector corresponding to at least one second frame before the first frame of the original audio signal.

The above-described embodiments of the disclosure may be written as a program or instruction executable on a computer, and the program or instruction may be stored in a storage medium.

A machine-readable storage medium may be provided in a form of a non-transitory storage medium. Wherein, the term "non-transitory storage medium" simply means that the storage medium is a tangible device and does not include a signal (e.g., an electromagnetic wave), but this term does not differentiate between where data is semi-permanently stored in the storage medium and where the data is temporarily stored in the storage medium. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a machine-readable storage medium (e.g., compact disc read only memory (CD-ROM)), or be distributed (e.g., downloaded or uploaded) online via an application store, or between two user devices (e.g., smart phones) directly. In the case of online distribution, at least part of the computer program product (e.g., a downloadable app) may be at least temporarily stored or arbitrarily created in a storage medium that may be readable to a such as a server of the manufacturer, a server of the application store, or a relay server.

The model associated with the neural network described above may be implemented as a software module. When implemented as a software module (e.g., a program module including an instruction), the neural network model may be stored on a computer-readable readable recording medium.

In addition, the neural network model may be integrated in the form of a hardware chip, and may be a part of the apparatus described above. For example, the neural network model may be made in a dedicated hardware chip form for artificial intelligence, or as a part of a related-art universal processor (e.g., a CPU or AP) or a graphical dedicated processor (e.g., a GPU).

In addition, the neural network model may be provided in the form of downloadable software. The computer program product may include a product (e.g., a downloadable application) in the form of a software program electronically distributed electronically through a manufacturer or an electronic market. For the electronic distribution, at least a part of the software program may be stored in a storage medium or temporarily generated. In this case, the storage medium may be a server of the manufacturer or the electronic market, or a storage medium of a relay server.

The technical spirit of the disclosure is described in detail with reference to exemplary embodiments, but the technical spirit of the disclosure is not limited to the above embodiments, and various changes and modifications may be made to the technical spirit of the disclosure by those of ordinary skill in the art within the technical spirit of the disclosure, without being limited to the foregoing embodiments.

What is claimed is:

1. An audio processing method for scene classification, the audio processing method comprising:

obtaining a first audio signal corresponding to a first frame;

extracting a first feature vector by inputting the first audio signal to a first neural network;

obtaining a temporal correlation vector representing a similarity between the first feature vector and at least one second feature vector extracted from at least one second audio signal corresponding to at least one second frame that is temporally before the first frame, wherein the at least one second feature vector comprises N second feature vectors, and wherein the temporal correlation vector comprises a first inner product of the first feature vector and the at least one second feature vector, and a second inner product of the first feature vector and the first feature vector;

classifying a scene of the first audio signal by inputting the first feature vector, the at least one second feature vector, and the temporal correlation vector to a second neural network, wherein the second neural network receives an input of a value obtained by concatenating the first feature vector, M second feature vectors from among the N second feature vectors, and the temporal correlation vector, and wherein each of N and M is a natural number, and N is greater than M; and selecting, based on a result of classifying the scene, a mode, from among modes of active noise cancellation, and implementing the active noise cancellation in the mode selected.

2. The audio processing method of claim 1, wherein the obtaining the first audio signal comprises:

obtaining a multi-channel audio signal corresponding to a plurality of frames comprising the first frame and the at least one second frame; and extracting the first audio signal comprising at least one channel signal from among a multi-channel audio signal corresponding to the first frame.

3. The audio processing method of claim 2, further comprising down-mixing, based on the result of the classifying the scene, the multi-channel audio signal corresponding to the first frame.

4. The audio processing method of claim 3, wherein the down-mixing comprises:

obtaining a down-mixing profile corresponding to the result of the classifying the scene;

obtaining, based on the down-mixing profile, down-mixing parameters for mixing the multi-channel audio signal into a multi-channel audio signal having a different channel layout; and down-mixing, based on the down-mixing parameters, the multi-channel audio signal corresponding to the first frame according to the channel layout.

5. The audio processing method of claim 1, wherein the classifying the scene comprises classifying the scene of the first audio signal into any of a dialogue type, a music type, and a sound effect type.

6. The audio processing method of claim 1, wherein the classifying the scene comprises classifying a degree of danger corresponding to the first audio signal, and wherein the selecting comprises selecting, based on a first degree of danger, a first mode of the active noise cancellation, and selecting, based on a second degree of danger, a second mode of the active noise cancellation.

7. The audio processing method of claim 1, further comprising adjusting, based on the result of classifying the scene, a sound field of the first audio signal.

8. An audio processing apparatus for scene classification, the audio processing apparatus comprising:

a memory storing at least one instruction; and at least one processor configured to execute the at least one instruction to:

obtain a first audio signal corresponding to a first frame;

extract a first feature vector by inputting the first audio signal to a first neural network;

obtain a temporal correlation vector representing a similarity between the first feature vector and at least one second feature vector extracted from at least one second audio signal corresponding to at least one second frame that is temporally before the first frame, wherein the at least one second feature vector comprises N second feature vectors, and wherein the temporal correlation vector comprises a first inner product of the first feature vector and the at least one second feature vector, and a second inner product of the first feature vector and the first feature vector; and classify a scene of the first audio signal by inputting the first feature vector, the at least one second feature vector, and the temporal correlation vector to a second neural network, wherein the second neural network receives an input of a value obtained by concatenating the first feature vector, M second feature vectors from among the N second feature vectors, and the temporal correlation vector, and wherein each of N and M is a natural number, and N is greater than M; and select, based on a result of classifying the scene, a mode, from among modes of active noise cancellation, and implement the active noise cancellation in the mode selected.

9. The audio processing apparatus of claim 8, wherein the at least one processor is further configured to execute the at least one instruction to:

obtain a multi-channel audio signal corresponding to a plurality of frames comprising the first frame and the at least one second frame; and extract the first audio signal comprising at least one channel signal from among a portion of the multi-channel audio signal corresponding to the first frame.

10. The audio processing apparatus of claim 9, wherein the at least one processor is further configured to execute the at least one instruction to down-mix, based on the result of the scene classification, the multi-channel audio signal corresponding to the first frame.

11. The audio processing apparatus of claim 10, wherein the at least one processor is further configured to down-mix the multi-channel audio signal by:

obtaining a down-mixing profile corresponding to the result of the scene classification;

obtaining, based on the down-mixing profile, down-mixing parameters for mixing the multi-channel audio signal into a multi-channel audio signal having a different channel layout; and down-mixing, based on the down-mixing parameters, the multi-channel audio signal corresponding to the first frame according to the channel layout.

12. The audio processing apparatus of claim 8, wherein the at least one processor is further configured to execute the at least one instruction to adjust, based on the result of classifying the scene, a sound field of the first audio signal.

13. An audio processing method for scene classification, the audio processing method comprising:

obtaining, from a bitstream, down-mixing-related information comprising a down-mixed audio signal corresponding to an original audio signal and a scene classification result;

de-mixing the down-mixed audio signal, based on the down-mixing-related information;

reconstructing an audio signal comprising at least one channel, based on the de-mixed audio signal; and selecting, based on a result of classifying a scene, a mode, from among modes of active noise cancellation, and implementing the active noise cancellation based on the mode selected, wherein the scene classification result is obtained based on concatenation of:

a first feature vector, at least one second feature vector comprising M second feature vectors from among N second feature vectors, and a temporal correlation vector between the first feature vector, corresponding to a first frame of the original audio signal, and the at least one second feature vector of the M second feature vectors, the at least one second feature vector corresponding to at least one second frame that is temporally before the first frame of the original audio signal, and wherein the temporal correlation vector comprises a first inner product of the first feature vector and the at least one second feature vector, and a second inner product of the first feature vector and the first feature vector, and wherein each of N and M is a natural number, and N is greater than M.

* * * * *